US012767201B1

(12) United States Patent
Bickel et al.

(10) Patent No.: US 12,767,201 B1
(45) Date of Patent: Oct. 20, 2026

(54) PUSH PULL WAGON

(71) Applicant: Carlson Pet Products, Inc., Burnsville, MN (US)

(72) Inventors: Shannon R. Bickel, Lakeville, MN (US); Daniel J. Folk, Hammond, WI (US)

(73) Assignee: Carlson Pet Products, Inc., Burnsville, MN (US)

( * ) Notice: Subject to any disclaimer, the term of this patent is extended or adjusted under 35 U.S.C. 154(b) by 163 days.

(21) Appl. No.: 18/514,006

(22) Filed: Nov. 20, 2023

Related U.S. Application Data

(60) Provisional application No. 63/427,076, filed on Nov. 21, 2022.

(51) Int. Cl.
*B62B 3/00* (2006.01)
*B62B 3/02* (2006.01)

(52) U.S. Cl.
CPC ................ *B62B 3/007* (2013.01); *B62B 3/02* (2013.01); *B62B 2205/06* (2013.01)

(58) Field of Classification Search
CPC ........ B62B 3/007; B62B 3/02; B62B 2205/06
See application file for complete search history.

(56) References Cited

U.S. PATENT DOCUMENTS 8,011,686 B2 * 9/2011 Chen ....................... B62B 3/106 280/87.01
8,973,940 B2 * 3/2015 Chen ......................... B62B 3/02 280/638
9,073,564 B2 * 7/2015 Yang ....................... B62B 3/002
10,081,380 B2 * 9/2018 Fitzwater ................ B62B 3/007
10,435,055 B1 * 10/2019 Zhu ......................... B62B 3/007
11,247,708 B2 * 2/2022 Wang ...................... B62B 3/025
12,221,146 B2 * 2/2025 Yang ....................... B62B 5/067
2014/0353945 A1 * 12/2014 Young ....................... B62B 5/08 280/650

FOREIGN PATENT DOCUMENTS

CN 215793909 U * 2/2022
DE 202020102798 U1 * 5/2020 ........... B62B 5/0461
EP 3504387 B1 * 5/2021 ............. E04H 15/38
JP 4339369 B2 * 10/2009

OTHER PUBLICATIONS

DE-202020102798-U1 English Translation (Year: 2020).*
CN-215793909-U English Translation (Year: 2022).*
JP-4339369-B2 English Translation (Year: 2009).*
EP-3504387-B1 English Translation (Year: 2021).*
The Best Collapsible Folding Wagon, by Katharine Gammon, www.nytimes.com [online], Published Jun. 23, 2022 [retrieved on Nov. 9, 2022], Retrieved from the Internet: <URL: https://www.nytimes.com/wirecutter/reviews/best-folding-Wagons/> (Year: 2022).

* cited by examiner

*Primary Examiner* — Michael T. Walsh

(57) ABSTRACT

A wagon that includes an open and operating state and a closed and compact state, first and second front wheels, first and second rear wheels engaged to the frame, a front handle, a rear handle, a front frame portion, a rear frame portion, a first side frame portion, a second side frame portion, a bottom frame portion, and a flexible receptacle between the frame portions. Certain frame portions are adjacent to each other when the frame is in the closed and compact state and are spaced apart from each other when the frame is in the open and operating state.

18 Claims, 36 Drawing Sheets

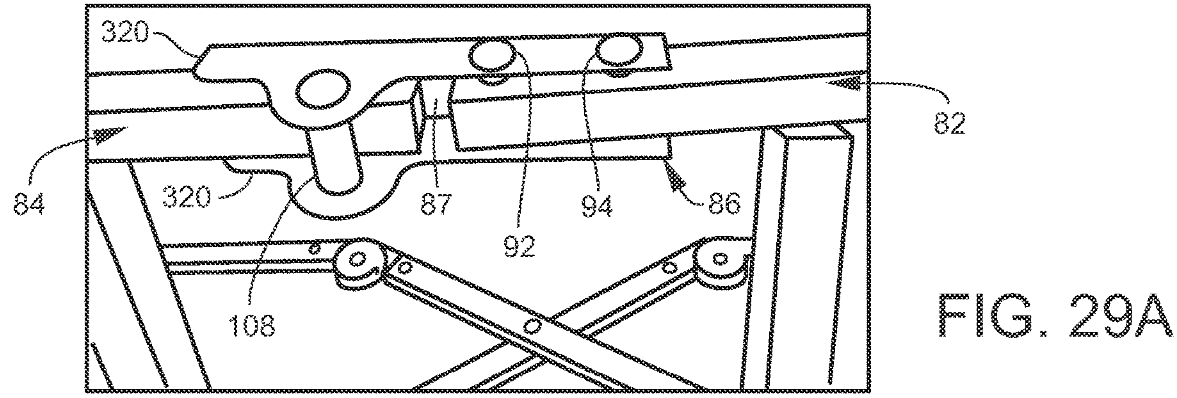
FIG. 29A
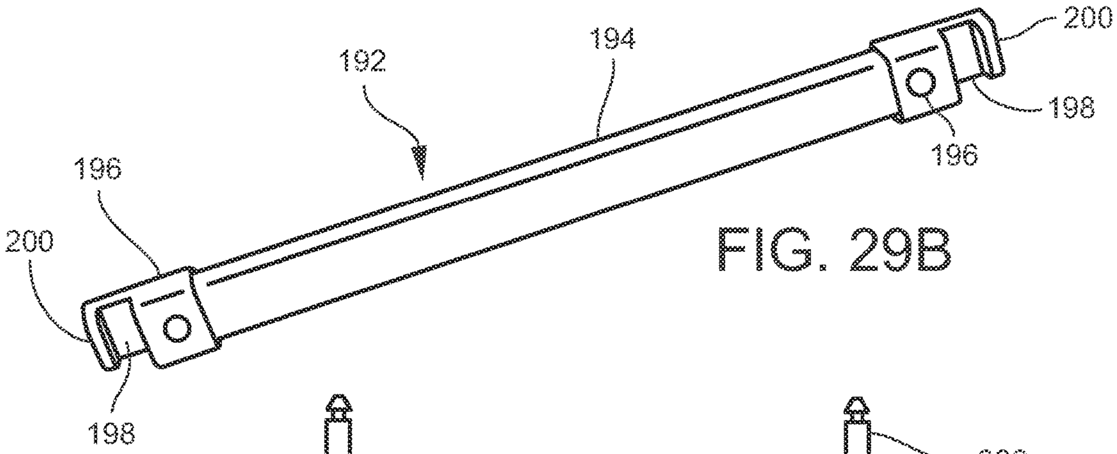
FIG. 29B
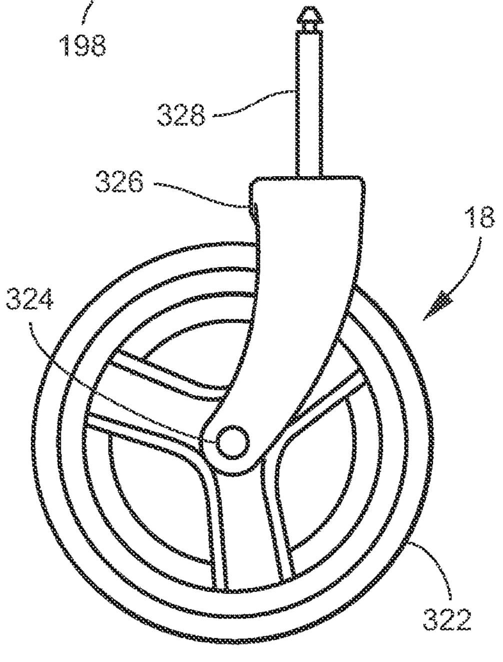
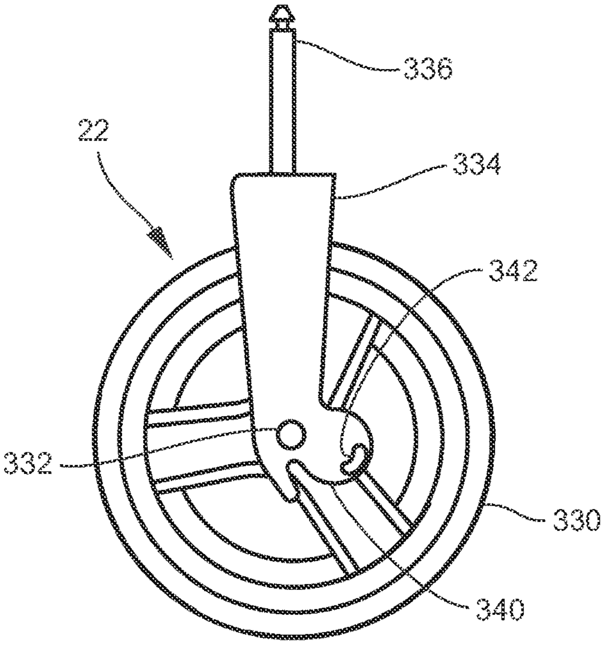
FIG. 29C
FIG. 29D

PUSH PULL WAGON

This application claims the benefit under 35 U.S.C. 119 (e) of U.S. Provisional Patent Application No. 63/427,076 filed Nov. 21, 2022, which application is hereby incorporated by reference in its entirety into this application.

FIELD OF THE INVENTION

The present invention relates to a collapsible folding wagon and more particularly relates to such a wagon with both a front pull handle and a rear push handle.

BACKGROUND OF THE INVENTION

Children pull wagons, usually colored red and made of steel. Mothers and fathers pull conventional steel wagons with their toddlers in tow. It is a popular site at a state fair.

Even today farmers pull wagons. For example, there are hay wagons, gravity wagons, and flatbed wagons. A gravity wagon has a sloping floor that permits grain to flow out the back of the wagon. A flatbed wagon may transport hay or farm equipment.

A wagon used in a wagon train is another example of a pull wagon. The wagons were pulled by horses, oxen, mules, or donkeys and loaded with food, tools, and supplies.

A stroller is a push instrument. For example, there are running strollers with relatively large wheels, bicycle like hand brakes, and a safety strap for the hand of the running mother or father. It is safe to push a stroller and run at the same time.

To push a wagon like one pushes a stroller is to risk a jagged journey because the caretaker who is steering and pushing using the front handle can over-compensate as the wagon veers back and forth. Such is unsafe. An extreme veer or jag likely overturns the wagon and its contents.

SUMMARY OF THE INVENTION

A feature of the present invention is a wagon having a front pull handle.

Another feature of the present invention is a wagon having a rear push handle.

Another feature of the present invention is the provision in a wagon having both a front pull handle and a rear push handle.

Another feature of the present invention is the provision in a push pull wagon, of a frame that includes an open and operating state and a closed and compact state.

Another feature of the present invention is the provision in a push pull wagon, of first and second front wheels engaged to the frame, and of first and second rear wheels engaged to the frame.

Another feature of the present invention is the provision in a push pull wagon, of a front handle engaged to the frame at a forward frame location, and of a rear handle engaged to the frame at a rearward frame location.

Another feature of the present invention is the provision in a push pull wagon, of a frame including a front frame portion and a rear frame portion opposite of the front frame portion.

Another feature of the present invention is the provision in a push pull wagon, of the frame further including a first side frame portion adjacent to each of the front frame portion and rear frame portion and a second side frame portion adjacent to each of the front frame portion and rear frame portion and being opposite of the first side frame portion.

Another feature of the present invention is the provision in a push pull wagon, of the frame further including a bottom frame portion adjacent to each of the front and rear frame portions and further being adjacent to each of the first side and second side frame portions.

Another feature of the present invention is the provision in a push pull wagon, of a flexible receptacle engaged to the frame.

Another feature of the present invention is the provision in a push pull wagon, of the flexible receptacle having flexible side portions disposed respectively inwardly of the first and second side frame portions, flexible front and rear end portions disposed respectively inwardly of the front and rear frame portions, and a flexible floor disposed above and adjacent to the bottom frame portion.

Another feature of the present invention is the provision in a push pull wagon, of the flexible receptacle being engaged to the frame when the frame is in the open and operating state and when the frame is in the closed and compact state.

Another feature of the present invention is the provision in a push pull wagon, of the front and rear frame portions being adjacent to each other when the frame is in the closed and compact state and being spaced apart from each other when the frame is in the open and operating state.

Another feature of the present invention is the provision in a push pull wagon, of sections of the first side frame portion being adjacent to each other when the frame is in the closed and compact state and being spaced apart from each other when the frame is in the open and operating state and sections of the second side frame portion being adjacent to each other when the frame is in the closed and compact state and being spaced apart from each other when the frame is in the open and operating state.

Another feature of the present invention is the provision in a push pull wagon, of sections of the bottom frame portion being adjacent to each other when the frame is in the closed and compact state and being spaced apart from each other when the frame is in the open and operating state.

Another feature of the present invention is the provision in a push pull wagon, of sections of the first and second side portions of the frame defining a horizontal plane and the rear portion of the frame having first and second uppermost locations disposed at an altitude greater than the horizontal plane, where the rear handle is pivotally engaged to the first and second uppermost locations.

Another feature of the present invention is the provision in a push pull wagon, of sections of the first and second side portions of the frame defining a horizontal plane and the front portion of the frame including a lowermost frame section disposed at an altitude lower than the horizontal plane, where the front handle is engaged to the lowermost frame section and includes a pivot axis adjacent to the lowermost frame section.

Another feature of the present invention is the provision in a push pull wagon, of sections of the first and second side portions of the frame defining a horizontal plane and the rear handle is engaged to the frame at a rear pivot axis having an altitude above the horizontal plane, where the front handle is engaged to the frame at a front pivot axis having an altitude below the horizontal plane.

Another feature of the present invention is the provision in a push pull wagon, of the rear handle being engaged to the frame at a rear pivot axis, where the front handle is engaged to the frame at a front pivot axis, and where the rear pivot axis has an altitude greater than the front pivot axis.

Another feature of the present invention is the provision in a push pull wagon, of each of the first and second side frame portions including a) a first frame section extending rearwardly from the front frame portion and having a rearmost location, where the first frame section is disposed in the horizontal plane, b) a second frame section extending frontwardly from the rear frame portion and having a frontmost location, where the second frame section is disposed in the horizontal plane, c) a third frame section pivotally engaged to the rearmost location of the first frame section and extending obliquely therefrom to pivotally engage the rear portion of the frame, and d) a fourth frame section pivotally engaged to the frontmost location of the second frame section and extending obliquely therefrom to pivotally engage the front portion of the frame.

Another feature of the present invention is the provision in a push pull wagon, of the third and fourth frame sections being pivotally engaged to each other.

Another feature of the present invention is the provision in a push pull wagon, of a) the front frame portion and the first side frame portion sharing a first corner post, b) the front frame portion and the second side frame portion sharing a second corner post, and c) the front frame portion having the lowermost front frame section and further having an uppermost front frame section, where the first and second corner posts define a front plane, where the lowermost front frame section is in the front plane, and where the uppermost front frame section is spaced from the front plane and is forwardly of the front plane.

Another feature of the present invention is the provision in a push pull wagon, of a) the rear frame portion and the first side frame portion sharing a third corner post, b) the rear frame portion and the second side frame portion sharing a fourth corner post, and c) the rear frame portion including a lowermost rear frame section and an uppermost rear frame section, where the third and fourth corner posts define a rear plane, where the lowermost rear frame section is in the rear plane, and where the uppermost rear frame section is spaced from the rear plane and is rearwardly of the rear plane.

Another feature of the present invention is the provision in a push pull wagon, of the bottom frame portion including a) a front platform section pivotally engaged to the front frame portion, b) a rear platform section pivotally engaged to the rear frame portion, c) the front platform section and rear platform section pivotally engaged to each other, and d) the front and rear platform sections defining respective front and rear platform planes, where the front and rear platform planes are co-planar when the wagon is in a folded out and operating state, and where the front and rear platform planes are obliquely disposed relative to each other when the wagon is in a folded in and compact state.

Another feature of the present invention is the provision in a push pull wagon, of the front platform section including front and rear platform frame members and a central frame member extending therebetween to form a first H-shape, and where the rear platform section includes front and rear platform frame members and a central frame member extending therebetween to form a second H-shape.

Another feature of the present invention is the provision in a push pull wagon, of at least one channel frame member between the front and rear platform sections, where the channel frame member is pivotally engaged to one of the front and rear platform sections, and where the channel frame member is fixedly engaged to the other of the front and rear platform sections.

Another feature of the present invention is the provision in a push pull wagon, of a) the front platform section including a first platform member extending straight rearwardly from the front frame portion, then extending obliquely inwardly, and then extending straight rearwardly to the rear platform section, b) the front platform section including a second platform member extending straight rearwardly from the front frame portion, then extending obliquely inwardly, and then extending straight rearwardly to the rear platform section, where the first and second platform members are engaged to each other by at least one front transverse frame member, c) the rear platform section including a third platform member extending straight frontwardly from the rear frame portion, then extending obliquely inwardly, and then extending straight frontwardly to the front platform section, and d) the rear platform section including a fourth platform member extending straight frontwardly from the rear frame portion, then extending obliquely inwardly, and then extending straight frontwardly to the front platform section, where the third and fourth platform members are engaged to each other by at least one rear transverse frame member.

Another feature of the present invention is the provision in a push pull wagon, of the flexible receptacle including a first openable side sleeve that engages the first side frame portion, of a second openable side sleeve that engages the second side frame portion, of a front openable sleeve that engages the front frame portion, and of a rear openable sleeve that engages the rear frame portion.

Another feature of the present invention is the provision in a push pull wagon, of the rear end portion of the flexible receptacle including a) a flexible rear door having a hinged bottom portion that remains engaged to the rear end portion when the flexible rear door is opened, a first side door portion that is releaseably engaged to the rear end portion, and a second side door portion that is releaseably engaged to the rear end portion and disposed opposite of the first side portion, and b) a U-shaped opening that is exposed to view when the flexible rear door is opened, where the U-shaped opening is defined by a U-shaped edge that extends adjacent to hinged bottom portion, first side door portion, and second side door portion when the flexible rear door is closed.

Another feature of the present invention is the provision in a push pull wagon, of a canopy, where the canopy includes a frame having first and second U-shaped members pivotally engaged to each other at first and second junctions, where the first and second junctions are engagable in respective first and second pockets disposed on the first and second side portions of the flexible receptacles.

Another feature of the present invention is the provision in a push pull wagon, of a handle piece engaged to the flexible floor and extending from a top face of the flexible floor, where sections of the bottom frame portion pivot relative to each other at a first bottom floor pivot location, where the flexible floor is engaged to the bottom frame portion adjacent to the first bottom floor pivot location, and where the handle piece is engaged to the flexible floor adjacent to the first bottom floor pivot location such that, when the handle piece is lifted upwardly, one of the sections of the bottom frame portion is lifted upwardly to begin a pivoting of the sections of the bottom frame portion at the first bottom floor pivot location.

Another feature of the present invention is the provision in a push pull wagon, of a) the rear frame portion and the first side frame portion sharing a third corner post, b) the rear frame portion and the second side frame portion sharing a fourth corner post, c) the third and fourth corner posts having the first and second uppermost locations to which the rear handle is pivotally engaged, d) the third and fourth corner posts defining a rear post plane, e) the rear handle including a transverse section, f) the rear handle being pivotable such that the transverse section is pivotable to a first side of the rear post plane, and g) the rear handle being pivotable such that the transverse section is pivotable to a second and opposite side of the rear post plane.

Another feature of the present invention is the provision in a push pull wagon, of the front handle being pivotably engaged to the frame and telescopically extendable in length.

Another feature of the present invention is the provision in a push pull wagon, of a front handle that is pivotably engaged to the frame about an axis that is fixed and parallel to a lowermost transverse support member of the frame, where the lowermost transverse support member includes a first outer end adjacent to the first front wheel and a second outer end adjacent to the second front wheel.

An advantage of the present invention is that the wagon may be pushed with the rear handle and pulled at the front handle.

Another advantage of the present invention is that the wagon may be pushed with the rear handle and pulled with the front handle at different times. When the rear handle is not being used, the rear handle may be pivoted to an out-of-the-way position. When the front handle is not being used, the front handle may be telescopically shortened and pivoted to an out-of-the-way position.

Another advantage of the present invention is that the wagon may be pushed with the rear handle and pulled with the front handle at the same time.

Another advantage is that the front pulling handle is positioned adjacent to and about in the location of a mother's hand to make it comfortable and ergonomic for a mother to pull the push pull wagon.

Another advantage is that pulling pressure is exerted on a relatively low point of the frame of the push pull wagon such that, if the front wheels encounter a bump such as a sidewalk square upheaval, the pulling includes an angle of upward force to pull the front of the wagon up and over the bump.

Another advantage is that pushing pressure may be customized to a location that is most comfortable for the mother or father. The push handle may be pivoted to one of a number of locations.

Another advantage is that the pushing pressure is exerted over a width of the push pull wagon, namely, at right and left corner posts.

Another advantage is that the pushing pressure is exerted over a height of the push pull wagon, namely, at right and left corner posts that extend over a height of the rear portion of the frame.

Another advantage is that the push pull wagon is strong, lightweight, and portable. The frame is formed of metal tubes, where the metal may be steel or aluminum. Front, rear, side, and bottom portions of the frame are almost exclusively formed of metal tubes, except for a channel piece that fixes the front and rear sections of the frame bottom portion in a common plane and that allows only a one-way pivoting of such front and rear sections.

Another advantage is that the receptacle is formed of a flexible sheeting, such as a fabric or nylon flexible material, that minimizes the total weight of the push pull wagon without sacrificing strength or portability. For example, the flexible receptacle is folded up and folded out with the frame as the frame is folded up and folded out. In other words, the flexible receptacle is not removed from the push pull wagon as the push pull wagon is folded up to a compact form for transport in a vehicle. And, since the flexible receptacle is always on the frame, the flexible receptacle and frame are not stored separately or transported separate.

Another advantage is that the flexible receptacle is easily removed from the frame for washing. Openable sleeves engage the flexible receptacle to front, rear, and side portions of the frame.

Another advantage is that the pull push wagon is user friendly. For example, to collapse the frame, a handle on the top side of the floor of the receptacle is pulled up, which pulls up the floor, which pulls up a strap that is on the bottom side of the floor, which strap is looped about a portion of the bottom frame adjacent to a bottom frame pivoting location such that bottom floor frame portions are pulled up to initiate a pivoting and collapsing of the frame as a whole.

Another advantage is that, with the inclusion of a rear door, a pet such as a dog can easily jump into the push pull wagon. The rear door is openable and closeable with a quick connect such as snaps or strips of loops and hooks, and a rear frame member at such location is removable to make it even easier for the pet to jump into the push pull wagon.

Another advantage is that no assembly is required for the end user. In other words, the frame, flexible receptacle, and flexible canopy may be shipped in a state where such three components are engaged to each other and ready for use. Prior to use, only a folding out or expansion of the frame is required, with the flexible receptacle and flexible canopy naturally expanding when the frame is expanded.

Another advantage is that the push pull wagon when in the closed and compact state is sufficiently small to be portable and when in the open and operating state is sufficiently large and strong to transport relatively large pets.

Another advantage is that the push pull wagon is inexpensive to manufacture.

BRIEF DESCRIPTION OF THE DRAWINGS

FIG. 29A is a detail perspective view of a portion of a bottom or platform of the frame of the wagon of FIG. 1.

FIG. 29B shows a portion of the frame of the wagon of FIG. 1, with the portion shown being the portion of the frame having been disengaged from the frame of the wagon shown in FIG. 27.

FIG. 29C shows a detail isolated view of a front wheel of the wagon of FIG. 1.

FIG. 29D shows a detail isolated view of a rear wheel of the wagon of FIG. 1.

DESCRIPTION

Figure 1:
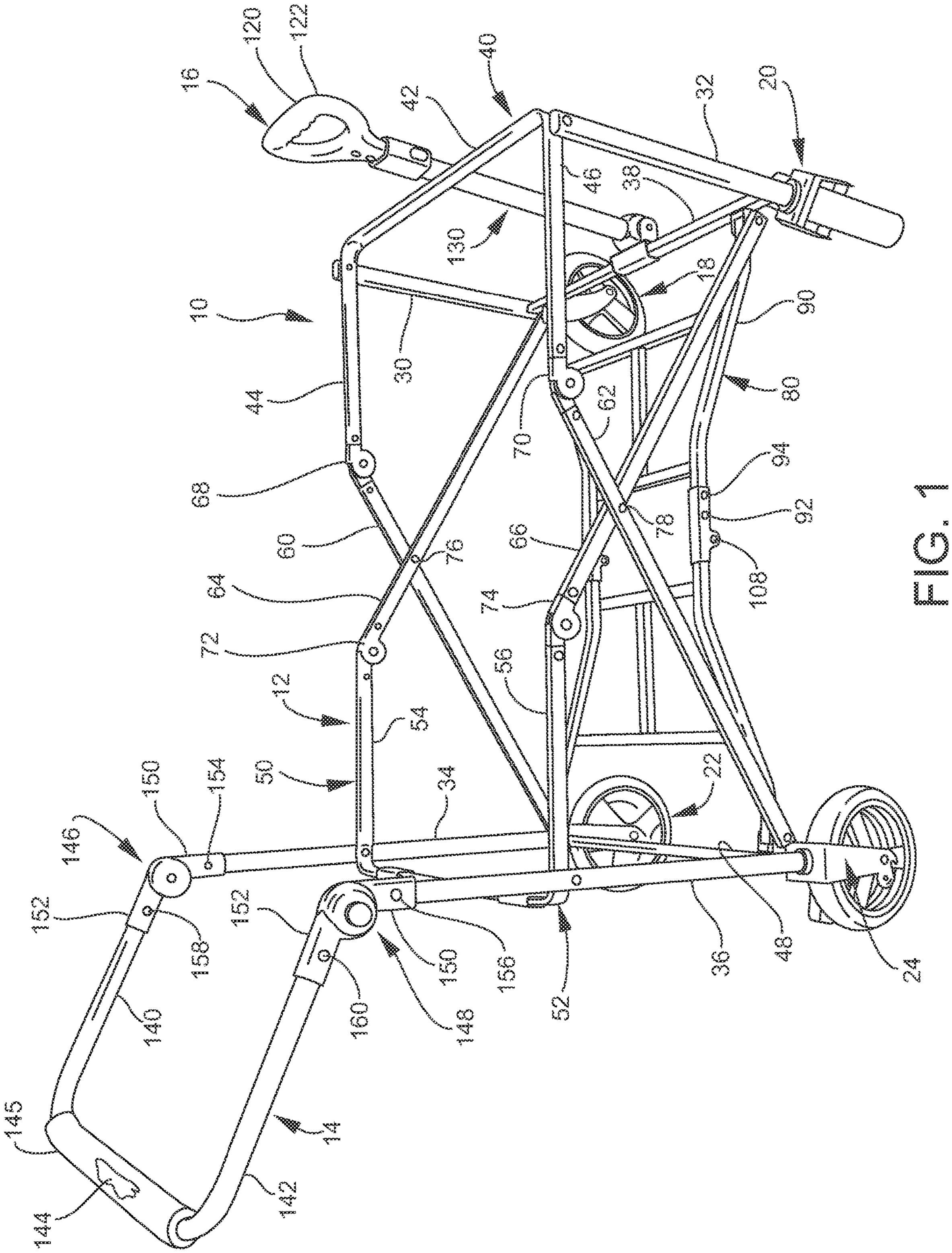
FIG. 1 is a side perspective side view of the present wagon showing the rear handle extending away from the frame and in position for pushing the wagon and further showing the front handle shortened and tucked adjacent to the frame.
Figure 7:
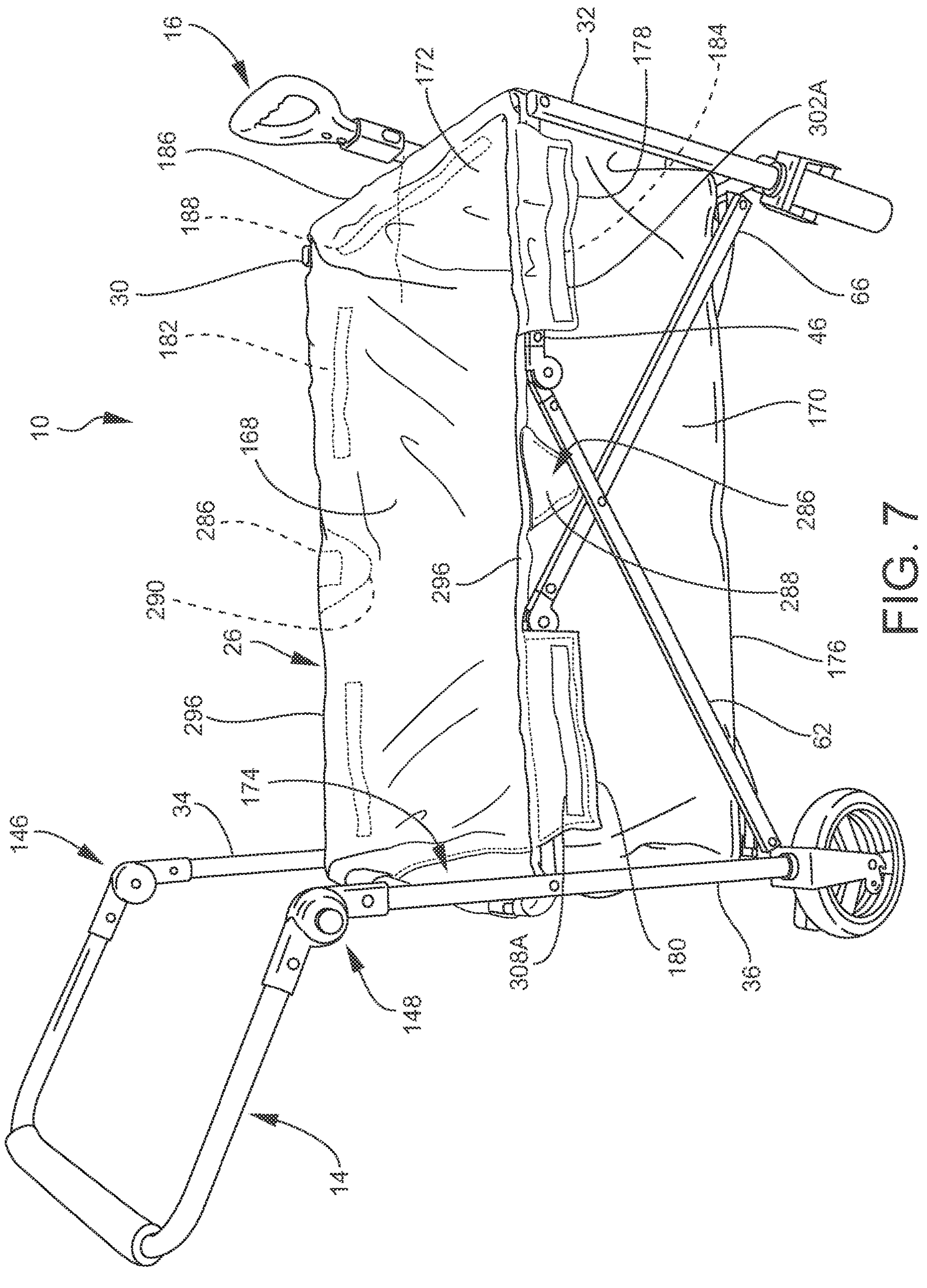
FIG. 7 is a side perspective view of the wagon of FIG. 1, and further shows a flexible receptacle engaged to the frame of the wagon.
Figure 16:
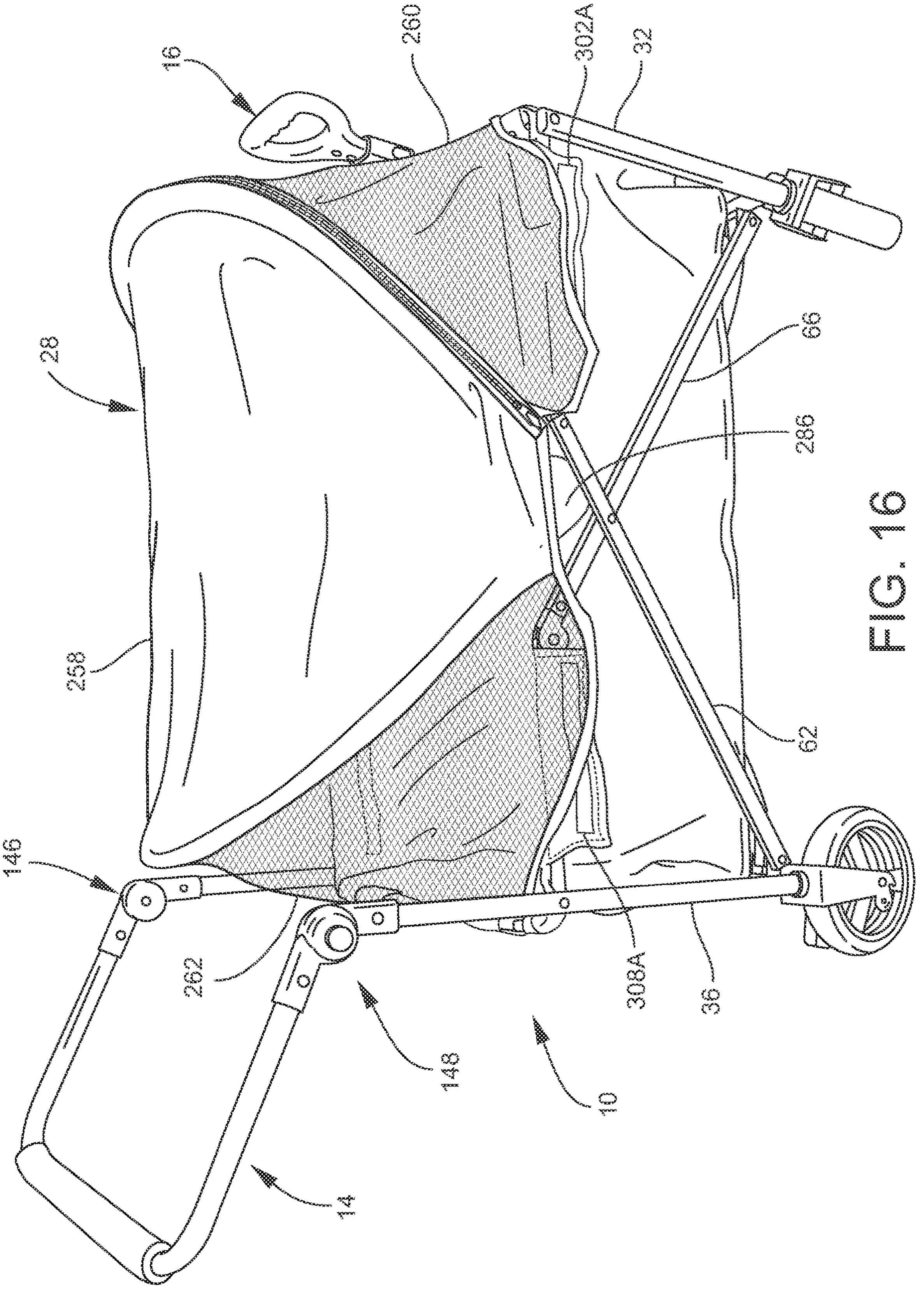
FIG. 16 is a side perspective view of the wagon of FIG. 7, and further shows the canopy of FIG. 14 engaged to the wagon.

As shown in FIG. 1, the present push pull wagon is shown in FIG. 1 and designated with the number 10. Push pull wagon 10 includes a frame 12, a push handle 14, a pull handle 16, first and second front wheel assemblies 18, 20, and first and second rear wheel assemblies 22, 24. As shown in FIG. 7, wagon 10 further includes a receptacle 26. As shown in FIG. 16, wagon 10 further includes a canopy 28.

As shown in FIG. 1, frame 12 includes a set of four posts 30, 32, 34, and 36 that are straight, tubular, formed of a metal, and are engaged to and extend vertically from respective wheel assemblies 18, 20, 22, and 24. Posts 30, 32 are front posts. Posts 34, 36 are rear posts. Each of the posts 30, 32, 34, and 36 is a corner post. The uppermost ends of rear posts 34 and 36 are disposed at a greater altitude than the uppermost ends of front posts 30, 32. Rear posts 34, 36 are greater in length than are the front posts 30, 32.

A lowermost transverse support member 38 extends to and between lower portions of front posts 30, 32. Outermost ends of support member 38 are fixedly engaged, such as by welding, to lower portions of front posts 30, 32 adjacent to the wheel assemblies 18, 20. Support member 38 is straight, tubular, and formed of a metal. An axis of support member 38 is disposed at a right angle to an axis of front post 30 and at a right angle to an axis of front post 32.

An uppermost U-shaped support member 40 fixes apart uppermost ends of the front posts 30, 32. Support member 40 is tubular and formed of a metal. Support member 40 includes a base section 42 that is straight and that includes a straight axis that is disposed forwardly of a straight vertical axis of front posts 30, 32. The straight axis of base section 42 is also adjacent to and disposed forwardly of frontmost vertical edges of front posts 30, 32. The height of base section 42 is about the height of the uppermost ends of front posts 30, 32.

Support member 40 includes a first rearwardly extending straight section 44 and a second rearwardly extending straight section 46 that extend parallel to each other and at a right angle to base section 42. Straight section 44 is disposed at a right angle relative to front post 30 and straight section 46 is disposed at a right angle relative to front post 32. Straight section 44 is fixedly engaged by a pin to an uppermost end of front post 30 and straight section 46 is fixedly engaged by a pin to an uppermost end of front post 32. U-shaped support member 40 defines a first plane.

A lowermost transverse support member 48 extends to and between lower portions of rear posts 34, 36. Outermost ends of support member 48 are fixedly engaged, such as by welding, to lower portions of rear posts 34, 36 adjacent to the rear wheel assemblies 22, 24. Support member 48 is straight, tubular, and formed of a metal. An axis of support member 48 is disposed at a right angle to an axis of rear post 34 and at a right angle to an axis of rear post 36.

An uppermost U-shaped support member 50 fixes apart rear posts 34, 36 by being fixedly engaged by a pin to intermediate portions of the rear posts 34, 36. Support member 50 is tubular and formed of a metal. Support member 50 includes a base section or lateral support member 52 that is straight and that includes a straight axis that is disposed rearwardly of a straight vertical axis of rear posts 34, 36. The straight axis of base section 52 is also adjacent to and disposed rearwardly of rearmost vertical edges of rear posts 34, 36. The height of base section 52 is the height of the of base section 42. Base section 52 includes removable frame section 192 or 378.

Support member 50 includes a first frontwardly extending straight section 54 and a second rearwardly extending straight section 56 that extend parallel to each other and at a right angle to base section 52. Straight section 54 is disposed at a right angle relative to rear post 34 and straight section 56 is disposed at a right angle relative to rear post 36. Straight section 54 is fixedly engaged by the forementioned pin to the intermediate portion of rear post 34 and straight section 56 is fixedly engaged by the forementioned pin to the intermediate portion of rear post 36. U-shaped support member 50 also defines the first plane defined by U-shaped support member 40 such that U-shaped support members 40 and 50 are co-planar.

Figure 3:
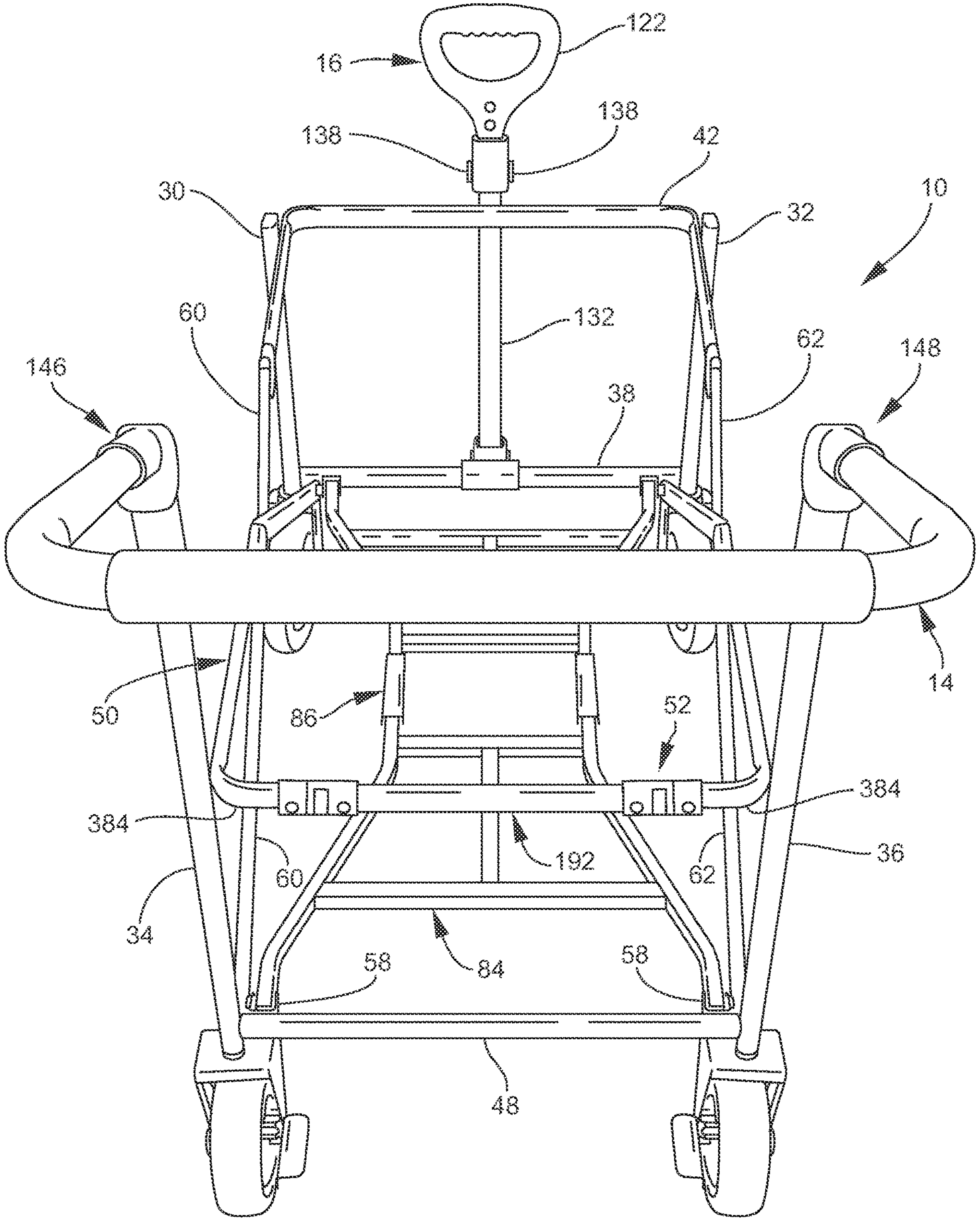
FIG. 3 is a rear perspective view of the wagon of FIG. 1.

As shown in FIG. 3, a first U-shaped metal piece 58 is fixedly engaged to the left outer end portion of the rear lower transverse member 48 adjacent to the rear post 34. As shown in FIG. 1, frame 12 includes a rearwardly and downwardly extending oblique straight support member 60 engaged between a rearwardmost end of frame section 44 and the first U-shaped piece 58. Oblique support member 60 includes a rearmost end and this end is engaged not in the first U-shaped piece 58 but to an outer plate of the first U-shaped piece 58 to confront an outer face of such outer plate of the first U-shaped piece 58.

As shown in FIG. 3, a second U-shaped metal piece 58 is fixedly engaged to the right outer end portion of the rear lower transverse member 48 adjacent to the rear post 36. As shown in FIG. 1, frame 12 includes a rearwardly and downwardly extending oblique straight support member 62 engaged between a rearwardmost end of frame section 46 and the second U-shaped piece 58. Oblique support member 62 includes a rearmost end and this end is engaged not in the second U-shaped piece 58 but to an outer plate of the second U-shaped piece 58 to confront an outer face of such outer plate of the second U-shaped piece 58.

Figure 6:
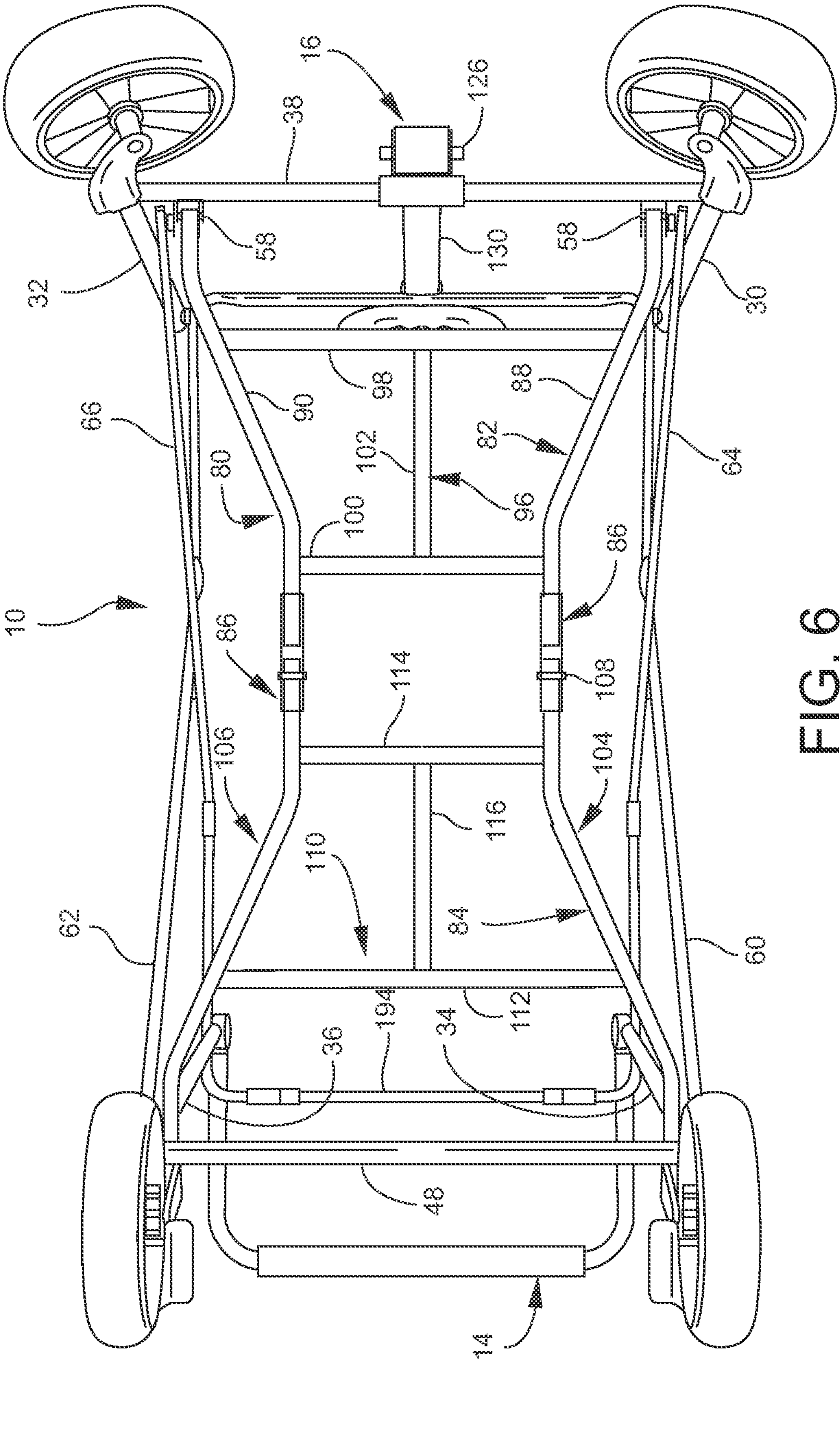
FIG. 6 is a bottom perspective view of the wagon of FIG. 1.

As shown in FIG. 6, a third U-shaped metal piece 58 is fixedly engaged to the left outer end portion of the front lower transverse member 38 adjacent to the front post 30. As shown in FIG. 1, frame 12 includes a frontwardly and downwardly extending oblique straight support member 64 engaged between a frontmost end of frame section 54 and the third U-shaped piece 58. Oblique support member 64 includes a frontmost end and this end is engaged not in the third U-shaped piece 58 but to an outer plate of the third U-shaped piece 58 to confront an outer face of such outer plate of the third U-shaped piece 58.

As shown in FIG. 6, a fourth U-shaped metal piece 58 is fixedly engaged to the right outer end portion of the front lower transverse member 38 adjacent to the front post 32. As shown in FIG. 1, frame 12 includes a frontwardly and downwardly extending oblique straight support member 66 engaged between a frontmost end of frame section 56 and the fourth U-shaped piece 58. Oblique support member 66 includes a frontmost end and this end is engaged not in the fourth U-shaped piece 58 but to an outer plate of the fourth U-shaped piece 58 to confront an outer face of such outer plate of the fourth U-shaped piece 58.

Between oblique support member 60 and frame section 44 is a pivot assembly 68 such that oblique support member 60 and frame section 44 can pivot relative to each other. Between oblique support member 62 and frame section 46 is a pivot assembly 70 such that oblique support member 62 and frame section 46 can pivot relative to each other. Between oblique support member 64 and frame section 50 is a pivot assembly 72 such that oblique support member 64 and frame section 50 can pivot relative to each other. Between oblique support member 66 and frame section 56 is a pivot assembly 74 such that oblique support member 66 and frame section 56 can pivot relative to each other.

An intermediate portion of oblique support member 60 is pivotally engaged to an intermediate portion of oblique support member 62 by a pivot pin 76. An intermediate portion of oblique support member 62 is pivotally engaged to an intermediate portion of oblique support member 66 by a pivot pin 78.

Rearmost end of oblique support member 60 is pivotally engaged to the first U-shaped piece 58 at the rear transverse support member 48. Rearmost end of oblique support member 62 is pivotally engaged to the second U-shaped piece 58 at the rear transverse support member 48. Frontmost end of oblique support member 64 is pivotally engaged to the third U-shaped piece 58 at the front transverse support member 38. Frontmost end of oblique support member 66 is pivotally engaged to the fourth U-shaped piece 58 at the front transverse support member 38.

As shown in FIGS. 1 and 6, frame 12 includes a bottom frame portion 80 that includes a first or front frame unit 82 and a second or rear frame unit 84. Front and rear frame units 82, 84 are engaged by first and second channel connectors 86.

Front frame unit 82 is engaged between the third and fourth U-shaped pieces 58 and the first and second channel connectors 86. Third and fourth U-shaped pieces 58 extend rearwardly from the front transverse support member 38. Front frame unit 82 includes first and second outer frame members 88 and 90. Each of the first and second outer frame members 88 and 90 is pivotally engaged in one of the third and fourth U-shaped pieces 58, then extends straight rearwardly, then extends obliquely inwardly, and then extends straight rearwardly where each of the first and second frame members 88, 90 is fixedly engaged with first and second pins 92, 94 to one of the channel connectors 86. Front frame unit 82 includes an H-shaped sub-unit 96 having a straight front transverse support member 98, a straight rear transverse support member 100, and a straight central longitudinally extending support member 102 that is fixedly engaged such as by welding to front and rear transverse members 98, 100. The outermost ends of front transverse support member 98 are fixedly engaged such as by welding to oblique sections of support members 88, 90. The outermost ends of rear transverse support member 100 are fixedly engaged such as by welding to rear straight sections of support members 88, 90. Support members 88, 90, 98, 100, and 102 are tubular, formed of metal, and co-planar such that unit 82 defines a plane.

Rear frame unit 84 is engaged between the first and second U-shaped pieces 58 and the first and second channel connectors 86. First and second U-shaped pieces 58 extend frontwardly from the rear transverse support member 48. Rear frame unit 84 includes first and second outer frame members 104 and 106. Each of the first and second outer frame members 104 and 106 is pivotally engaged in one of the first and second U-shaped pieces 58, then extends straight frontwardly, then extends obliquely inwardly, and then extends straight frontwardly where each of the first and second frame members 104, 106 is pivotally engaged with pivot pin 108 to one of the channel connectors 86. Rear frame unit 84 includes an H-shaped sub-unit 110 having a straight rear transverse support member 112, a straight front transverse support member 114, and a straight central longitudinally extending support member 116 that is fixedly engaged such as by welding to rear and front transverse members 112, 114. The outermost ends of rear transverse support member 112 are fixedly engaged such as by welding to oblique sections of support members 104, 106. The outermost ends of front transverse support member 114 are fixedly engaged such as by welding to front straight sections of support members 104, 106. Support members 104, 106, 112, 114, and 114 are tubular, formed of metal, and co-planar such that unit 84 defines a plane. Sub-units 82, 84 are coplanar when the wagon 10 is in the open and operating position shown in FIG. 1. Sub-units 82 and 84 are disposed obliquely relative to each other when in the compact and folded position shown in FIGS. 32 and 33.

As shown in FIG. 6, the rearmost ends of front sub-unit 82 are spaced from the frontmost ends of rear sub-unit 84. In other words, the rearmost ends of outer support members 88, 90 are spaced from the frontmost ends of outer support member 104, 106 when the wagon 10 is in the open and operating position shown in FIGS. 1 and 6. When in the open and operating position, the structure of the channel connectors 86 permit an upward lifting of the channel connectors 86 where rear sub-unit 84 pivots relative to the channel connectors 86 but where front sub-unit 82 remains fixedly engaged to the channel connectors 86. The structure of the inverted U-shaped channel connectors 86, including the upper plate sections 87 of the inverted U-shaped channel connectors 86 coming to bear weight upon the upper plate sections of the frontmost ends of outer support members 104, 106, prevent the U-shaped connectors 86 to be pressed downwardly beyond the plane defined by the sub-units 82, 84, thereby keeping the sub-units 82, 84 in a common plane. Upper plate section 87 of the inverted U-shaped channel connector 86 is shown in FIG. 29A.

As shown in FIGS. 1, 2, 4, and 6, handle 16 includes a proximal end 118 that is engaged to the front lower transverse member 38 and a distal end 120 where the handle 16 includes a looped handle grip 122. Proximal end 118 is engaged in a block receiver 119 that is in turn engaged between ears 124 by a pivot pin 126. Ears 124 are fixedly engaged to a piece 128 that in turn is fixed at a central location to and about or around the front lower transverse member 38. Pivot pin 126 includes an axis that is parallel to an axis of the front lower transverse member 38. Handle 16 pivots up and down about the horizontal axis of the pivot pin 126 such that handle grip 122 can hit the ground and such that a handle shaft 130 of the handle 16 can hit a central location of the transverse frame section 42 of the U-shaped support member 40. Pivot pin 126 frictionally engages the ears 124 to the block receiver 119 such that the block receiver 119 frictionally pivots up and down with the shaft 130 such that the shaft 130 can stop at any location without falling to the ground under the influence of gravity. In other words, such a friction fit has a tightness that is sufficiently great to overcome the influence of gravity and that is sufficiently low to permit the user to easily pivot the shaft 130 up and down. In still other words, the handle grip 122 can be placed one inch above the ground and remain at such one inch location without falling to the ground.

Figure 2:
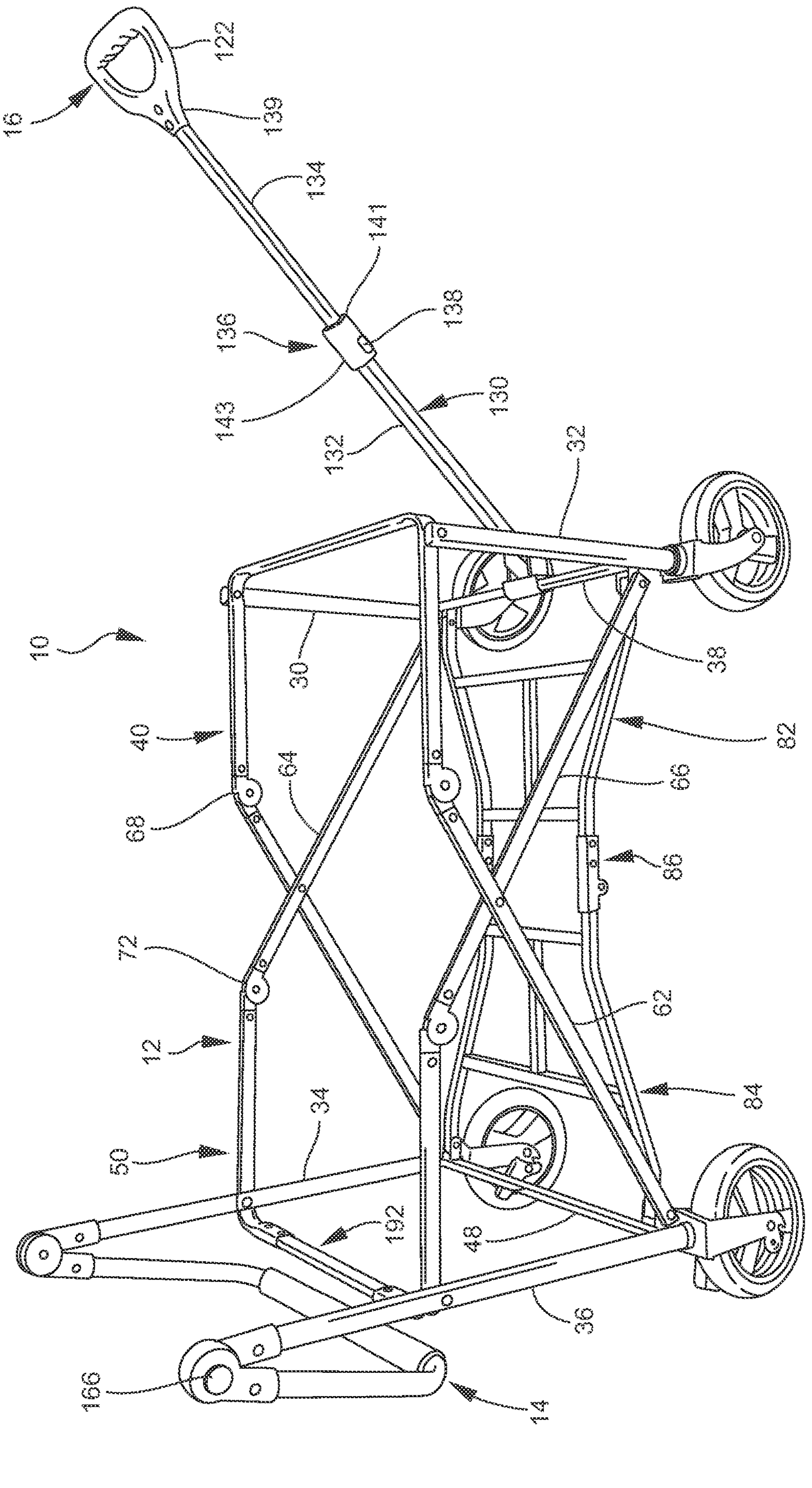
FIG. 2 is a side perspective view of the wagon of FIG. 1 and shows the rear handle tucked adjacent to the frame and the front handle lengthened and extending away from the frame.

FIG. 2 shows that handle shaft 130 includes two shaft portions 132, 134 such that handle shaft 130 is telescoping. Shaft portion 134 is slideable axially in shaft portion 132. From a retracted position shown in FIG. 1, without pushing button 138, shaft portion 134 is slideable outwardly to the extended position shown in FIG. 2. Shaft portion 134 automatically locks upon reaching the extended position shown in FIG. 2. Such locking at the extended position is provided by spring biased button assembly 136 shown in FIG. 2, where an inner spring biased detent portion pops inwardly into a detent hole formed in the proximal end of shaft 134.

To slide the shaft portion 134 from the extended position shown in FIG. 2 to the retracted position shown in FIG. 1, the user presses button 138 to resiliently draw the detent out of the detent hole to unlock the button assembly 136. At the same time the user pushes the handle grip 122 inwardly to slide the shaft portion 134 axially inwardly until a base 139 of the handle grip 122 hits an outermost portion 141 of a housing 143 of the button assembly 143, which housing 143 is fixedly engaged to shaft portion 132. When the base 139 of the handle grip 122 hits the outermost portion 141 of the housing 143, this is the retracted position and this retracted position is an unlocked position such that, when the user wishes to pull the pet wagon 10, the user does not need to interact with the button assembly 136 because the shaft portion 134 simply slides out of shaft portion 132 until the extended locked position of FIG. 2 is attained. One reason for not providing a lock at the retracted position is that this position is too close to the front end of the pet wagon 10. In other words, if an adult pulled the pet wagon 10 with the handle at the retracted position, the front end of the pet wagon 10 may hit the heels of the adult pulling on the pet wagon 10. In still other words, the extended position provides sufficient space between the front end of the pet wagon 10 and an adult with his or her hand on the grip 122, while the retracted position provides insufficient space.

Shaft portion 134 is not spinnable relative to shaft portion 132 such that, when pulled, handle grip 122 does not spin. Shaft portion 134 is oblong in section, a section that is transverse or perpendicular to the common axes of the shafts 132 and 134, and includes a width and height only slightly less than the width and height of oblong shaft portion 132 such that a rotation or spinning of oblong shaft portion 134 relative to oblong shaft portion 132 does not occur.

As shown in FIG. 3, button assembly 136 includes first and second buttons 138. To retract shaft 134 into shaft 132, both buttons 138 must be depressed at the same time. Buttons 138 can be depressed at the same time by a squeezing action between the thumb and first finger. In other words, an interior of the button assembly 136 includes first and second spring biased detents that snap into detent holes on opposite sides of the shaft 134 when the shaft is in the extended position of FIG. 2. Pushing on buttons 138 resiliently draws the detents out of the detent openings, whereupon the detents slide on the outside of the shaft 134 as the shaft 134 is pushed into shaft 132. The detents do not snap back into any other holes until the shaft 134 returns to the extended position, i.e., makes a round trip back to the extended position shown in FIG. 2.

Push handle 14 is U-shaped and includes a first outer straight tubular handle portion 140 that is pivotally engaged to the topmost portion of rear post 34. Push handle 14 includes a second outer straight tubular handle portion 142 that is pivotally engaged to the topmost portion of rear post 36. Push handle 14 further includes a straight transverse tubular handle portion 144 that connects the outer handle portions 140, 142. Handle portion 144 is shown in FIG. 1 by breaking away a cylindrical resilient foam grip 145 on the tubular handle portion 144. Grip 145 is nonrotatably engaged on the tubular handle portion 144 such that grip 145 does not spin about an axis of tubular handle portion 144. Grip 145 is nonslidingly engaged on tubular handle portion 144 such that grip 145 does not slide axially on tubular handle portion 144. On one side grip 145 extends axially to be adjacent to a far end of straight handle portion 140. On the other side grip 145 extends axially to be adjacent to a far end of straight handle portion 142. Grip 145 may be adhesively engaged to straight handle portion 142.

A first button assembly 146 connects the rear post 34 to handle portion 140. A second button assembly 148 connects the rear post 36 to the handle portion 140. As to first and second button assemblies 146, 148, U.S. Nonprovisional patent application Ser. No. 18/513,555 filed Nov. 18, 2023 is hereby incorporated by reference in its entirety into this application.

First button assembly 146 includes a lower sleeve 150 that receives an uppermost portion of post 34 and second button assembly 148 includes a lower sleeve 150 that receives an uppermost portion of post 36. First button assembly 146 includes a sleeve 152 that receives handle portion 140. Second button assembly 148 includes a sleeve 152 that receives handle portion 142. Post 34 is fixed in sleeve 150 of first button assembly 146 by a pin 154. Post 36 is fixed in sleeve 150 of second button assembly 148 by a pin 156. Handle portion 140 is fixed in sleeve 152 of the first button assembly 146 by pin 158. Handle portion 142 is fixed in sleeve 152 of second button assembly 148 by pin 160.

Figure 4:
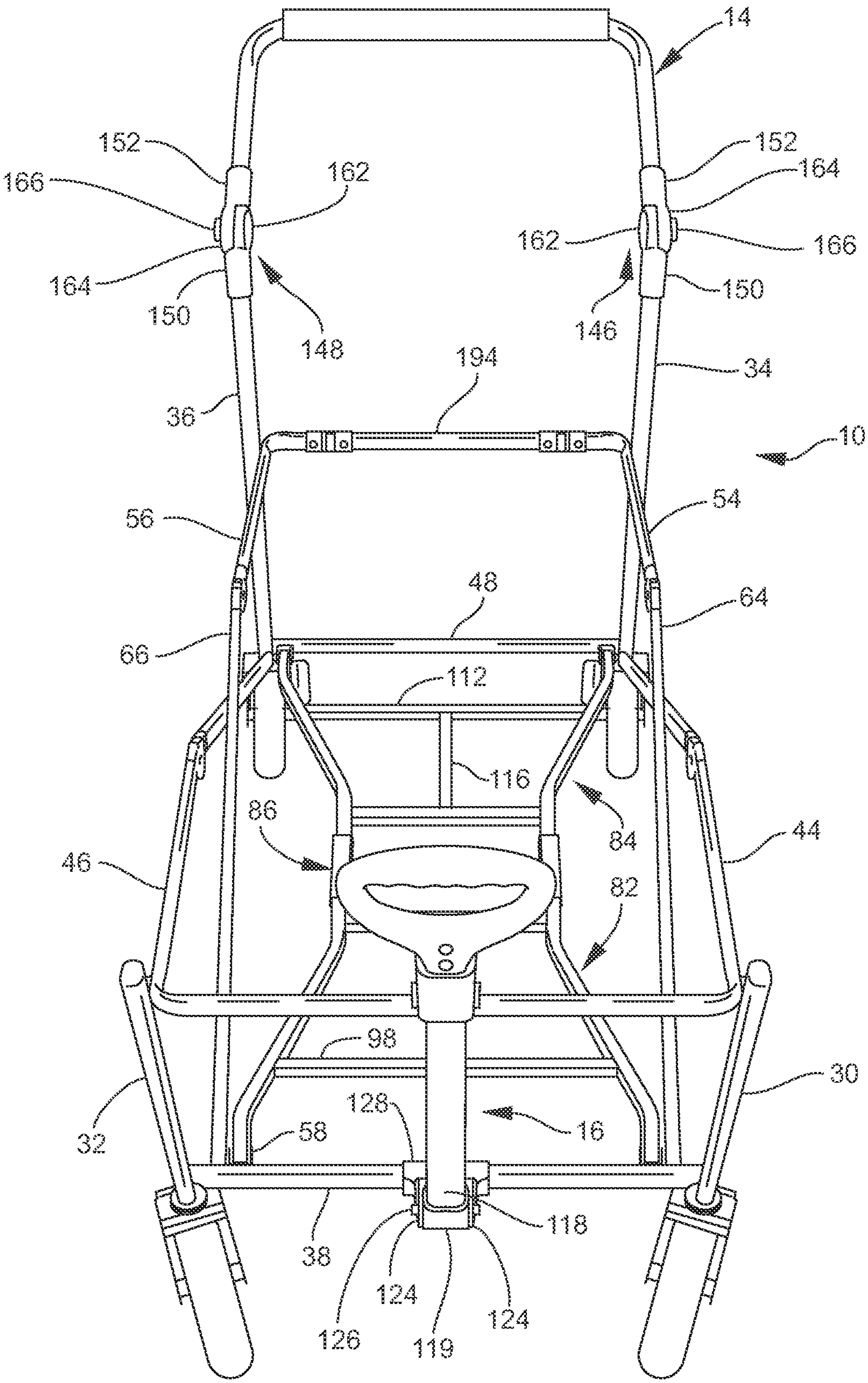
FIG. 4 is a front perspective view of the wagon of FIG. 1.
Figure 5:
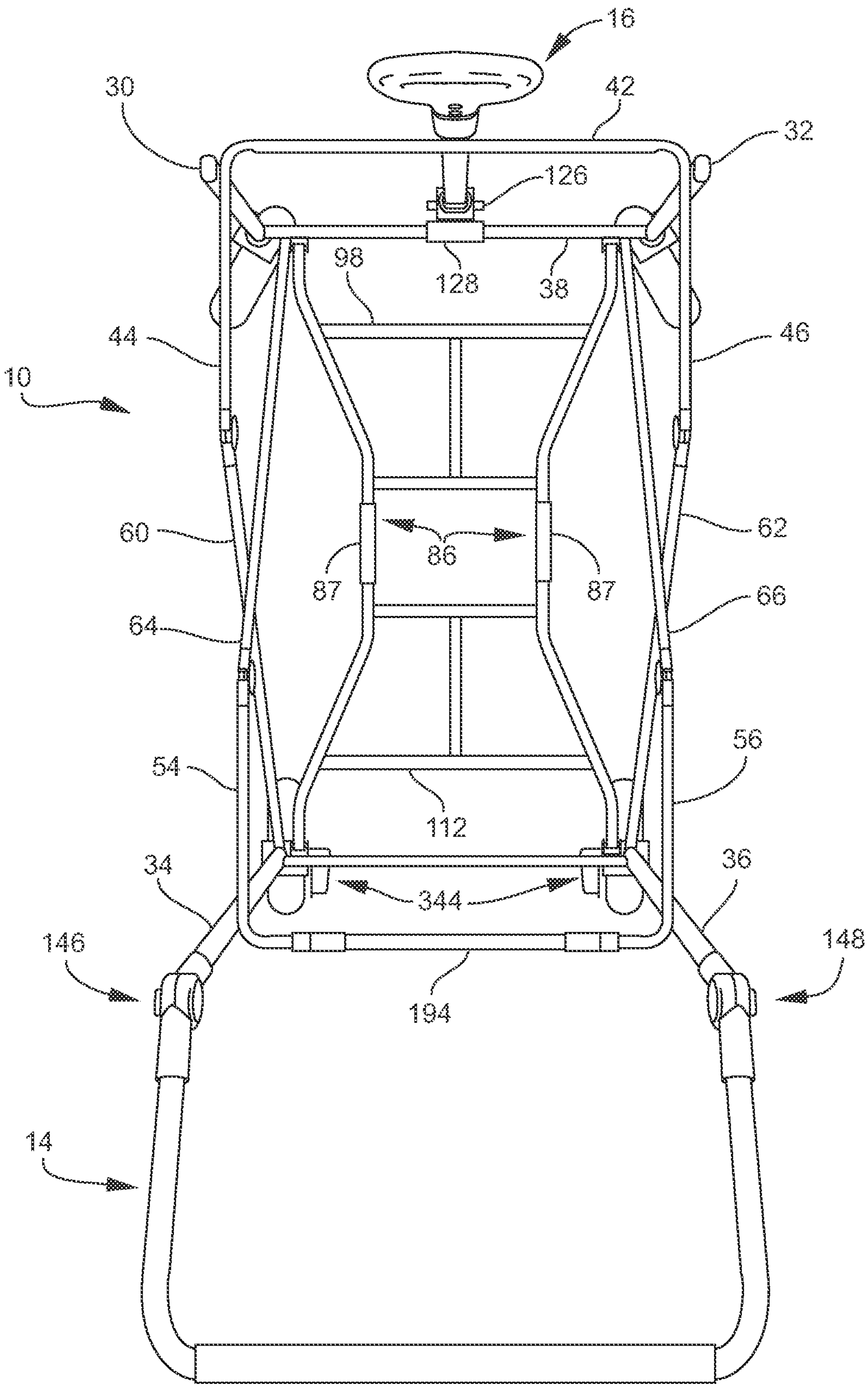
FIG. 5 is a top perspective view of the wagon of FIG. 1.

As shown in FIG. 4, sleeve 150 of each of the first and second button assemblies 146, 148 includes an integral and inner disk shaped portion 162. Sleeve 152 of each of the first and second button assemblies 146, 148 includes an integral and outer disk shaped portion 164. Inner disk shaped portion 162 engages outer disk shaped portion 164 and a button 166 on each of the outer disk shaped portions 164 when pressed inwardly disengages the inner disk shaped portion 162 from the outer disk shaped portion 164 such that each of the buttons 166 must be pressed inwardly to rotate push handle 14 relative to the posts 34, 36.

Figure 28:
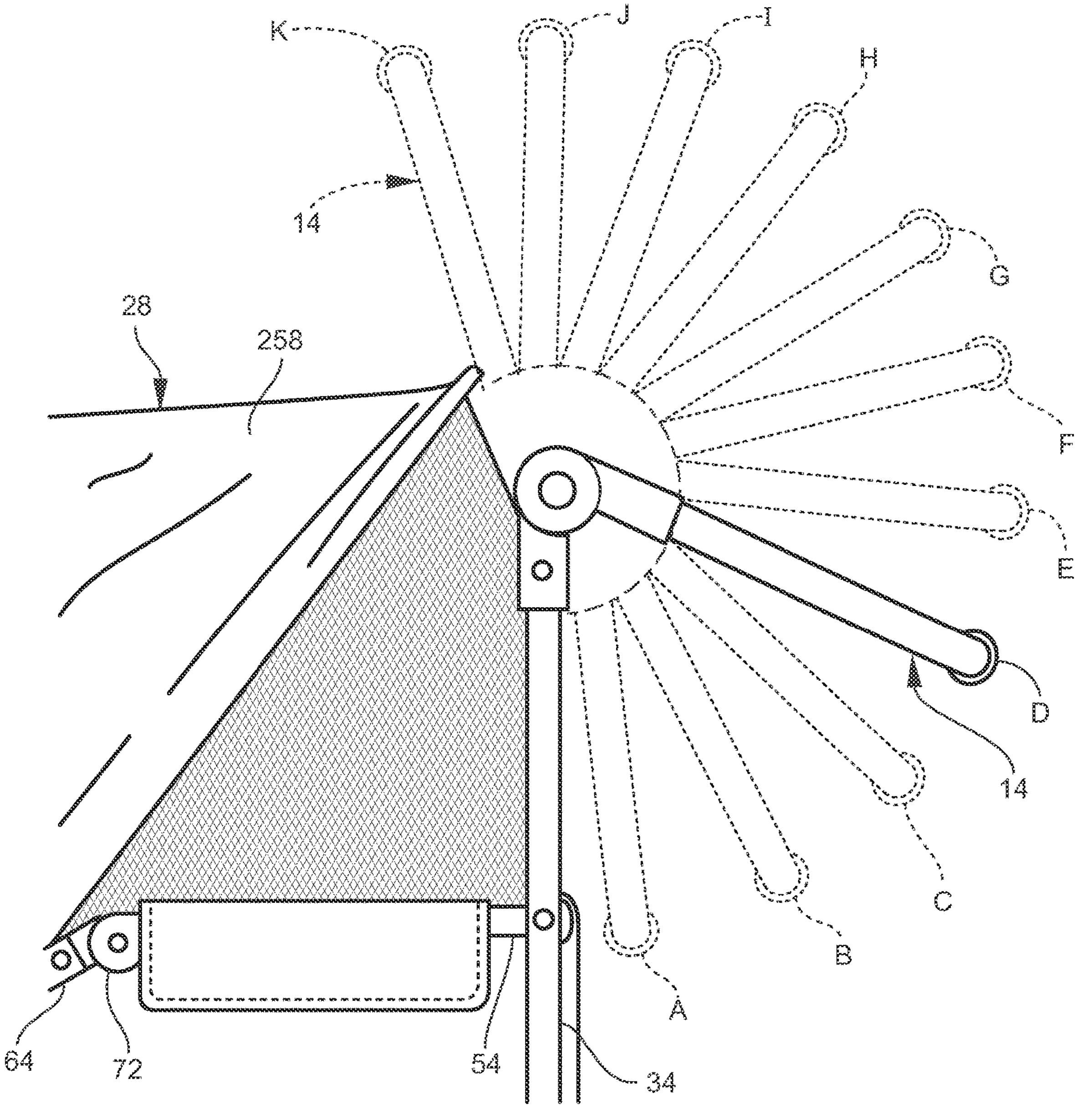
FIG. 28 is a diagrammatic view of a rear portion of the wagon of FIG. 17, showing that the rear handle may be pivoted to one of many positions.
Figure 30B:
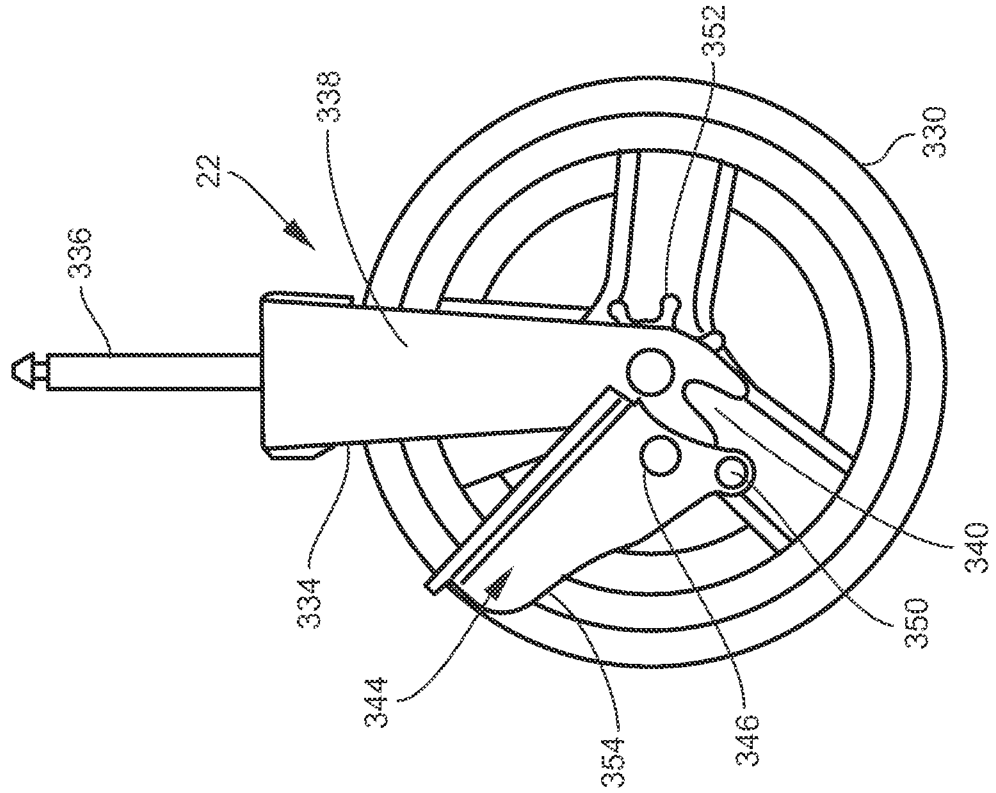
FIG. 30B shows a detail isolated view of a rear wheel, with a lock of the rear wheel being in an unlocked position.
Figure 30A:
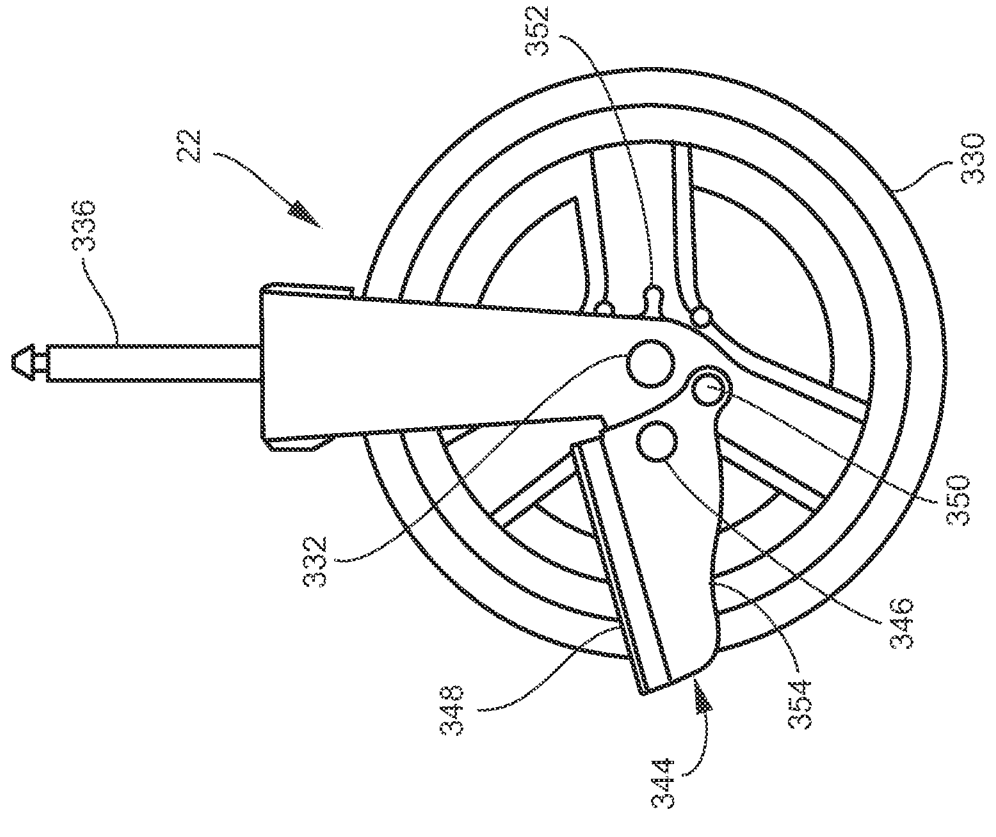
FIG. 30A shows a detail isolated view of a rear wheel, with a lock of the rear wheel being in a locked position.

As shown in FIG. 28, upon pressing both buttons 166 at the same time and keeping the buttons 166 pressed in, handle 14 may be rotated from position A to any of the positions B, C, D, E, F, G, H, I, J, K. For example, to rotate from position A to position B, the buttons 166 are pressed in to unlock the button assemblies 146, 148 from position A, and then once the handle 14 has been rotated out of and away from position A the buttons 166 may be released and the handle 14 may continue to rotate. Then, as to the handle 14 moves into position B, the button assemblies 146, 148 automatically lock at position B. To rotate from position A to position G, the buttons 166 are pressed in to unlock the button assemblies 146, 148 from position A, and then once the handle 14 has been rotated away from position A pressure is maintained on the buttons 166 to keep the buttons 166 in an unlocked state as the handle 14 passes positions B, C, D, E, and F without automatically locking at such positions. Then, once the handle is past position F, the pressure from the buttons 166 may be released to put the button assemblies '46 in a lockable state. Then, when the handle 14 is rotated to position G, the button assemblies 146, 148 automatically lock at position G. Handle 14 may be fixed at any of such positions A through K by the steps of pressing the buttons 166, maintaining the pressure on the buttons 166 until the handle 14 is past a certain adjacent position, and then releasing the pressure upon the buttons 166 when the handle 14 is past an adjacent position and is approaching or at the desired position, whereupon the button assemblies 146, 148 automatically lock at the desired position. It can be noted that position K is forwardly of a plane defined by rear posts 34, 36, that position J in co-planar with the plane defined by rear posts 34, 36, and that position A is adjacent to the plane defined by rear posts 34, 36. At any of the positions A through K, a pushing force by a user upon the handle 14 at the tubular straight section 144 translates into a pushing force upon the posts 34, 36, which in turn translates into a pushing force to push the wagon 10.

The horizontal lateral axis about which handle 14 rotates is parallel to the horizontal lateral axis about which handle 16 rotates. Such axis of handle 14 is disposed at a greater height than such axis of handle 16. Such axis of handle 14 is disposed above the altitude of the plane defined by frame sections 44, 46, 54, and 56 and such axis of handle 16 is disposed below the altitude of the plane defined by frame sections 44, 46, 54, and 56.

FIGS. 7, 8, 9, 10, and 11 show the flexible receptacle 26. Flexible receptacle 26 is formed of a flexible sheeting material such as nylon or canvas such that the flexible receptacle 26 can fold as the frame 12 is folded from the operating and folded out position of FIG. 1 to the compact position or state of FIGS. 32 and 33.

Flexible receptacle 26 includes a first sidewall 168, a second sidewall 170, a front wall 172, a rear wall 174, and a floor 176. The receptacle 26 is engaged in the frame 12 such that outer surfaces of the main sections of the first sidewall 168, second sidewall 170, front wall 172, rear wall 174, and floor 176 confront inner portions of the frame 12. Receptacle 26 when in the frame 12 when the frame is in the open and operating position of FIG. 1 takes the form of a parallelepiped where the sixth side to the parallelepiped is an open top defined by top most edges of the first sidewall 168, second sidewall 170, front wall 172 and rear wall 174.

Figure 10:
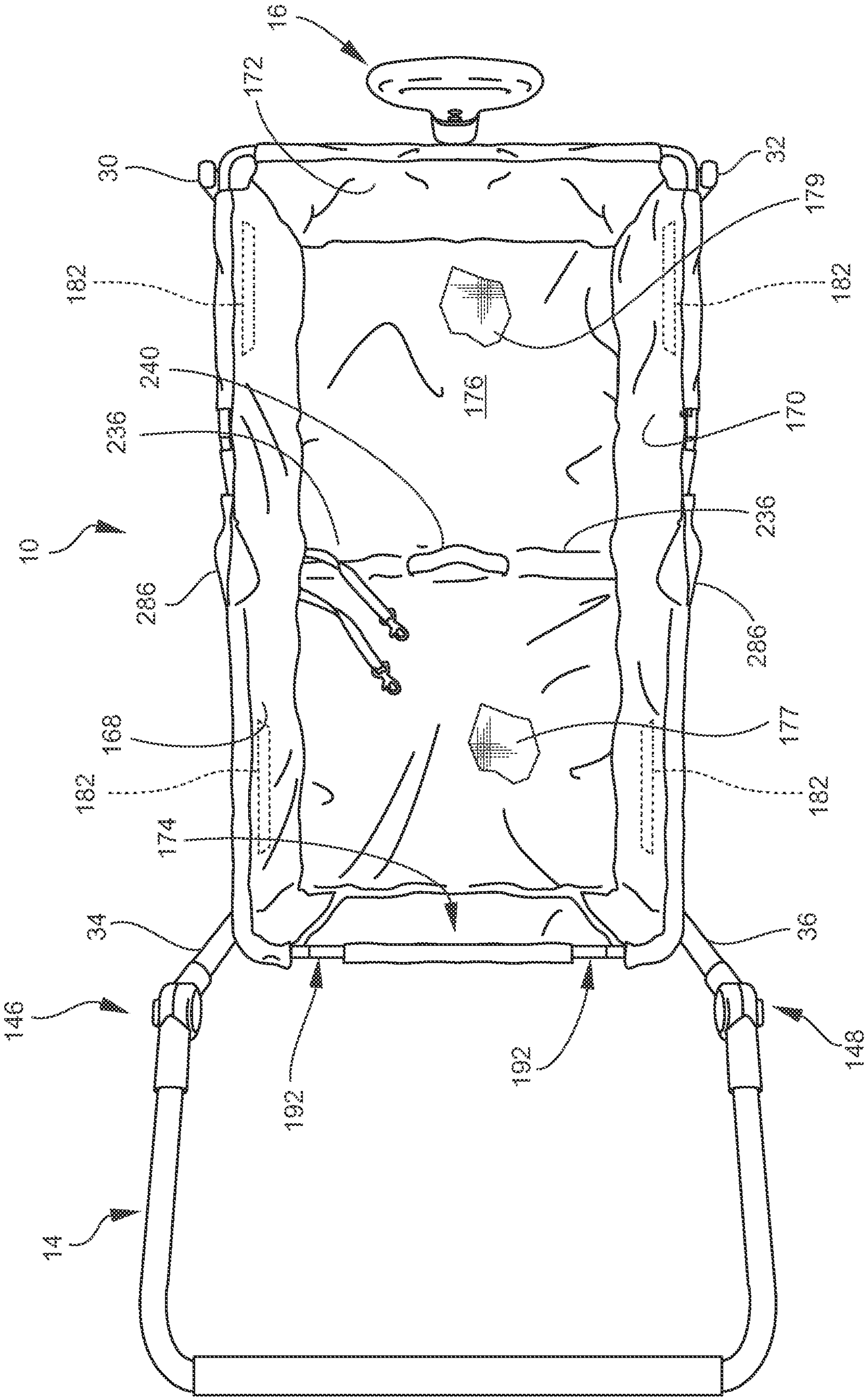
FIG. 10 is a top perspective view of the wagon of FIG. 7 partially broken away to show floor panels engaged in the floor.

As shown in FIG. 10, floor 176 includes first and second panels 177, 179. Floor 176 includes upper and lower layers of a flexible sheeting material such as fabric with first and second panels 177, 179 sandwiched between such upper and lower layers. Each of the panels 177, 179 is relatively rigid and may be wood or formed of an engineered wood product. Each of the first and second panels 177, 179 is engaged in a respective pocket of the floor 176. The pocket for first panel 177 is formed by rear wall 174, first and second sidewalls 168, 170, and rear stitch line 236. The pocket for second panel 179 is formed by front wall 172, first and second sidewalls 168, 170, and front stitch line 236. Front and rear stitch lines 236 extend the width of the receptacle 26. First panel 177 is slightly less in width and length than its respective pocket such that movement of first panel 177 in its respective pocket is minimized. Second panel 179 is slightly less in width and length than its respective pocket such that movement of second panel 179 in its respective pocket is minimized. The provision of the front and rear stitch lines 236 between the first and second panels 177, 179 permits folding of the floor 176 when the pet wagon 10 is folded out from the collapsed and folded in form of FIG. 32 to the open and operating form of FIG. 7. First and second stitch lines 236 and the elongate transverse area therebetween define a hinge, with folding occurring along such stitch lines 236 and elongate transverse area.

As shown in FIG. 7, first and second sidewalls 168 and 170 are engaged to the frame 12 by front and rear sleeves 178, 180. Front sleeve 178 on one side of the receptacle 26 engages support member 44 and front sleeve 178 on the other side of the receptacle 26 engages support member 46. Rear sleeve 180 on one side of the receptacle 26 engages support member 54 and rear sleeve 180 on the other side of the receptacle 26 engages support member 56.

Each of the sleeves 178, 180 is a rectangular integral extension from receptacle 26 and, like receptacle 26, is formed of a flexible material such as nylon or canvas. The tube portion of the sleeves 178, 180, through which support members 44, 46, 54, 56 extend is formed by engaging a quick connect strip 182 on the outside of first and second sidewalls 168, 170 and by engaging an associated quick connect strip 184 on the inside of the sleeves 178, 180. For example, one strip of the quick connect strips 182, 184 may include a loop material and the other strip of the quick connect strips 182, 184 may include hook material, such as Velcro®.

Figure 9:
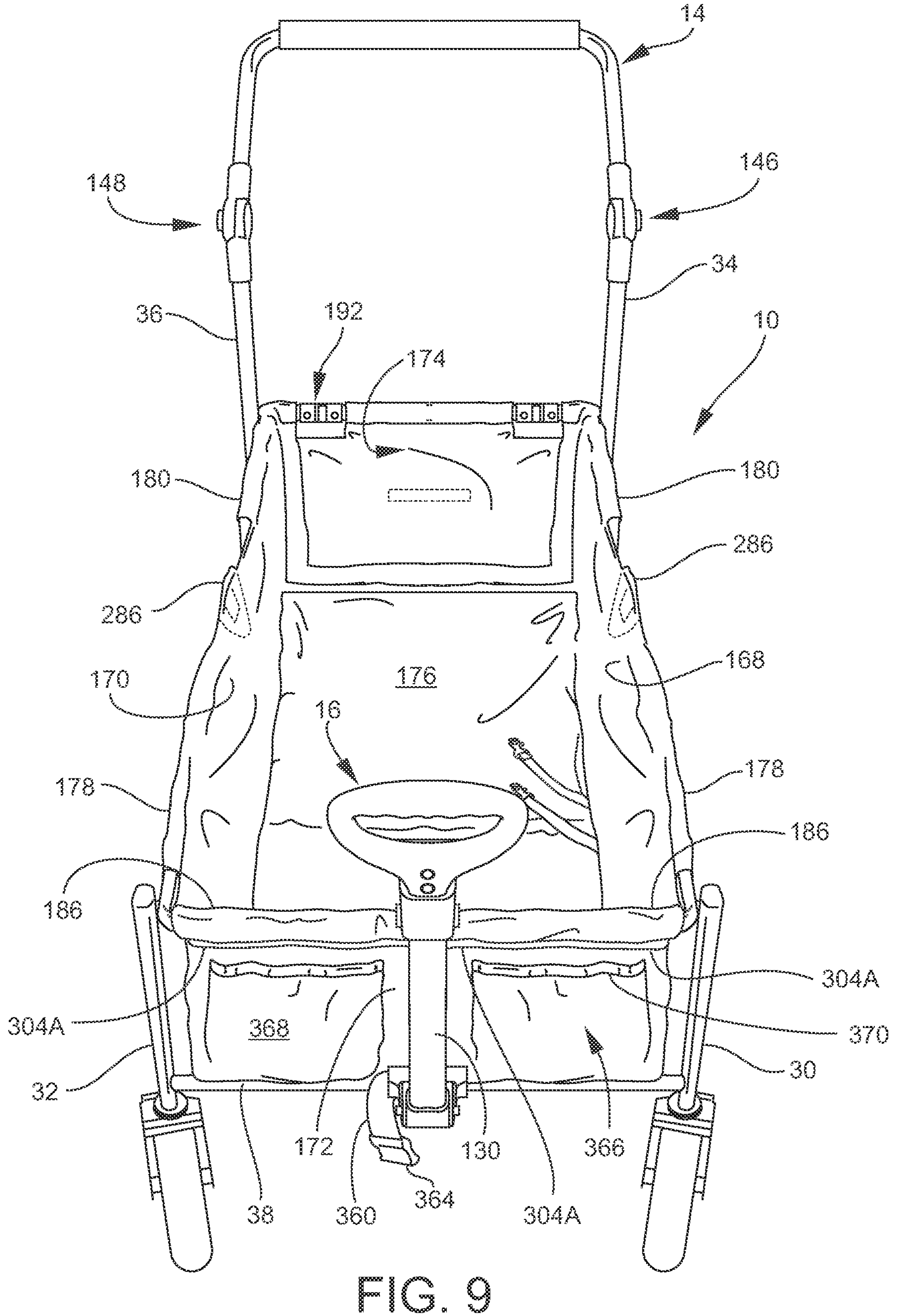
FIG. 9 is a front perspective view of the wagon of FIG. 7.
Figure 21:
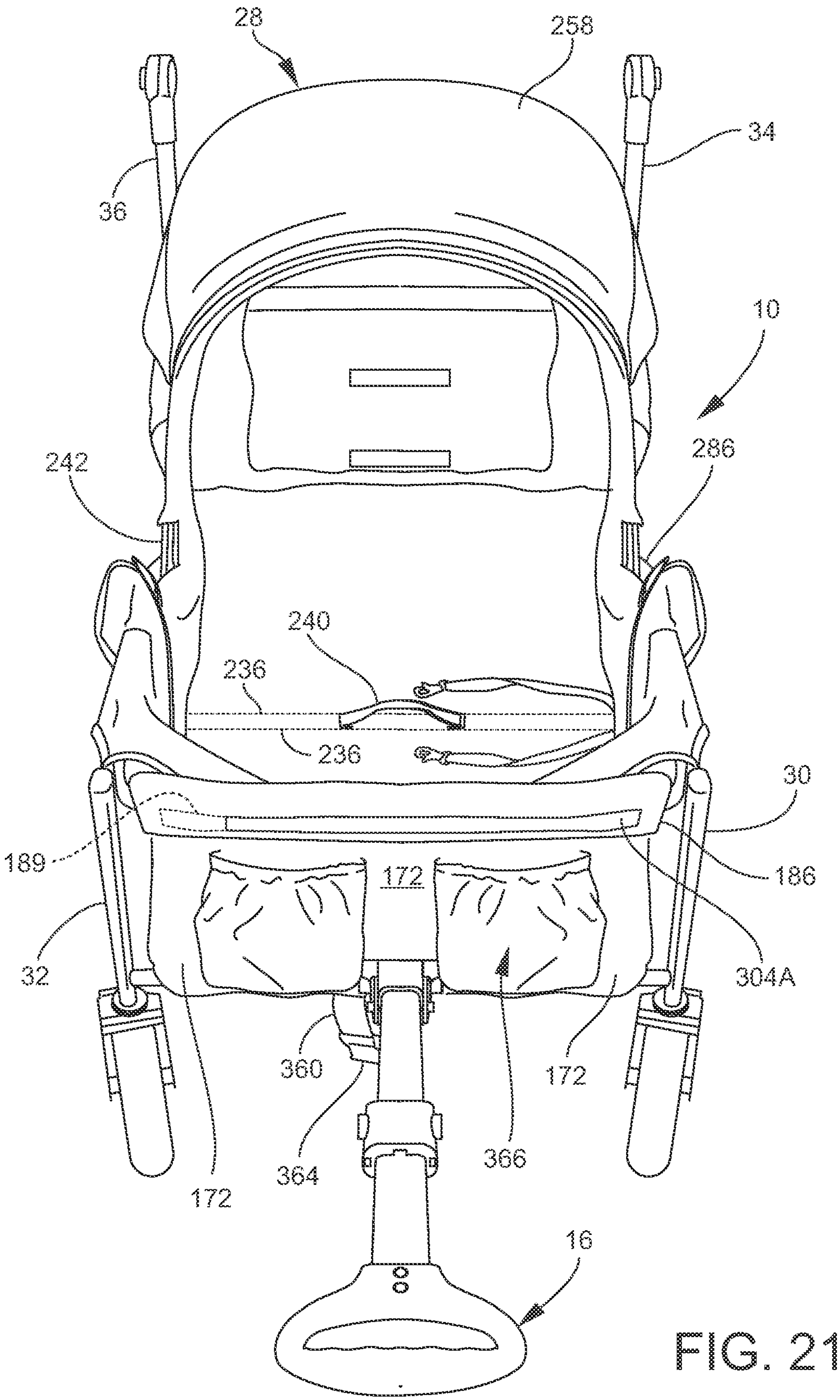
FIG. 21 is a front perspective view of the wagon of FIG. 16, showing a front of the canopy pivoted or folded back, and showing the front handle in a pulling position extended away from the frame of the wagon.
Figure 23A:
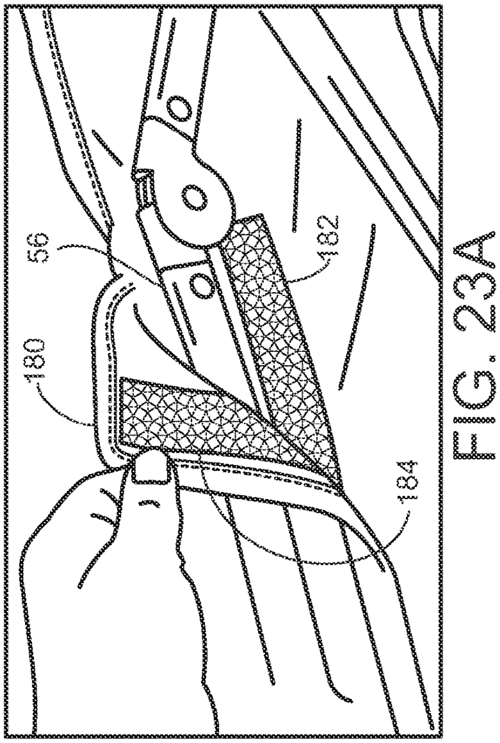
FIG. 23A is a perspective view of the wagon of FIG. 7 with a sleeve partially open to show engagement of the receptacle to a portion of the frame.
Figure 23B:
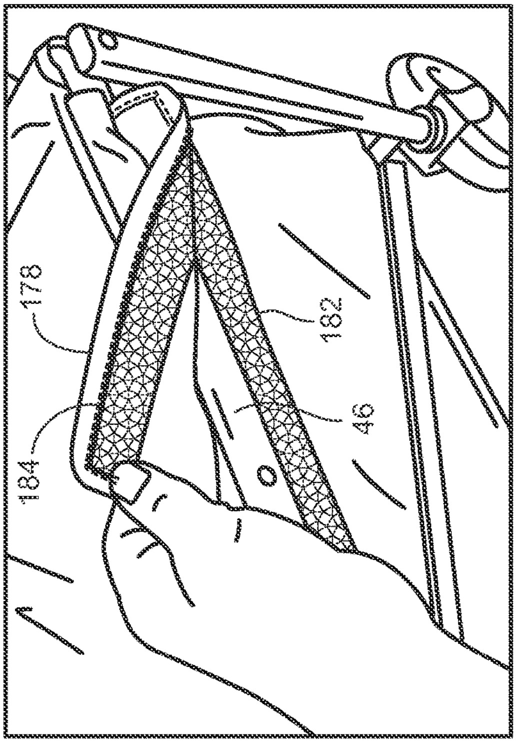
FIG. 23B is a perspective view of the wagon of FIG. 7 with a sleeve partially open to show engagement of the receptacle to a portion of the frame.
Figure 23C:
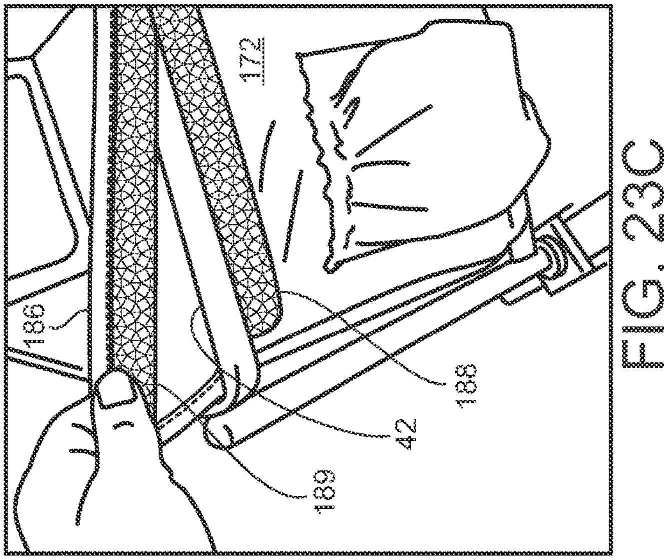
FIG. 23C is a perspective view of the wagon of FIG. 7 with a sleeve partially open to show engagement of the receptacle to a portion of the frame.

As shown in FIGS. 7 and 9, receptacle 26 includes a front end sleeve 186 that extends from the inside of the frame 12, over end support member 42, and down to the front face of front wall 172. Front end sleeve 186 engages end support member 42. Front end sleeve 186 is a rectangular integral extension from receptacle 26 and, like receptacle 26, is formed of a flexible material such as nylon or canvas. The tube portion of front end sleeve 186, through which support member 42 extends, is formed by engaging a quick connect strip 188 on the outside of front wall 172 with an associated quick connect strip 189 on the inside of sleeve 186, as shown in FIG. 23C. For example, one strip of the quick connect strips 188, 189 may include a loop material and the other strip of the quick connect strips 188, 189 may include a hook material, such as Velcro®. Quick connect strip 188 and its associated quick connect strip 189, shown in FIG. 21, may extend from a location adjacent to side 168 to a location adjacent to side 170. Such associated quick connect strip 189 is engaged, such as by sewing, to the far portion of sleeve 186 on the lower inside face of the integral rectangular extension of sleeve 186, as shown in FIG. 21.

Receptacle 26 includes a rear end sleeve 190 that engages a support member section 192 that is part of base section 52. Support member section 192 is part of the frame 12 and is part of the U-shaped support member 50. Support member section 192 is a removable portion of base support member section 52. Support member section 192 is shown in FIG. 29B and includes a tubular elongate piece 194 having pinned thereto at each end a plastic piece 196. Plastic piece 196 includes a slot 198 and an end tab 200. As shown in FIG. 24A, the corner portion of base support member section 52 includes a plastic piece 202 that is pinned thereto. Plastic piece 202 includes a slot 204 and an end tab 206. End tab 200 of tubular elongate piece 194 slides into slot 204. End tab 206 of the corner portion of base section 52 slides into slot 198 of tubular elongate piece 194. When support member section 192 is engaged in the corner portion of base section 52, support member section 192 may be engaged by rear end sleeve 190.

Figure 23D:
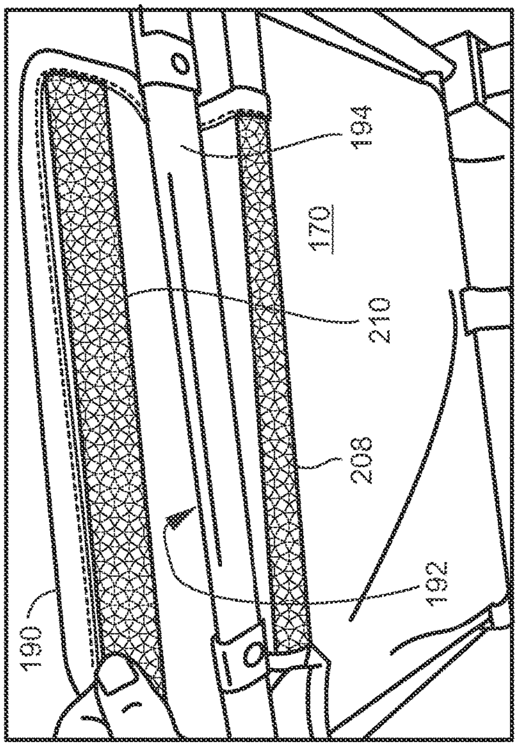
FIG. 23D is a perspective view of the wagon of FIG. 7 with a sleeve open to show engagement of the receptacle to a portion of the frame.

As shown in FIG. 23D, rear end sleeve 190 extends from the inside of the frame 12, over rear end support member section 192, and down to the rear face of rear wall 174. Rear end sleeve 190 engages rear end support member section 192. Rear end sleeve 190 is a rectangular integral extension from receptacle 26 and, like receptacle 26, is formed of a flexible material such as nylon or canvas. The tube portion of rear end sleeve 190, through which support member section 192 extends, is formed by engaging a quick connect strip 208 on the outside of rear wall 174 with an associated quick connect strip 210 on the inside of rear end sleeve 190. For example, one strip of the quick connect strips 208, 210 may include a loop material and the other strip of the quick connect strips 208, 210 may include a hook material, such as Velcro®.

As shown in FIG. 24A, receptacle 26 includes a base section sleeve 212 that includes two quick connect strips 214 and 216. Sleeve 212 extends from the inside of the frame 12, over the base section 52, and down to the rear face of rear wall 174. Base section sleeve 212 engages base section 52. Sleeve 212 is a rectangular integral extension from receptacle 26 and, like receptacle 26, is formed of a flexible material such as nylon or canvas. The tube portion of base section sleeve 212, through which corner portions of support member section base section 52 extend, is formed by engaging the quick connect strip 214 on the outside of rear wall 174 and by engaging the associated quick connect strip 216 on the inside of base section sleeve 212. For example, one strip of the quick connect strips 214, 216 may include a loop material and the other strip of the quick connect strips 214, 216 may include a hook material, such as Velcro®. There are first and second sleeves 212, with each sleeve 212 engaging one of the base sections 52.

Figure 8:
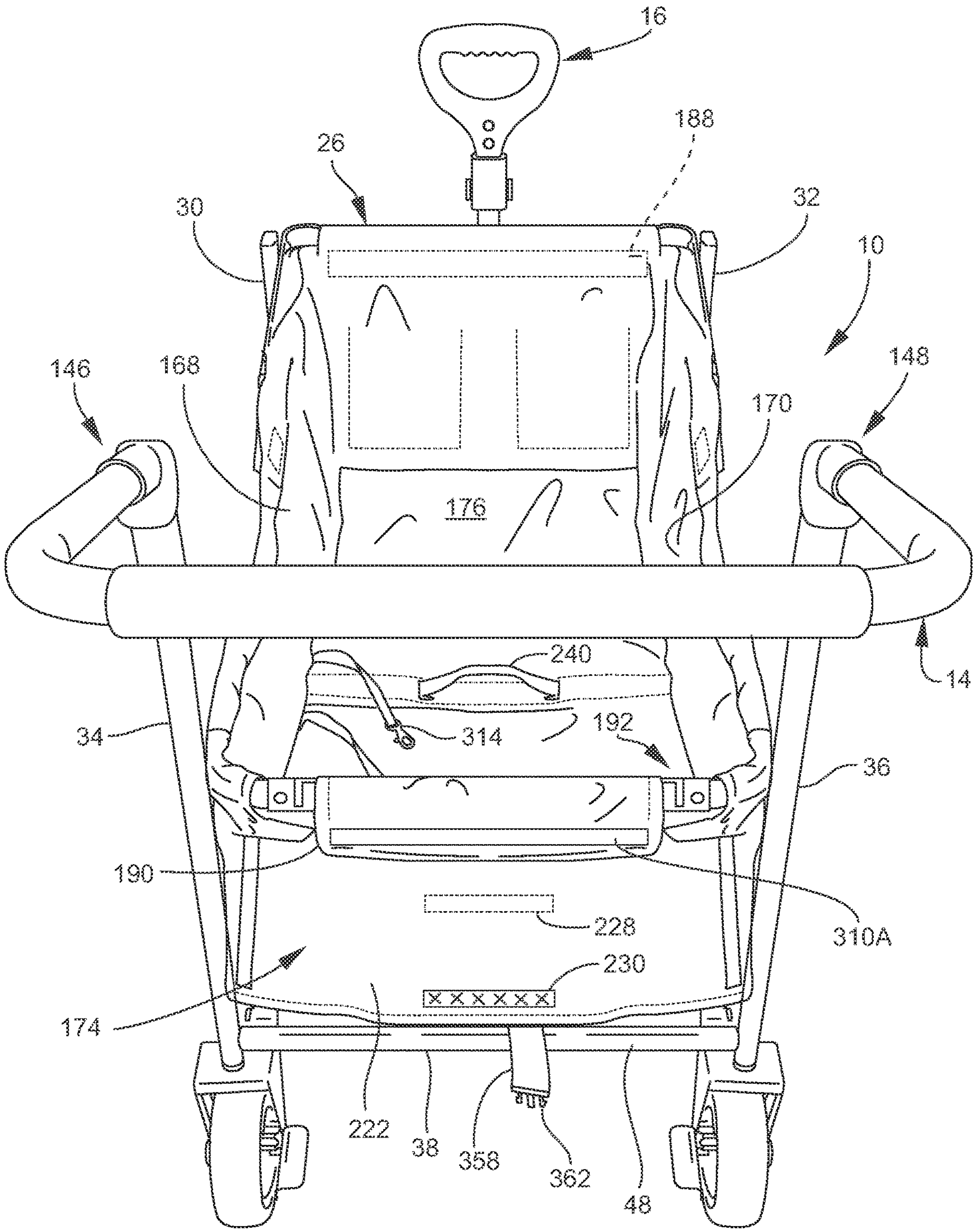
FIG. 8 is a rear perspective view of the wagon of FIG. 7.
Figure 25:
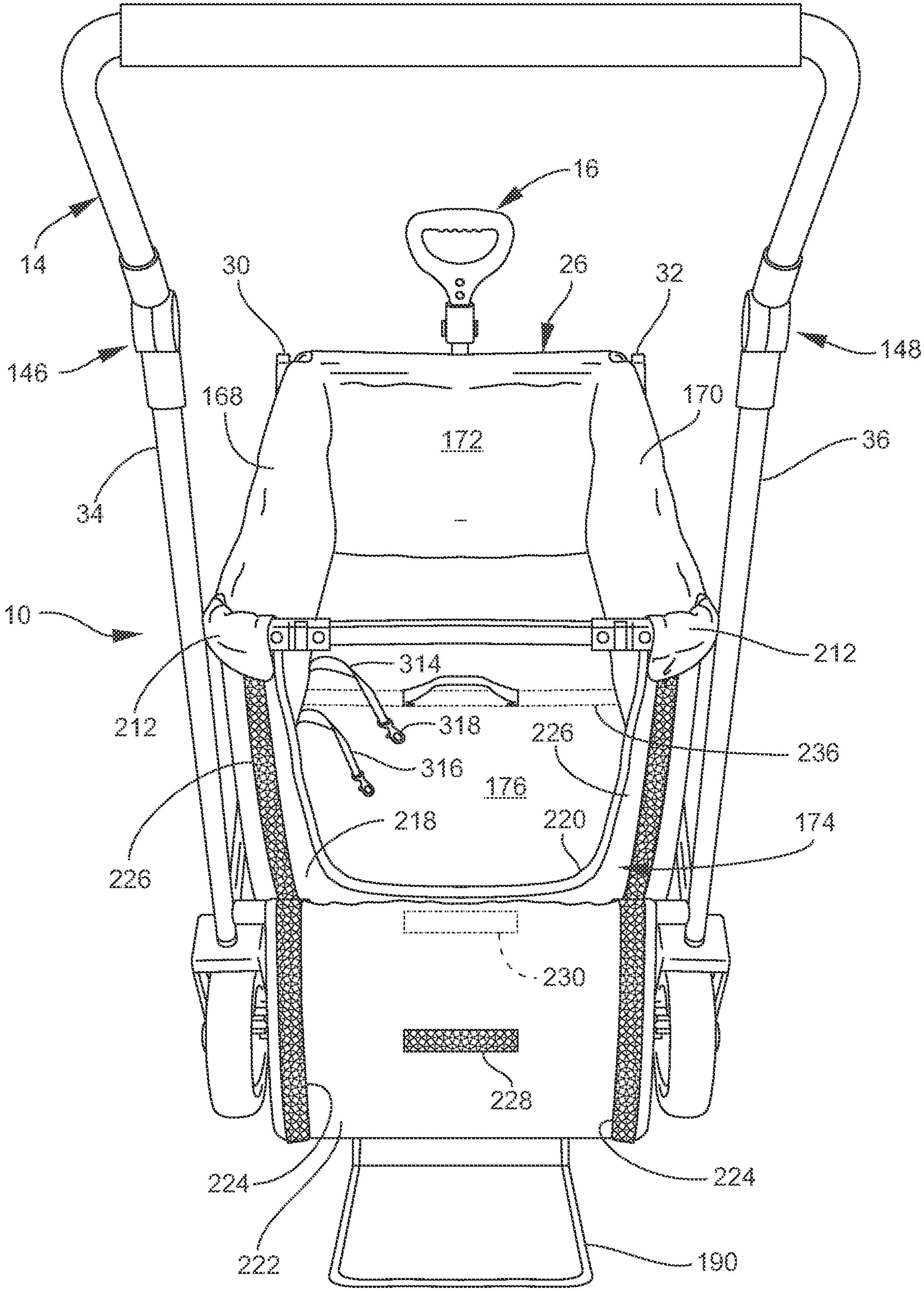
FIG. 25 is a rear perspective view of the wagon of FIG. 7, showing a rear panel of the receptacle open.

By comparing FIG. 8 with FIG. 25, it can be appreciated that rear wall 174 includes several layers of flexible material. FIG. 25 shows that rear wall 174 includes an inner U-shaped piece 218 that integrally extends from the floor 176, the first sidewall 168, and the second sidewall 170. Inner U-shaped piece 218 forms a U-shaped edge 220. Base section sleeves 212 are integral with inner U-shaped piece 218.

Rear wall 174 includes an outer piece 222 or rear door 222 of flexible material such as nylon or canvas. Outer piece 222 includes engaged thereto, such as by sewing or cut integrally from a base sheet material, sleeve 190 that engages removable frame section 192. Outer piece 222 is engaged, such as by being sewn, to a horizontally extending junction between floor 176 and inner U-shaped piece 218. This junction is disposed at the lower horizontal edge of inner U-shaped piece 218 and the rearmost horizontal edge of floor 176. Engaged to sides of the outer piece 222 are first and second quick connect flexible strips 224 that engage respective first and second quick connect flexible strips 226 that are engaged on the outer faces of U-shaped piece 218. One of the quick connect flexible strips 224, 226 may be loops. The other of the quick connect flexible strips 224, 226 may be hooks. Quick connect flexible strips 224, 226 may be Velcro®. When quick connect strips 224, 226 are engaged and outer piece 222 is upright and sleeve 190 is engaged to removable frame section 192, which is part of U-shaped support member 50, then rear wall 174 is in its closed and operating position.

Figure 26:
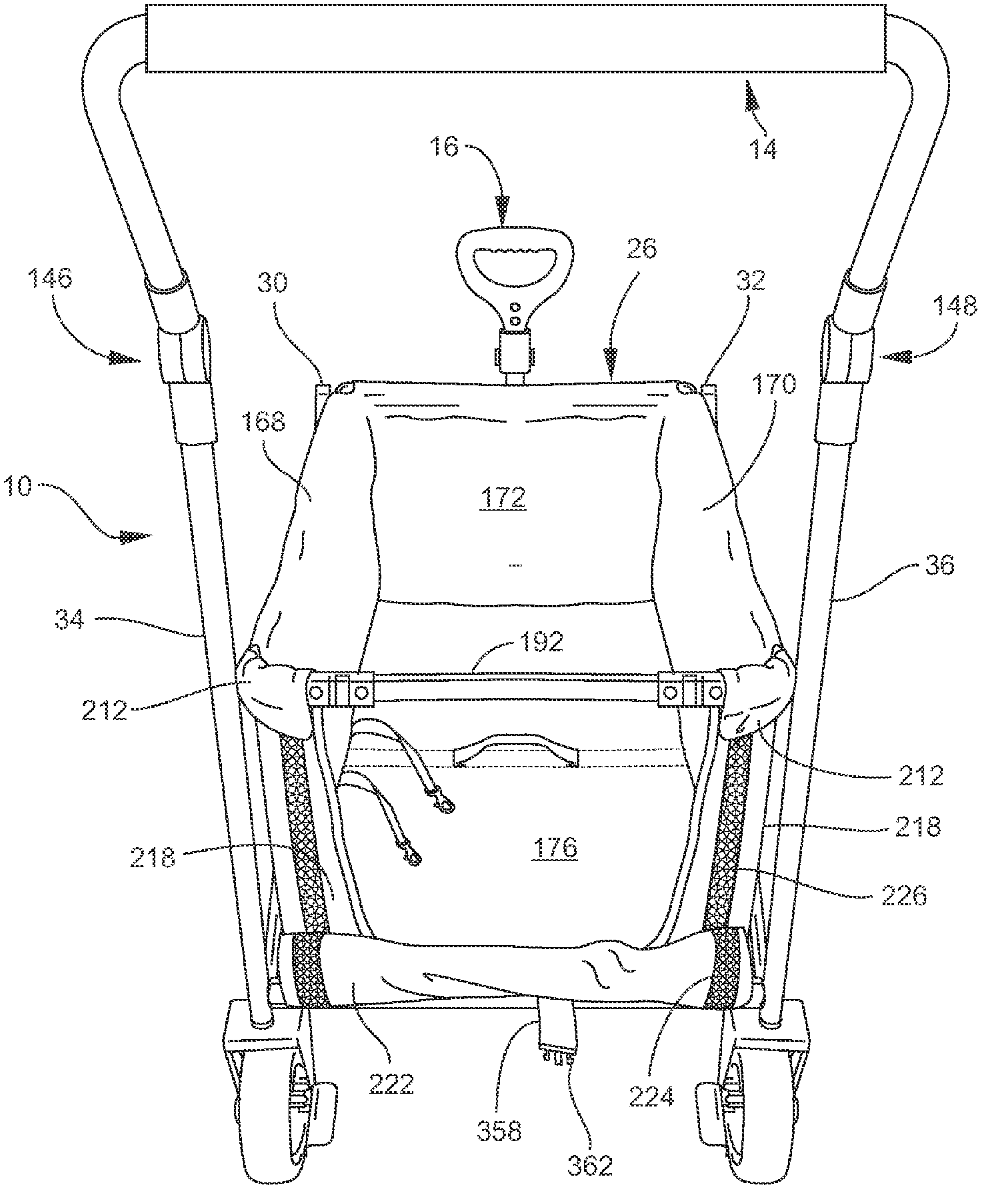
FIG. 26 shows the wagon of FIG. 25, and further shows the rear panel rolled up and engaged in an out-of-the-way position.
Figure 27:
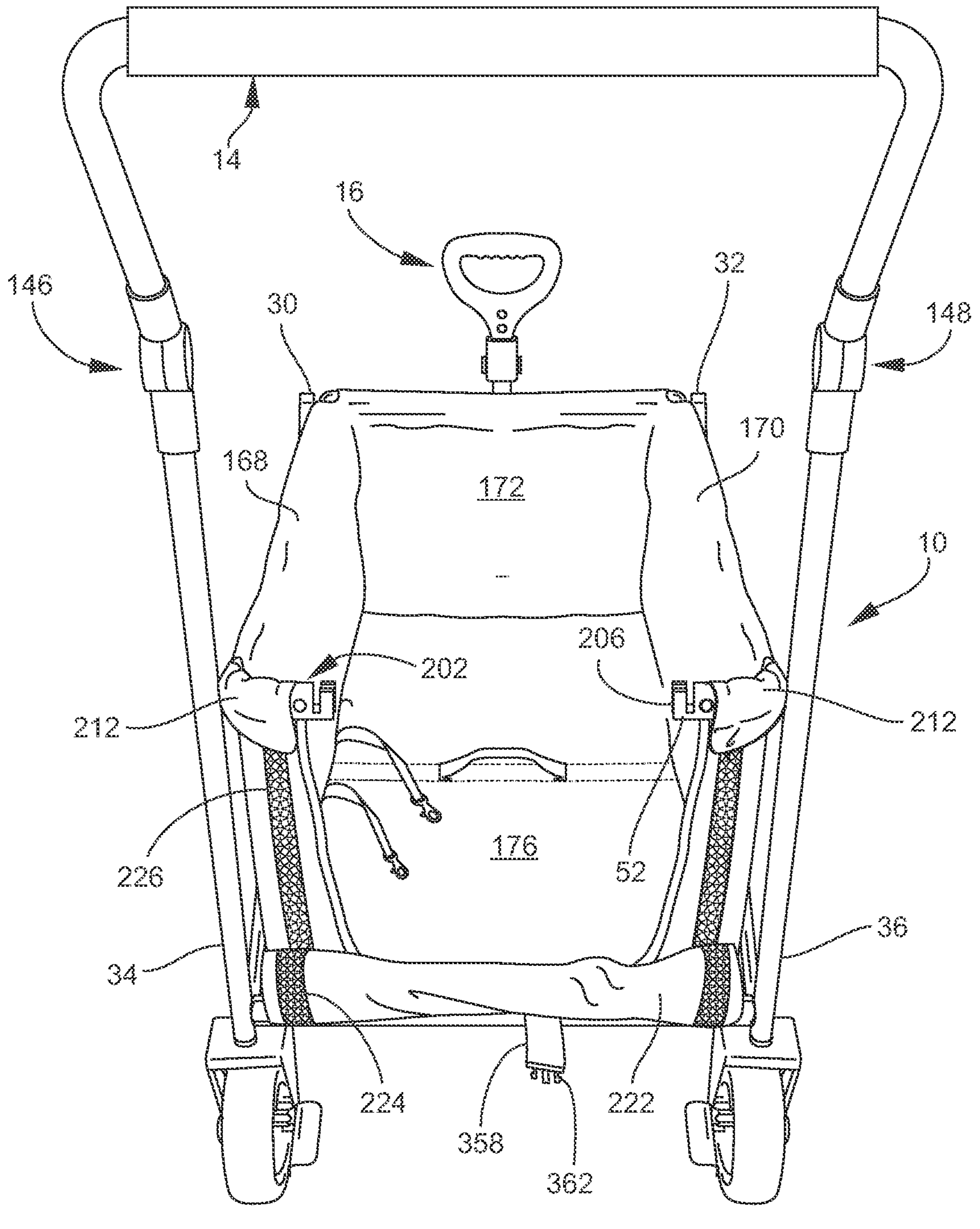
FIG. 27 shows the wagon of FIG. 26 with a rear portion of the frame of the wagon disengaged from the frame of the wagon.

Rear wall 174 has an open and operating position. This state or position is shown in FIGS. 25, 26, and 27. In FIG. 25, the outer piece 222 is disengaged and sleeve 190 is disengaged, leaving a U-shaped opening in the rear wall 174 through which a dog can jump through, such as into the pet wagon 10 or out of the pet wagon 10. U-shaped opening is defined by U-shaped edge 220. FIG. 25 shows a quick connect flexible strip 228 having the quick connect face exposed to view and further shows quick connect strip 230, having the quick connect face not exposed to view. FIG. 8 shows quick connect strip 230 having the quick connect face exposed to view and the quick connect strip 228 having the quick connect face not exposed to view. As shown in FIG. 26, outer piece 222 is rolled up and maintained in the rolled up state by engaging quick connect strip 228 with quick connect strip 230. A preliminary step, prior to rolling up outer piece 222, is to roll up sleeve 190, which in a rolled up state is contained within the rolled up outer piece 222.

By comparing FIGS. 26 and 27, one can note that the removable support member section 192 may be engaged or disengaged depending upon the preference of the user.

Figure 11:
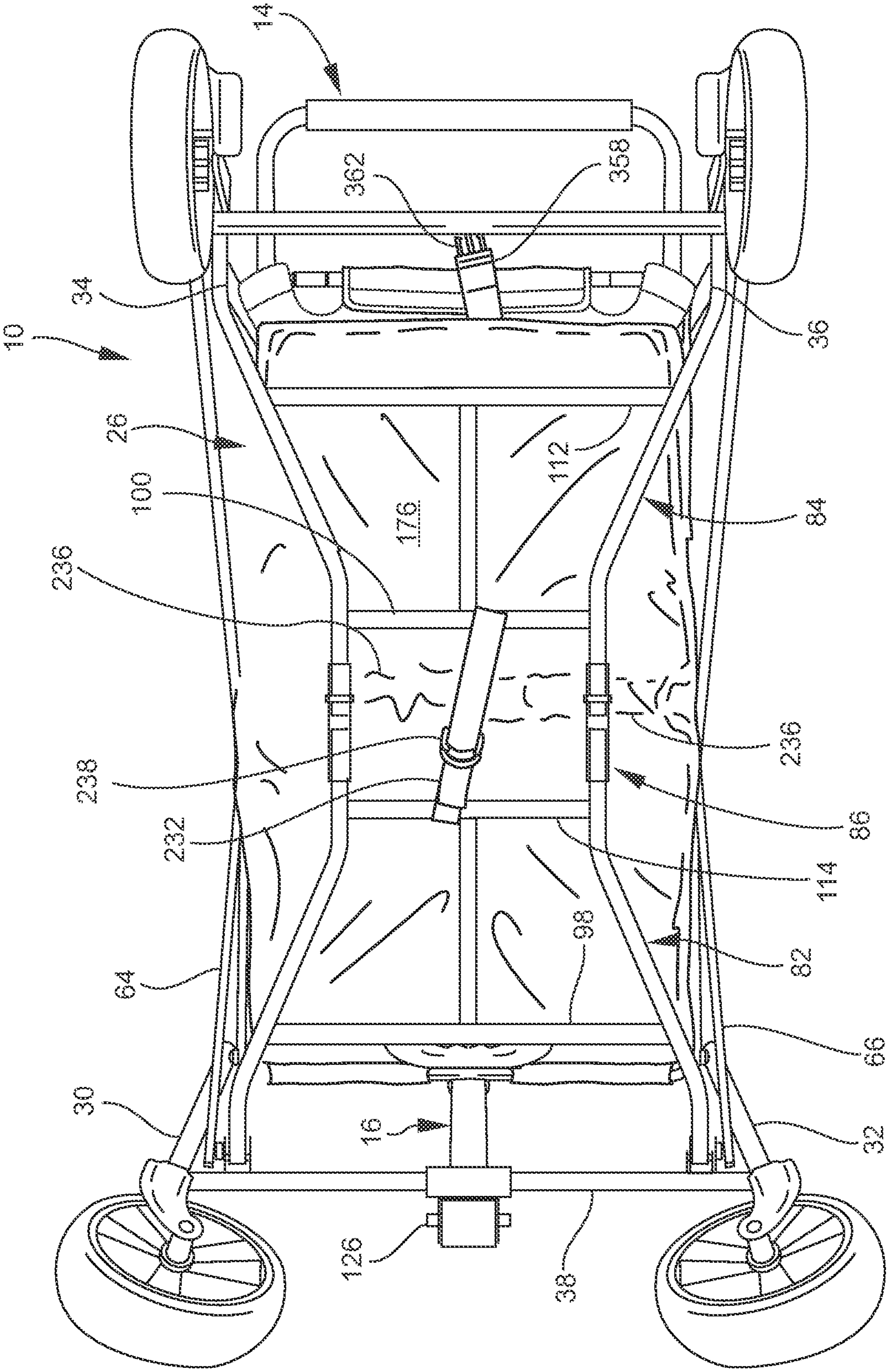
FIG. 11 is a rear perspective view of the wagon of FIG. 7.

Floor 176 is shown in FIG. 11. Floor 176 is a rectangle and is engaged such as by being sewn to the bottom edge of first sidewall 168, is engaged such as by being sewn to the bottom edge of second sidewall 170, is engaged such as by being sewn to the bottom edge of front wall 174, and is engaged such as by being sewn to the bottom of the U-shaped portion 218. Piece or door or flap 222 is engaged such as by being sewn 1) to the junction between the U-shaped portion 218 and floor 176, or 2) to a horizontal elongate section of the floor 176 or U-shaped portion 218 that is adjacent to the junction between the U-shaped portion 218 and floor 176.

Floor 176 is engaged by a strap 232 to the bottom frame portion 80. Strap 232 is engaged to floor 176, to first or front bottom frame unit 82, and to second or rear bottom frame unit 84. Specifically, strap 232 is engaged to floor 176, looped about frame member 100 of front bottom frame unit 82, and looped about frame member 114 of rear bottom frame unit 84.

Floor 176 includes uppermost and bottommost layers. The bottommost layer may be integral with or sewn to one or more of the first sidewall 168, second sidewall 170, front wall 172, and rear U-shaped piece 218. Or, at the rectangular outer edges, the double layer floor may be engaged such as by being sewn to the lower edges of the first sidewall 168, second sidewall 170, front wall 172, and rear U-shaped piece 218.

Strap 232 is engaged to the floor 176 and depends downwardly therefrom to loop about bottom frame members 100, 114. Strap 232 includes two portions extending from the floor 176 and such two portions are removably engaged together by a buckle 238. Strap 232 may remain in the engaged position when the pet wagon 10 is folded from the open and operating position shown in FIG. 1 to the closed and compact position shown in FIG. 32. The engaged position of strap 232 is where the two strap portions are engaged by buckle 238 and where the strap 232 is looped about portions of the bottom frame portion 80 such as bottom frame members 100, 114. The two portions of strap 232 that depend from the floor 176 are integral with each other and are stitched to the floor 176 by each of the front and rear stitch lines 236.

As shown in FIG. 10, a handle strap 240 is engaged, such as by being stitched, to floor 176 between the front and rear stitch lines 236. Handle strap 240 includes first and second ends and is engaged at each of the first and second ends by being stitched to the floor 176 with stitch lines extending at right angles to front and rear stitch lines 236. Between the first and second ends of the handle strap 240 is a body of the handle strap 240 and this body is spaced from the upper face of floor 176 to permit the user to insert his or her hand under the handle strap 240 and lift up. When a user lifts up or pulls up the handle strap 240, the pet wagon 10 begins to fold by the handle strap 240 exerting a lifting force upon the floor 176, with the floor 176 in turn exerting a lifting force upon strap 232, with strap 232 in turn exerting a lifting force on each of front bottom frame unit 82 and rear bottom frame unit 84, thereby causing the units 82 and 84 to pivot relative to each other, which in turn causes pivoting motion at the other pivoting locations in the frame 12. These other pivoting locations in the frame 12 include the front pivoting locations of the front bottom frame unit 82 relative to lower front transverse frame member 38, the rear pivoting locations of the rear bottom frame unit 84 relative to the lower rear transverse frame member 48, the front ends of the oblique frame members 64, 66 relative to the lower front transverse frame member 38, the rear ends of the oblique frame members 60, 62 relative to the lower rear transverse frame member 48, the upper ends of the oblique frame members 64, 66 relative to frame sections 54, 56 of the rear U-shaped frame member 50, the upper ends of the oblique frame members 60, 62 relative to the frame sections 44, 46 of the front U-shaped frame member 40, pivot junction 76 between oblique support members 60, 64, pivot junction 78 between oblique support members 62, 66, and pivot junctions 108 between the rear frame unit 84 and the channel connector 86.

The area between front and rear stich line 236, strap 240, pivot location 76, and pivot location 78 define a vertical plane. Such plane is parallel to the plane defined by rear posts 34, 36 and to the plane defined by front posts 30, 32.

Figure 12:
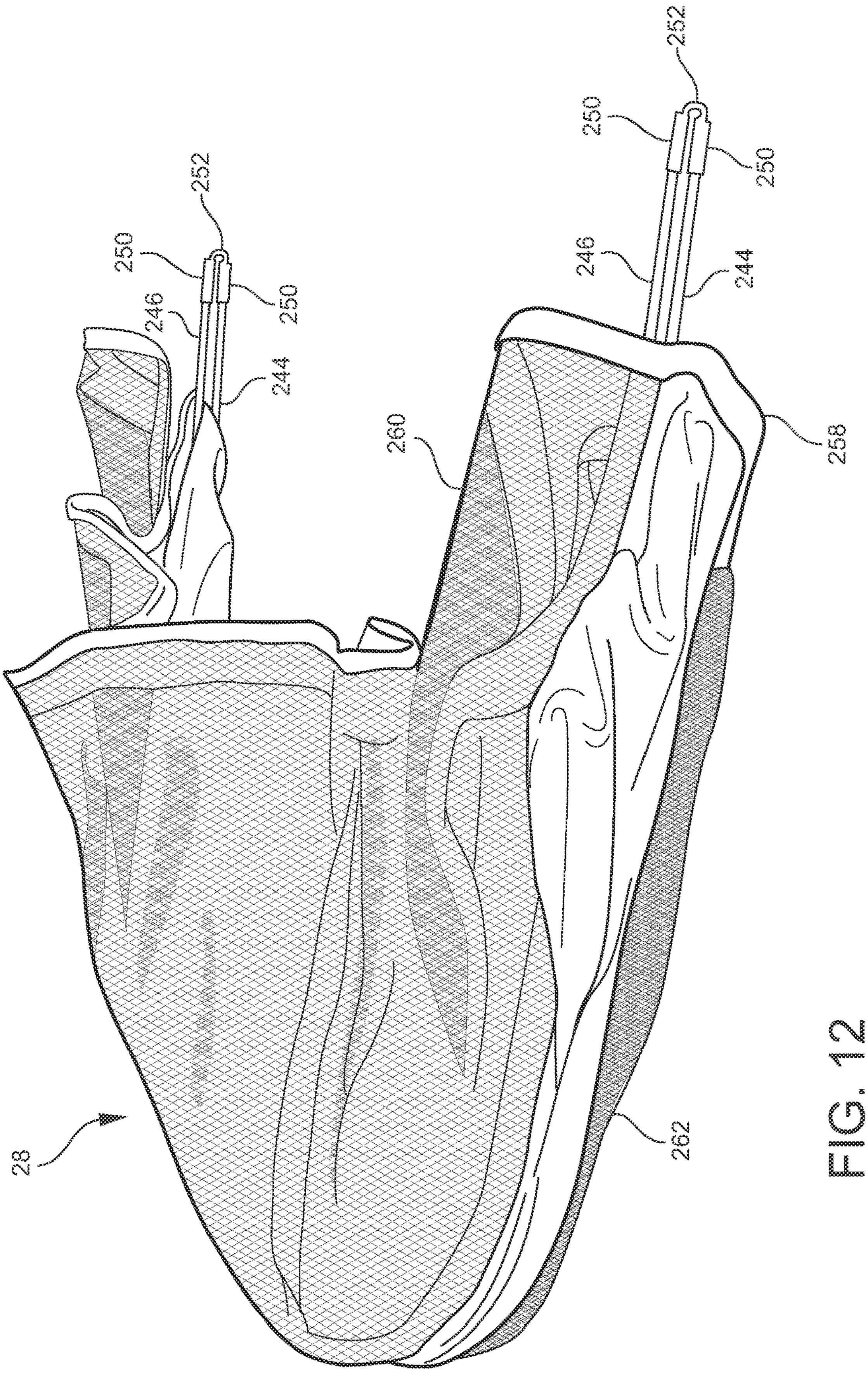
FIG. 12 is an isolated perspective view of a flexible canopy for the wagon of FIG. 1, where the canopy is in a folded or collapsed position.
Figure 13:
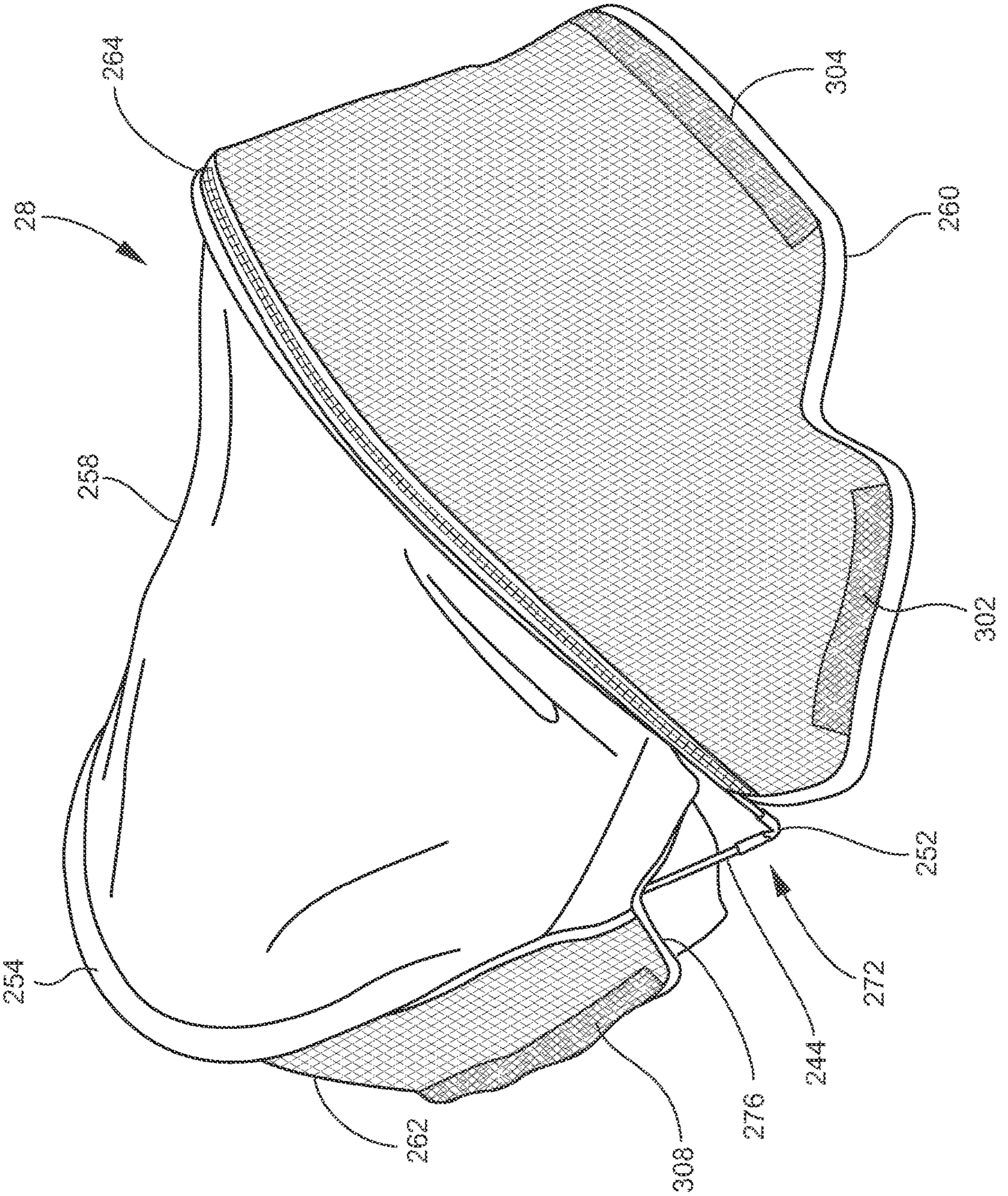
FIG. 13 is an isolated perspective view of the canopy of FIG. 12, where the canopy is in an open and operating position.
Figure 14:
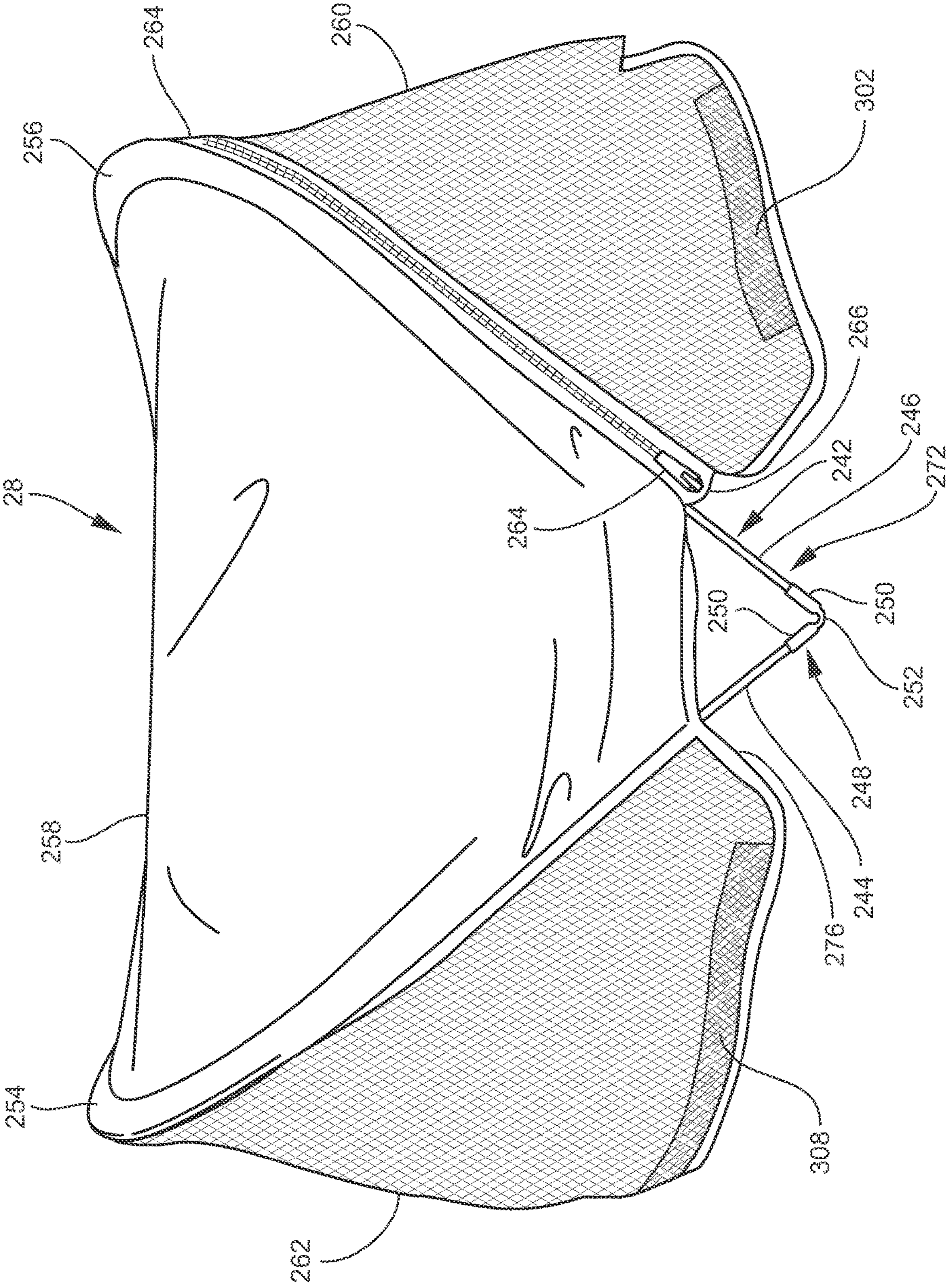
FIG. 14 is an isolated perspective side view of the canopy of FIG. 12, where the canopy is in an open and operating position.
Figure 15:
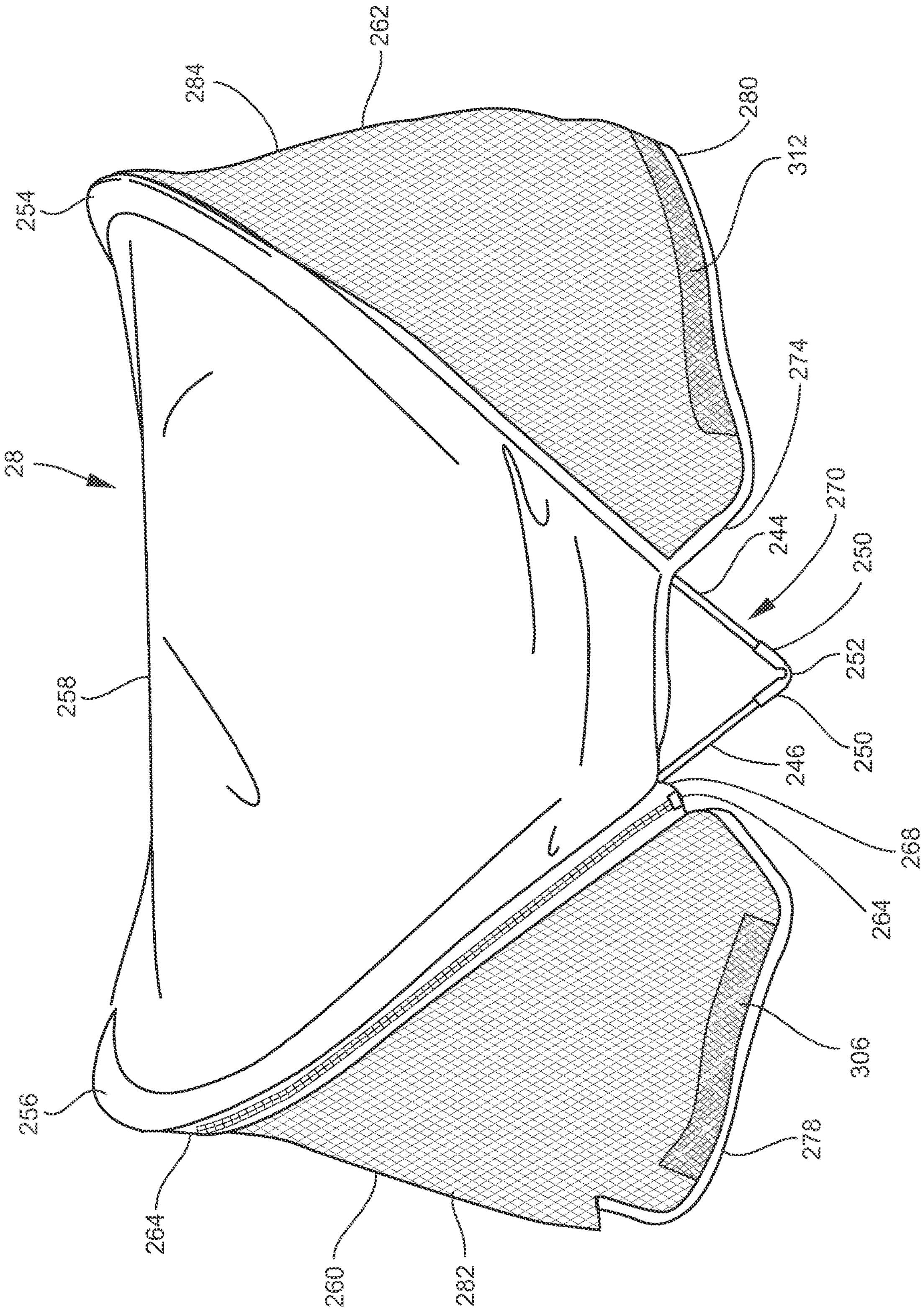
FIG. 15 is an isolated perspective side view of the canopy of FIG. 12, where the canopy is in an open and operating position, and where the side opposing the side of FIG. 14 is shown.

FIGS. 12, 13, 14, 15, 16, 17, 18, 19, 20, 21, and 22 show the canopy 28. As shown in FIGS. 14 and 15, a canopy frame 242 includes first and second U-shaped tubes or rods 244, 246 that are engaged to each other by first and second pieces 248. Each of the pieces 248 includes a cylindrical receptor 250. The cylindrical receptors 250 are engaged to each other by a flexible hinge 252. Elements 244, 246 are frame elements and have a high degree of rigidity relative to the remainder of the canopy 28. Elements 244, 246 are elongate and may be fiberglass rods.

Element 244 is engaged in a sleeve 254 and element 246 is engaged in a sleeve 256. Alternatively stitches about elements 244, 246 may serve as sleeves that keep the elements 244, 246 engaged to the canopy 28.

Canopy 28 has three flexible sheeting sections 258, 260, and 262. Sheeting sections 260, 262 are mesh sections. Sheeting section 258 is a nylon or canvas non-mesh section. Sheeting section 258 is football shaped or ellipsoid shaped or prolate spheroid shaped. Sections 260, 262 are also football shaped or ellipsoid shaped or prolate spheroid shaped. Sheeting section 258 is disposed interiorly of sheeting sections 260, 262.

Canopy 28 is shown in an expanded form in FIGS. 13, 14 and 15. Canopy 28 is shown in a collapsed form in FIG. 12.

A zipper 264 separates sheeting section 258 from sheeting section 260. By the zipper 264, sheeting section 260 is removable from sheeting section 258. Sheeting section 262 may only be separated from sheeting section 258 by destroying the integrity of the junction between sheeting section 158 and sheeting section 262.

By comparing FIG. 14 with FIG. 15, it can be seen that the zipper 264 extends from one side of the canopy 28 to the other side of the canopy 28 such that sheeting section 260 is removable from the sheeting section 260 and then may be engaged again by the zipper 264.

The tape or fabric part of the zipper 264 is engaged on one side to sheeting section 260 and is engaged on the other side to sheeting section 258. When the zipper 264 is completely unzipped, the slider part of the zipper 264 may remain with section 258 or may remain with section 260.

Zipper 264 includes first and second ends 266, 268. Each of the first and second ends 266, 268 is adjacent to and spaced apart from one of the hinges 252.

Canopy frame 242 includes first and second exposed element sections 270, 272. Element section 270 forms the shape of a V. Element section 272 forms the shape of a V. Element sections 270, 272 are exposed by U-shaped indents 274, 276 formed in the canopy 28 where each of the U-shaped indents 274, 276 are defined by portions of sheeting sections 258, 260, and 262, where such portion by sheeting section 258 extends horizontally, where such portion by sheeting section 260 is tapered outwardly and downwardly or obliquely relative to the horizontal, and where such portion by sheeting section 262 is tapered outwardly and downwardly or obliquely relative to the horizontal.

Canopy 28 forms the shape of a receptacle when canopy 28 is in the open and operating form and when canopy 28 is inverted. A receptacle is a shape that can hold water from a conceptual standpoint.

Sheeting section 260 includes a flexible fabric trim 278 that defines a border along a lowermost portion of the sheeting section 260. Sheeting section 262 includes a flexible fabric trim 280 that defines a border along a lowermost portion of the sheeting section 262. Mesh 282 is disposed between trim 278 and zipper 264 in sheeting section 260. Mesh 284 is disposed between trim 280 and sleeve 254.

Mesh 282, 284 provide some shade. Mesh 282, 284 is a see-through fabric. The fabric of sheeting section 258 provides shade. Sheeting section 258 is opaque. Sheeting section 258 is non-see through. Sheeting section 258 does not permit light through.

FIG. 12 shows a compact, folded in, and collapsed state of the canopy 28. In such a compact state, elements 244 and 246 retain the U-shape. In such a compact state, element 244 and element 246 extend parallel and adjacent to each other, in contrast to the open and operating state of FIGS. 14 and 15 where the elements 244 and 246 extend obliquely relative to each other and are spaced apart. In such a compact state, hinges 252 and receptors 250 are spaced from sheeting sections 258, 260, and 262. In such a compact state, sheeting sections 258, 260, and 262 are adjacent to each other. In contrast, in the open and operating state of FIGS. 14 and 15, only the common borders of sections 258 are adjacent to sheeting section 260 and 262. Further as shown in FIGS. 14 and 15, end sheeting section 260 and end sheeting section 262 are spaced apart from each other and disposed opposite of each other.

In the compact and collapsed state of FIG. 12, the first and second hinges 252 are set apart from each other by a first distance. In the open and operating state of FIGS. 14 and 15, the first and second hinges 252 are set apart from each other by a second distance. Such first and second distances are the same. The distance between the first and second hinges 252 does not change as the canopy 28 is set up or taken down.

Figure 22:
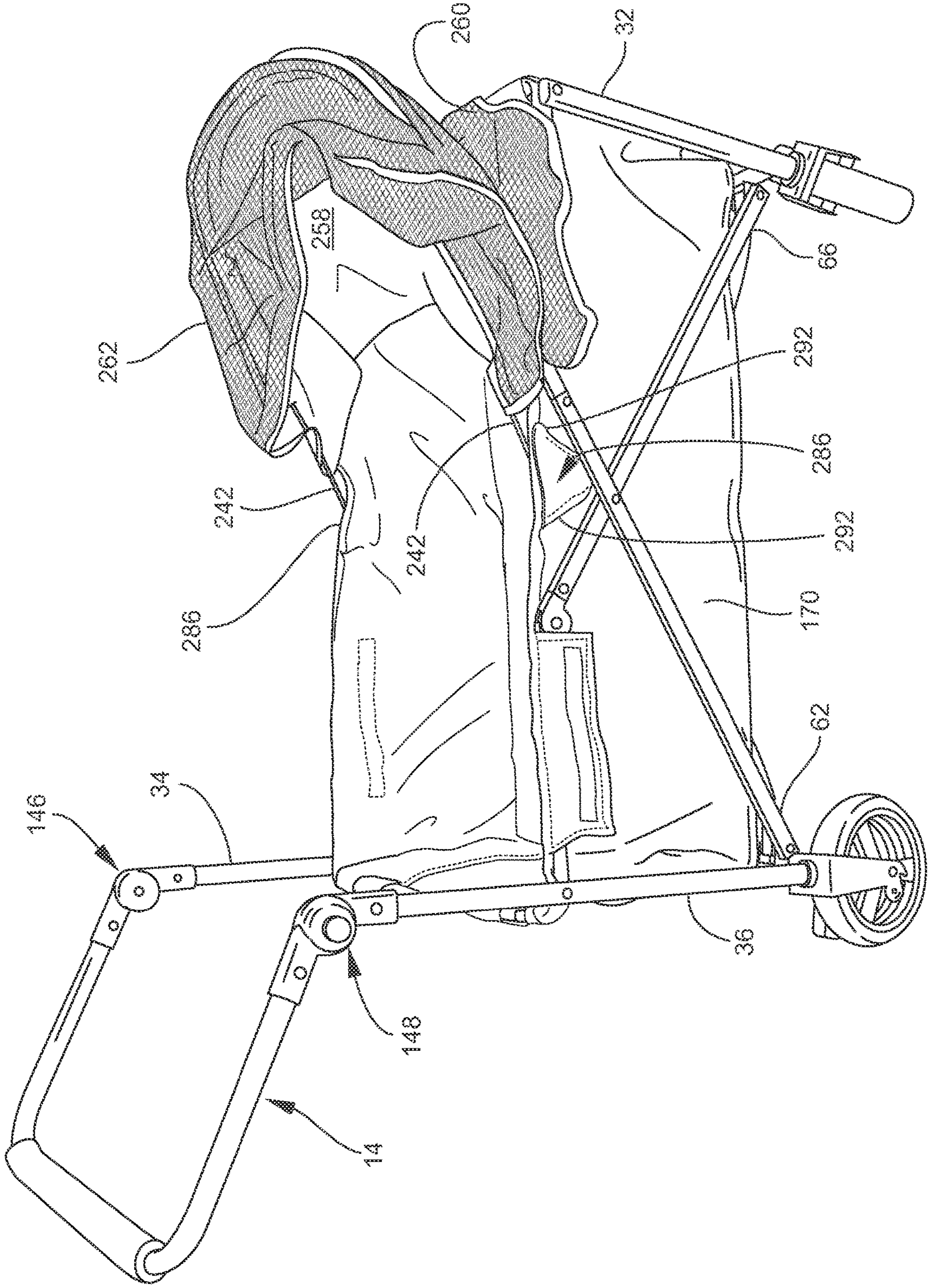
FIG. 22 is a side perspective view of the wagon of FIG. 16, showing the canopy fully pivoted or folded back, and further showing the rear handle extended away from the frame and in a pushing position.
Figure 24B:
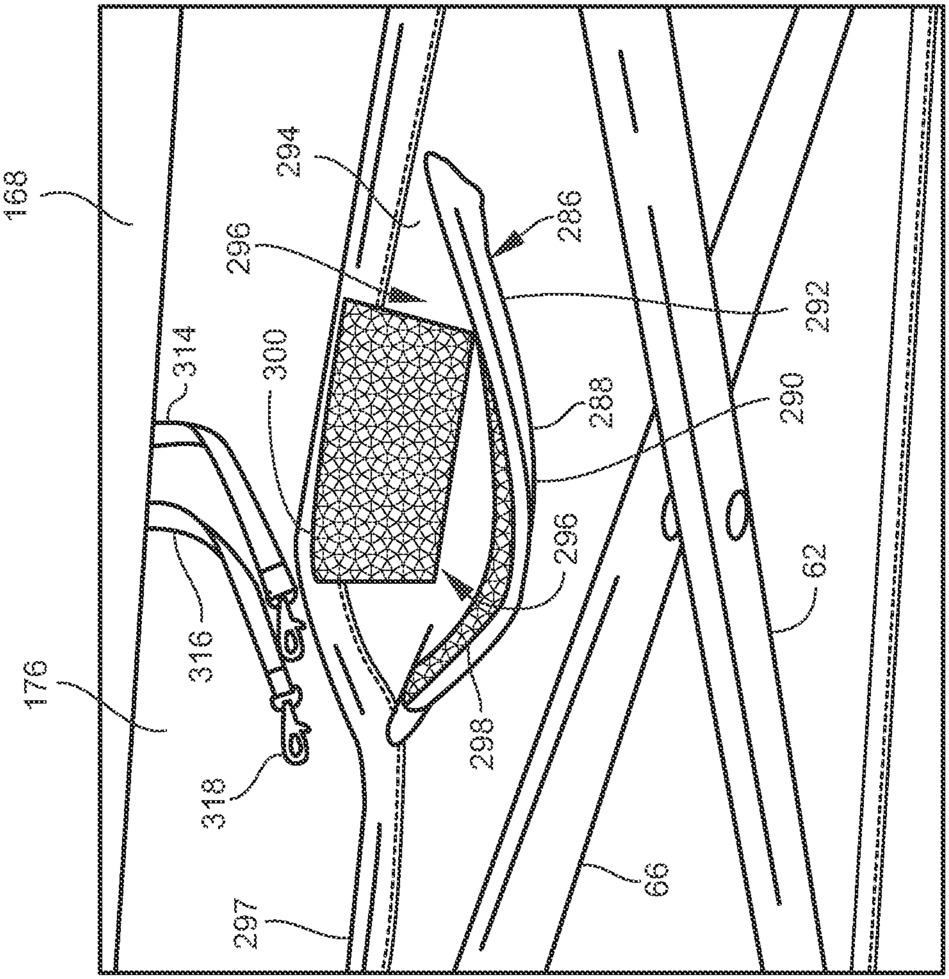
FIG. 24B is a perspective view of the wagon of FIG. 7 with a pocket open, where the pocket receives a junction of the frame of the canopy.
Figure 24A:
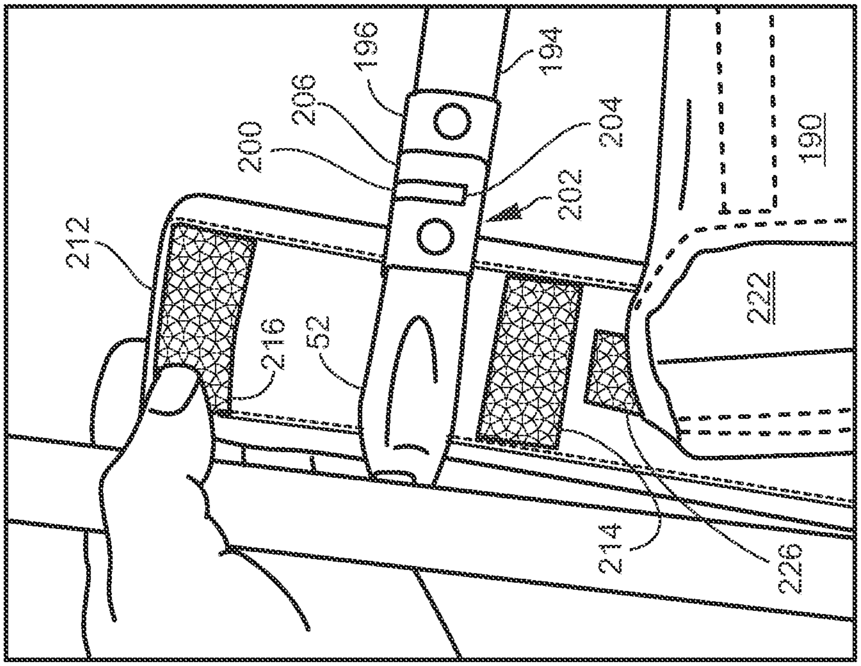
FIG. 24A is a perspective view of the wagon of FIG. 7 with a sleeve open to show engagement of the receptacle to a portion of the frame.

FIG. 24B is a detail view of a pocket 286 for receiving V-shaped element sections 270, 272. FIG. 24B shows an open pocket 286. The locations of the pockets 286 on the receptacle 26 are shown at least in FIGS. 7, 10, 16, 17, 22, and 24B. A closed pocket 286 is shown in FIGS. 7, 16, 17, and 22. As shown in FIGS. 7 and 22, pocket 286 takes a V or U-shape.

As shown in FIGS. 7, 22, and 24B, pocket 286 includes a front wall 288 that is engaged at a bottom 290 and tapering sides 292 to each of the first and second sidewalls 168, 170 of the receptacle 26 such that receptacle 26 includes first and second pockets 286. The rear wall 294 of the pocket 286 is a portion of the first or second sidewall 168, 170. Pocket 286 includes a pocket opening 296 shown in FIG. 24B.

Pocket 286 is disposed adjacent to a topmost edge 297 of the first and second sidewall 168, 170 and centrally between the front wall 172 of the receptacle 26 and the rear wall 174 of the receptacle 26. Pockets 286 are on the outside of their respective sidewalls 168, 170.

Pocket 286 includes quick connects 298 and 300. One of the quick connects 298, 300 is a hook fabric material. The other of the quick connects 298, 300 is a loop fabric material. Such hook and loop fabric material may be Velcro®. Quick connect 298 is engaged to the inside face of front wall 288. Quick connect 300 is engaged to the rear wall 294 of the pocket 286, which rear wall 294 is a portion of the sidewall 168 or sidewall 170. V-shaped portion 270 is thrust into one of the pockets 286 and the other V-shaped portion 272 is thrust into the other of the pockets 286 and then the front wall 288 is pushed inwardly such that the quick connects 298, 300 engage each other between elements 244, 246 and over the hinge 252 to thereby capture the V-shaped portions 270, 272 and engage the canopy 28 to the wagon 10.

The canopy 28 is further engaged to the wagon 10 by quick connects 302, 304, 306, 308, 310, and 312. Quick connects 302, 304, and 306 are engaged on the inside of mesh section 260 adjacent to trim 278. Quick connects 302 and 306 are disposed on side portions of the mesh section 260. Quick connect 304 is disposed on an end portion of mesh section 260.

Quick connects 308, 310, and 312 are engaged on the inside of mesh section 262 adjacent to trim 280. Quick connects 308 and 312 are disposed on side portions of the mesh section 262. Quick connect 310 is disposed on an end portion of mesh section 262.

Quick connects 302, 304, 306, 308, 310, and 312 are strips of fabric material with one of hook and loops, where such strips may be Velcro® strips.

Receptacle 26 includes receptacle quick connects 302A, 304A, 306A, 308A, 310A, and 312A that engage, respectively, canopy quick connects 302, 304, 306, 308, 310, and 312.

Receptacle quick connects 302A, 304A, 306A, 308A, 310A, and 312A are strips of fabric material with one of hook and loops, where such strips may be Velcro® strips.

Figure 17:
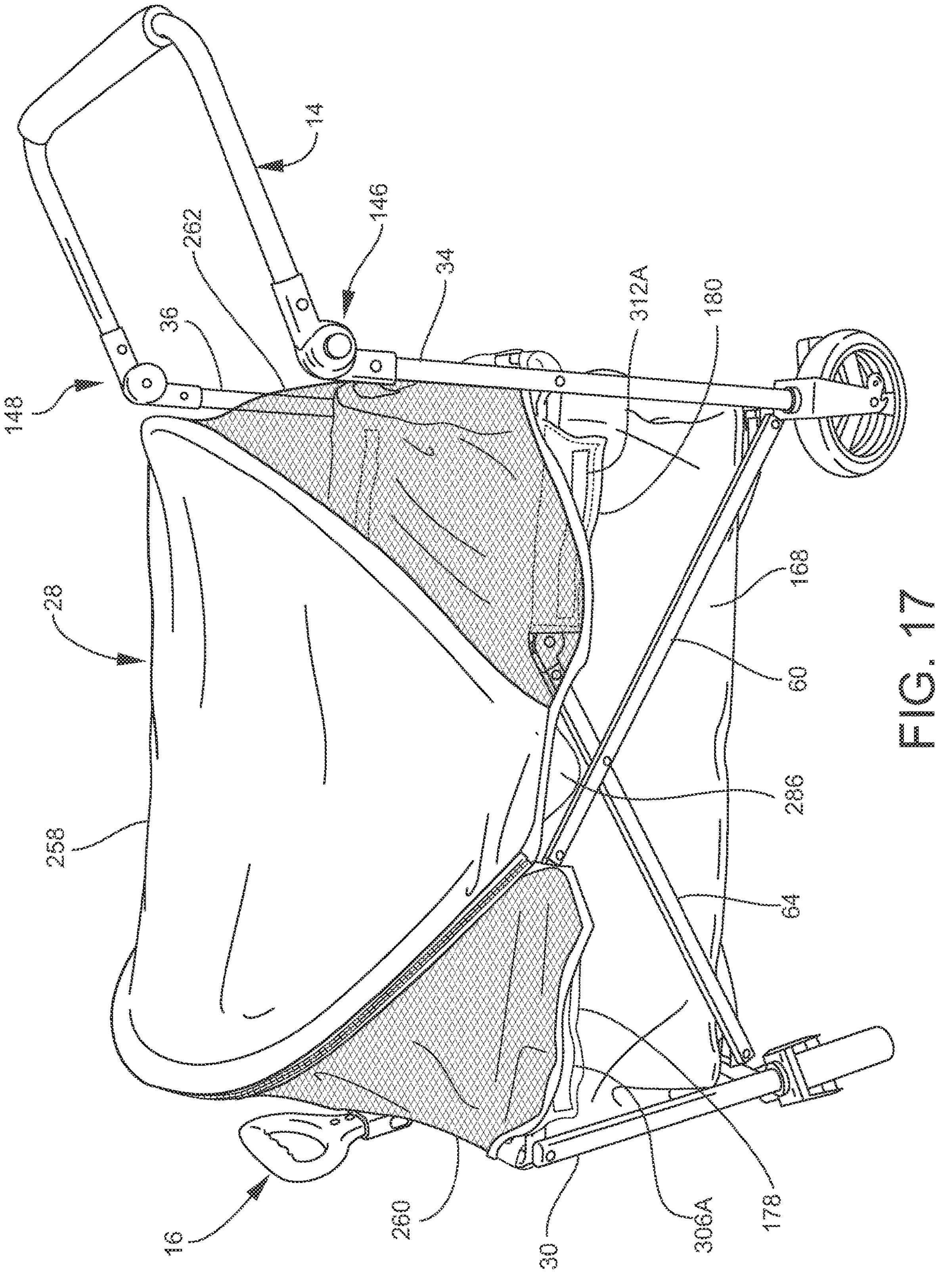
FIG. 17 is a side perspective view of the wagon of FIG. 7, and further shows the canopy of FIG. 15 engaged to the wagon.
Figure 18:
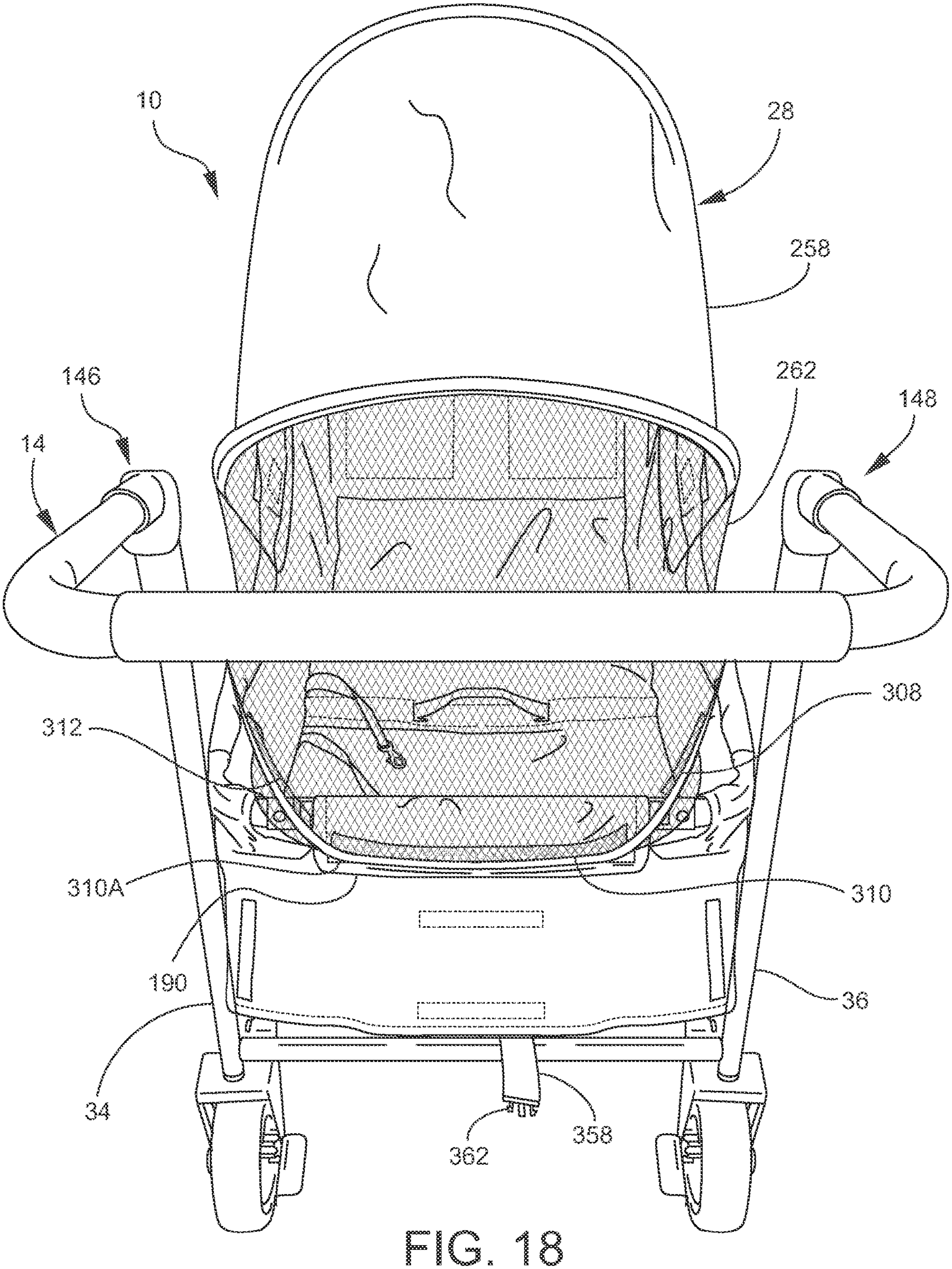
FIG. 18 is a rear perspective view of the wagon of FIG. 16.

Receptacle quick connect 302A is shown in FIG. 7. Receptacle quick connect 304A is shown in FIG. 9. Receptacle quick connect 306A is shown in FIG. 17. Receptacle quick connect 308A is shown in FIG. 7. Receptacle quick connect 310A is shown in FIG. 8. Receptacle quick connect 312A is shown in FIG. 17.

As shown in FIG. 7, receptacle quick connect 302A is engaged to the outside of front sleeve 178. Engaged immediately opposite of receptacle quick connect 302A on the inside of front sleeve 178 is quick connect 184, shown in FIG. 23B, for engaging the front sleeve 178 to second sidewall 170 of receptacle 26.

As shown in FIG. 7, receptacle quick connect 308A is engaged to the outside of rear sleeve 180. Engaged immediately opposite of receptacle quick connect 308A on the inside of rear sleeve 180 is quick connect 184, shown in FIG. 23A, for engaging the rear sleeve 180 to second sidewall 170 of receptacle 26.

As shown in FIG. 17, receptacle quick connect 306A is engaged to the outside of front sleeve 178. Engaged immediately opposite of receptacle quick connect 306A on the inside of front sleeve 178 is quick connect 184 for engaging the front sleeve 178 to first sidewall 168 of receptacle 26.

As shown in FIG. 17, receptacle quick connect 312A is engaged to the outside of rear sleeve 180. Engaged immediately opposite of receptacle quick connect 312A on the inside of rear sleeve 180 is quick connect 184 for engaging the rear sleeve 180 to first sidewall 168 of receptacle 26.

As shown in FIG. 9, receptacle quick connect 304A is engaged to the outside of front end sleeve 186. Engaged immediately opposite of receptacle quick connect 304A on the inside of front end sleeve 186 is quick connect 189 for engaging quick connect 188 that is engaged on the front end wall 172 of receptacle 26.

As shown in FIG. 8, receptacle quick connect 310A is engaged to the outside of rear end sleeve 190. Engaged immediately opposite of receptacle quick connect 310A on the inside of rear end sleeve 190 is quick connect 210 for engaging quick connect 208 that is engaged on the rear end wall 174 of receptacle 26.

Canopy 28 includes no front end and no rear end. A user may choose to dispose mesh section 260 adjacent to the pull handle 16 or adjacent to the push handle 14. Thus, mesh section 262 may be disposed adjacent to the push handle 14 or adjacent to the pull handle 16. Regardless of whether the mesh sections 260, 262 are at the front or back, a lowermost perimeter of the mesh sections 258, 260, and 262 is adjacent to an uppermost perimeter of the receptacle 26. FIGS. 16, 17, 18, and 19 shows that a lowermost perimeter of the mesh sections 258, 260, and 262 is adjacent to an uppermost perimeter of the receptacle 26 when mesh section 260 is adjacent to the handle 16. The converse is true because 1) the V-shaped element sections 270, 272 are centrally engaged relative to the canopy 28, 2) the pockets 286 are centrally disposed relative to the frame 12 and receptacle 26, and 3) the V-shaped element sections 270, 272 are engagable in the pockets 286.

FIG. 21 shows that mesh section 260 has been removed from canopy 28 and receptacle 26 so as to expose a front portion of the receptacle 26. Mesh section 262 and non-see through section 258 remain engaged to receptacle 26 and remain in the open and operating position. In other words, mesh section 262 and non-see through section 258 remain engaged to the receptacle 26, with the mesh section 262 and non-see through section 258 being engaged to each other as in FIGS. 16 and 17. To remove mesh section 260, the zipper 264 is unzipped completely and the canopy quick connects 302, 304, 306 are disengaged from their respective receptacle quick connects 302A, 304A, and 306A.

FIG. 22 shows that all of sections 258, 260, and 262 may be in a collapsed state where 1) canopy quick connects 308, 310, and 312 of mesh section 262 have been disengaged from their respective receptacle quick connects 308A, 310A, and 312A, 2) canopy quick connects 302, 304, and 306 of mesh section 260 remain engaged to their respective receptacle quick connects 302A, 304A, and 306A, 3) zipper 264 remains zipped, 4) mesh section 262 is adjacent to mesh section 260, and 5) sections 258, 260, 262 are relaxed and not taut, which is in contrast to the state shown in FIGS. 16 and 17 where sections 258, 260, and 262 are taut since canopy quick connects 302, 304, 306, 308, 310, and 312 are engaged to their respective receptacle connections 302A, 304A, 306A, 308A, 310A, and 312A.

FIG. 22 shows that all sections 258, 260, and 262 are disposed forwardly of the pockets 286 and adjacent to pull handle 16, which is hidden behind sections 258, 260, and 262 in FIG. 22. All sections 258, 260, and 262 may also all be disposed rearwardly of the pockets 286 and adjacent to push handle 14 since pockets 286 are disposed centrally on the receptacle 26 and relative to the frame 12.

As shown in FIG. 24B and FIG. 25, receptacle 26 includes first and second pet leashes 314 and 316. First pet leash 314 is engaged to the receptacle 26 on the pull handle side of the receptacle 26, where the pull handle side is defined as the area one or between the front stitch line 236 and front wall 172 of the receptacle 26. Second pet leash 316 is engaged to the receptacle 26 on the push handle side of the receptacle 26, where the push handle side is defined by the area one or between the rear stitch line 236 and the rear wall 174 of the receptacle 26.

Each of the first and second pet leashes 314, 316 includes a flexible fabric elongate member having a proximal end and a distal end. The proximal end is engaged, such as by being sewn, to the intersection or junction between the floor 176 and the sidewall 168, with leash 314 being sewn to the pull handle side of the receptacle 26 and with the leash 316 being sewn to the push handle side of the receptacle 26. The distal end of the flexible fabric elongate member is engaged to a quick connect swivel connector 318, where the quick connect component of the connector 318 rotates for 360 degrees about a base component of the connector 318 and where the quick connect component of the connector 318 includes an openable loop that engages a ring, such as a D-ring, on a collar of a pet. The length of each of the leashes 314, 316 is less than a distance between sidewalls 168, 170 so as to minimize first and second pets getting tangled by their respective leashes getting tangled. Preferably the length of each of the leases 314, 316 is between about one-quarter to one-half of the distance between sidewalls 168, 170.

FIG. 29A is a detail view from underneath one of the inverted U-shaped channel connectors 86. Channel connector 86 is effectively an extension of first bottom frame portion 82 by the channel connector 86 being rigidly fixed to bottom frame portion 82 by adjacent pins 92, 94, such that channel connector 86 does not rotate relative to first bottom frame portion 82. Second bottom frame portion 84 rotates relative to channel connector 86. Channel connector 86 includes an upper plate section 87 and first and second side plate sections 320. Side plate sections 320 extend parallel to each other and at a right angle relative to upper plate section 87. Pins 92, 94, and 108 engage the side plate sections 320. Each of the side plate sections includes an ear portion that mounts pin 108 immediately below and adjacent to the support member of second bottom frame portion 84 that extends between the upper plate section 87 and the pin 108. Pins 92, 94 extend through a support member of the first bottom frame portion 82. The support members of the first and second bottom frame portions 82, 84 that extend into the channel connector 86 have inner ends and such inner ends are spaced apart and adjacent to each other.

FIG. 29C shows front wheel assembly 18. Front wheel assembly 18 includes a wheel 322 engaged on an axle 324, that is in turn engaged with a U-shaped bracket 326, that is in turn engaged upon a rod 328. Rod 328, U-shaped bracket 326, axle 324, and wheel 322 rotate, relative to front end post 30, as a unit upon an axis defined by rod 328. Rod 328 is removably engaged to front end post 30. Front wheel assembly 18 is identical to front wheel assembly 20 such that front wheel assembly 18 may be engaged to post 32 and such that front wheel assembly 20 may be engaged to post 30.

FIG. 29D shows rear wheel assembly 22. Rear wheel assembly 22 includes a wheel 330 engaged on an axle 332, that is in turn engaged with a U-shaped bracket 334, that is in turn engaged upon a rod 336. Rod 336, U-shaped bracket 334, axle 332, and wheel 330 rotate, relative to rear end post 34, as a unit upon an axis defined by rod 336. Rod 336 is removably and rotatably engaged to rear end post 34 such that rear wheel 330 rotates about a horizontal axis and a vertical axis. Rear wheel assembly 24 has the same components as rear wheel assembly 22. If desired, rod 336 can be fixed relative to rear end post 34 such that rear wheel 330 is fixed about a vertical axis and does not spin but rotates only about a horizontal axis. Rear wheel assembly 24 has the same components as rear wheel assembly 22.

U-shaped bracket 334 includes an inner side plate section 338 that includes a distal end with a U-shaped indent 340. Side plate section 338 further includes a closed U-shaped slot 342 that is shown in an outer side plate section 344. This outer side plate section 344 is shown in FIG. 29D. To minimize manufacturing costs and minimize assembly errors, rear wheel assemblies 22 and 24 have the same U-shaped bracket portions, but with the brake assemblies mounted on the inner sides of the rear wheel assemblies 22, 24 such that the rear wheel assemblies 22, 24 have the same components but are not identical. A brake pedal 344 includes a pivot pin 346 that is slidingly and rotatably engaged in slot 342. When a foot presses down upon face plate 348 of the brake pedal 344, pin 350 that is engaged on brake pedal 344 is driven into slot 340 such that teeth 352 are stopped from rotating so as to stop wheel 330 from rotating. Teeth 352 are rigidly engaged to wheel 330. Teeth 352 are one-piece with the wheel 330. To permit the wheel 330 to rotate, the user's foot or toe may engage the underside of face plate 348 or bottom edge 354 to lift the brake pedal 344 up to drive the locking pin 350 down and out of U-shaped indent 340 and out of teeth 352 such that the teeth 352 and wheel 330 may rotate.

Figure 31A:
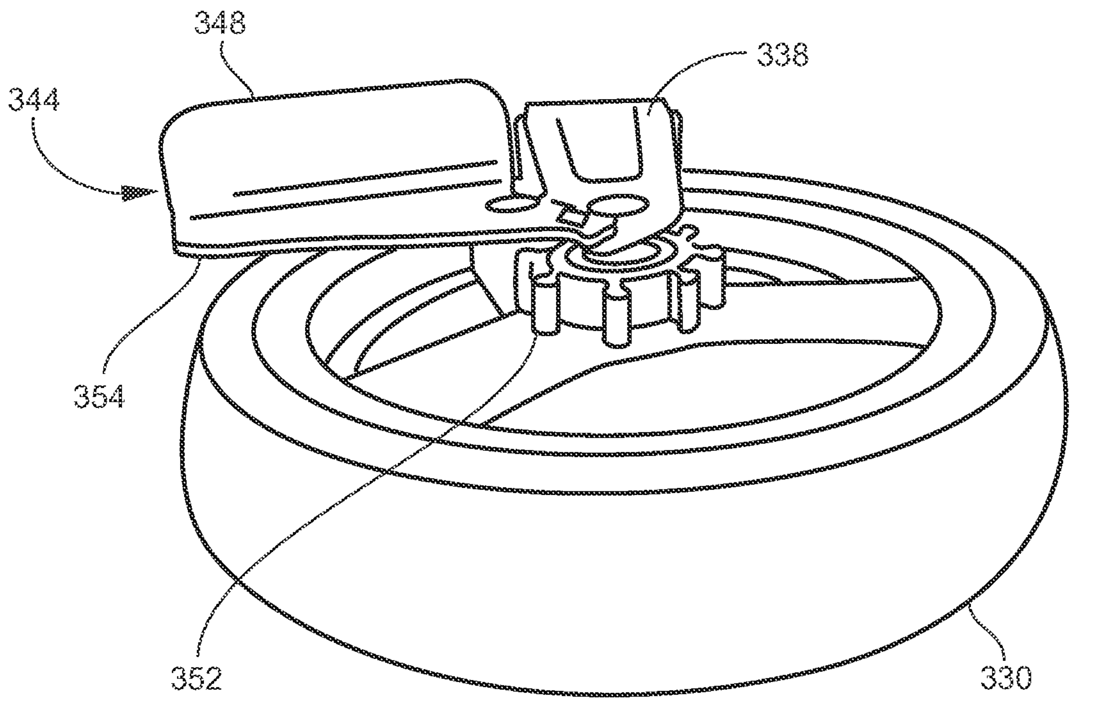
FIG. 31A shows a detail isolated view of a rear wheel, with a lock of the rear wheel being in a locked position.
Figure 31B:
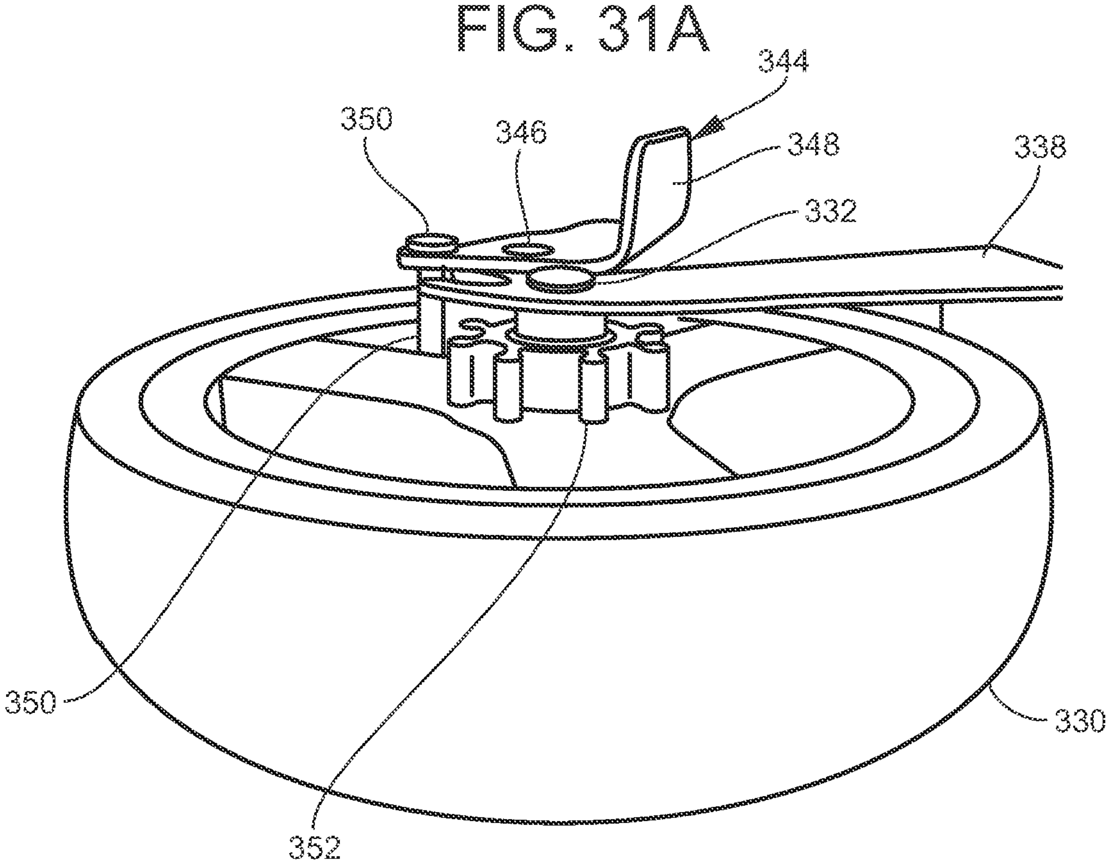
FIG. 31B shows a detail isolated view of a rear wheel, with a lock of the rear wheel being in an unlocked position.

As shown in FIGS. 31A and 31B, brake pedal 344 is L-shaped. Pin 350 includes an outer end that may be welded to brake pedal 344. Pin 350 includes a free inner end that engages U-shaped indent 340 and extends inwardly therefrom to engage teeth 352.

Figure 32:
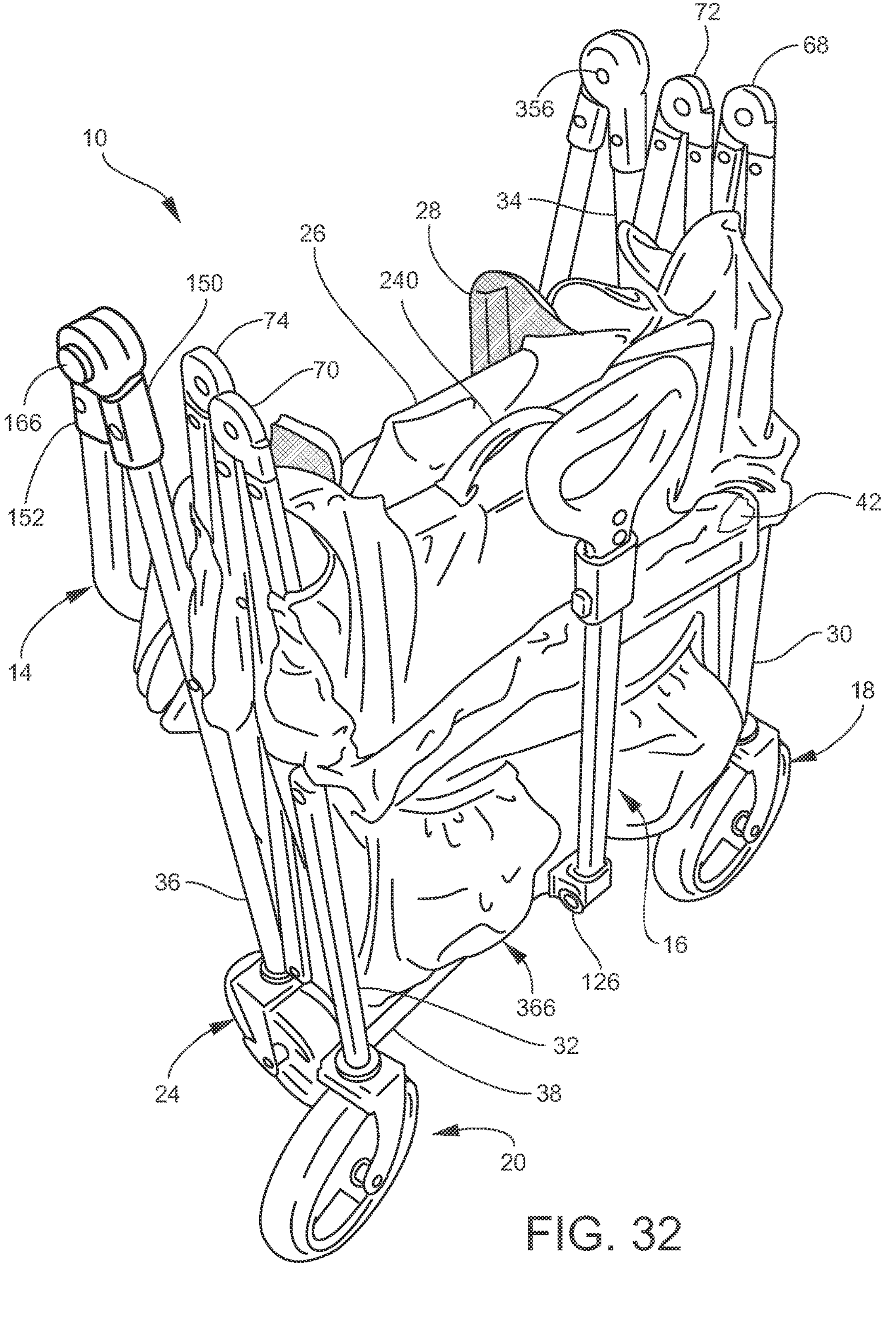
FIG. 32 shows the wagon of FIG. 16 in a folded compact state, with the wagon including the canopy and the receptacle.
Figure 33:
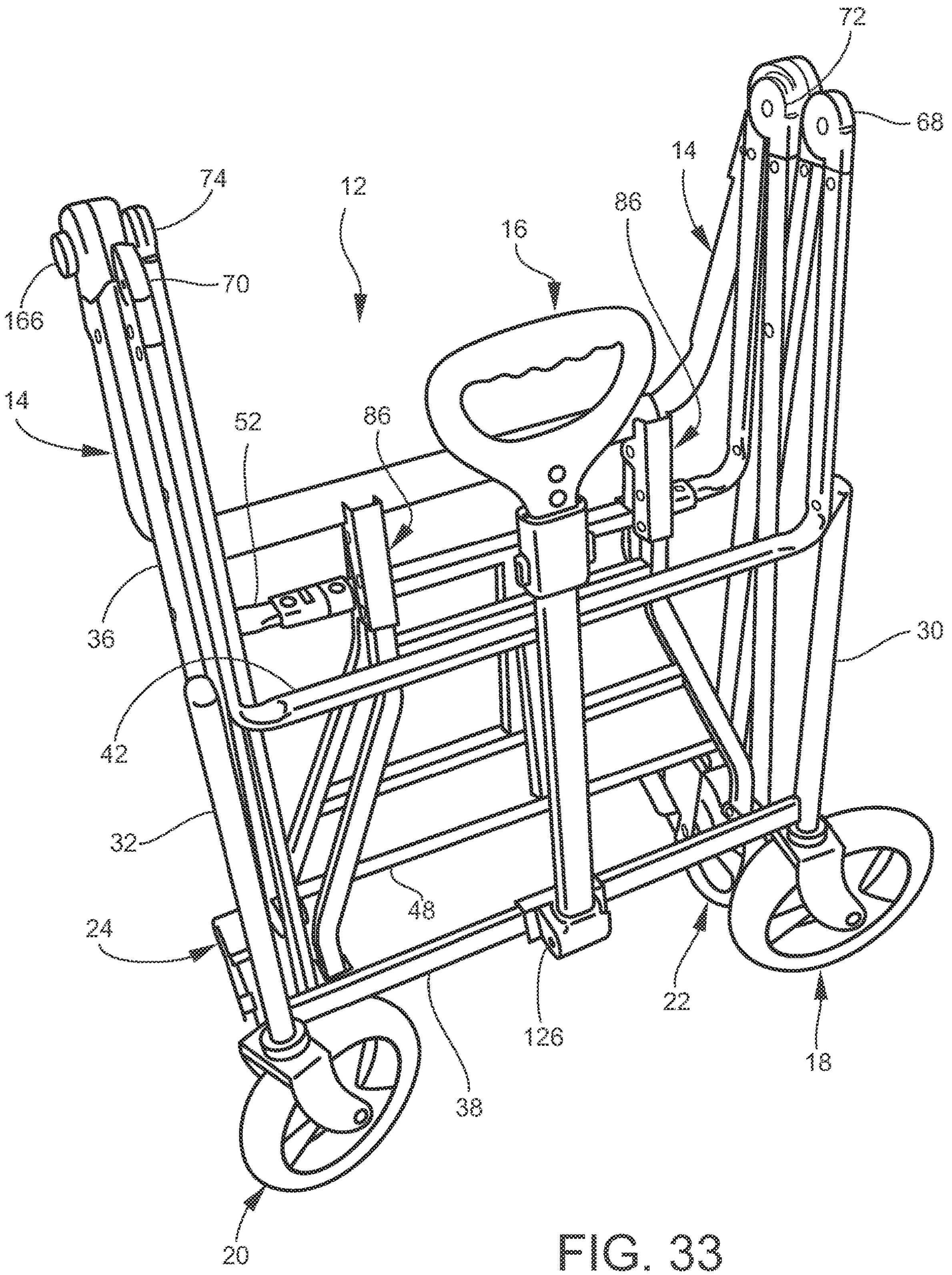
FIG. 33 shows the wagon of FIG. 1 in a folded compact state, without the canopy and without the receptacle.

FIG. 32 shows the pet wagon 10 in a collapsed and folded in state and further shows the pull handle 16 and push handle 14. FIG. 33 shows the frame 12 of the pet wagon in a collapsed and folded in state and further shows the pull handle 16 and the push handle 14.

As shown in at least FIGS. 32 and 33, pull handle 16 includes a horizontal axis of rotation defined by pivot 126. Push handle 14 includes a horizontal axis of rotation defined by a center of the first and second buttons 166. A first pin connector 356 engaging the upper sleeve 152 and lower sleeve 150 on the first button assembly 146 and a second pin connector 356 engaging the upper sleeve 152 and lower sleeve 150 on the second button assembly 148 lie on such horizontal axis of rotation and also define such horizontal axis of rotation. The horizontal axis of rotation of the push handle 14 lies at an altitude greater than the horizontal axis of rotation of the pull handle 16 when the pet wagon 10 is in the collapsed and folded in state of FIG. 32 and also when the pet wagon 10 is in the open and operating form of FIG. 1.

As shown in each of FIGS. 32 and 33, the front wheel assembly 20 is adjacent to rear wheel assembly 24. FIG. 32 also shows front wheel assembly 18 is adjacent to rear wheel assembly 22 because rear wheel assembly 22 is engaged to the bottom of rear post 34, which rear post 34 is shown in FIG. 32. FIG. 33 shows that front wheel assembly 18 is adjacent to rear wheel assembly 22 when the frame 12 is in the collapsed and folded in state.

FIG. 32 shows that front post 32 is adjacent to rear post 36. FIG. 32 also shows that front post 30 is adjacent to rear post 34.

FIG. 32 shows that pivot assembly 68 is adjacent to pivot assembly 72. FIG. 32 also shows that pivot assembly 70 is adjacent to pivot assembly 74.

FIG. 32 shows that the flexible receptacle 26 and the flexible canopy 28 may remain with the frame 12 as the frame 12 is folded from the open and operating state to the collapsed and folded in state of FIG. 32.

FIG. 32 shows that the handle strap 240 has risen from a lower position, as shown for example in FIG. 21, to an upper position. In the lower position the handle strap 240 is adjacent to a plane defined by front end lower lateral support member 38 and rear end lower lateral support member 48. In the upper position the handle strap 240 is above or adjacent to a plane defined by upper front lateral support member 42 and upper rear lateral support member 52.

FIG. 33 shows that channel connectors 86 are adjacent to a plane defined by upper front lateral support member 42 and upper rear lateral support member 52. FIG. 2 shows that channel connectors 86 are adjacent to a plane defined by lower front lateral support member 38 and lower rear lateral support member 48.

Figure 19:
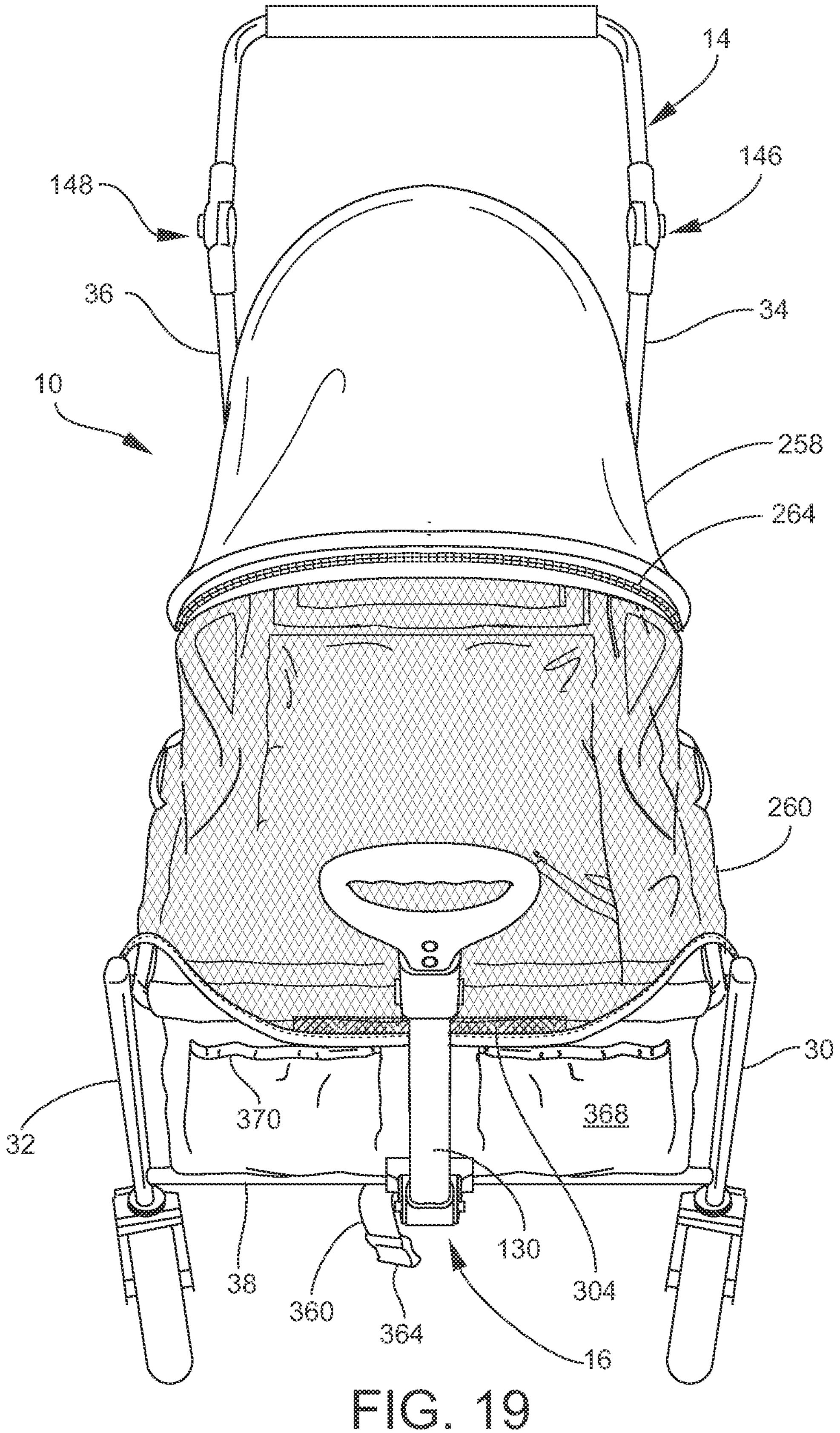
FIG. 19 is a front perspective view of the wagon of FIG. 16.

In the collapsed and folded in state of FIG. 32 where the frame 12 is collapsed and folded in with the receptacle 26 and canopy 28 therein, quick connect buckle strap portions 358 and 360 are engaged to each other to keep the frame 12, receptacle 26 and canopy 28 in the collapsed and folded in position. Strap portion 358 is shown in FIGS. 8, 11, 18, 26, and 27. Strap portion 360 is shown in FIGS. 9, 19, and 21.

As shown in FIGS. 8, 11, 18, 26, and 27, strap portion 358 includes a male buckle portion 362. As shown in FIGS. 9, 19, and 21, strap portion 360 includes a female buckle portion 364. Male buckle portion 362 engages female buckle portion 364 to engage the strap portions 358, 360 to each other.

As shown in FIG. 8, strap portion 358 is engaged to the junction between the rear wall 172 and floor 176 of the receptacle 26 and extends rearwardly therefrom. Then the strap portion 358 wraps about the rear side of lower lateral rear support member 48. Then the male strap portion 358 extends forwardly to engage the female strap portion 360.

As shown in FIG. 9, female strap portion 360 is engaged to the junction between front wall 172 and floor 176 of the receptacle 26 and extends forwardly therefrom. Then the strap portion 360 wraps about the front side of the lower lateral front support member 38. Then the female strap portion 360 extends rearwardly to engage the male strap portion 358.

The handle strap 240 being lifted upwardly is an action which pivots the first and second bottom frame portions 82, 84 relative to each other, which in turn draws the front and rear lower lateral support members 38, 48 adjacent to each other. Such front and rear lower lateral support members 38, 48 are held adjacent by engaging the female strap portion 360 with the male strap portion 358. To convert back to the open and operating state shown in FIG. 1 from the collapsed and folded in state of FIG. 32, the female strap portion 360 is disengaged from the male strap portion 358, whereupon the weight of the first and second bottom frame portions 82, 84 pushes the front and rear lower lateral support members 38, 48 apart under the influence of gravity and back to the open and operating state of FIG. 1.

FIGS. 9, 19, 21, 23C, and 32 show that the receptacle 26 includes first and second front end pockets 366. Each of the pockets 366 is formed by a front piece 368 of flexible sheeting such as a fabric or nylon material with an elastic upper edge 370. A portion of the front wall 172 forms the back of the pocket 366. The upper edge 370 is normally closed, with the elastic maintaining the upper edge 370 is a closed state until the user pulls out the upper edge 370 to access the interior of the pocket 366 such as to store an object such as a water bottle in the pocket 366 or retrieve pet treats stored in the pocket 366. Each of the first and second pockets 366 have a closed bottom, right and left closed sides, and a normally closed open top. The bottom of each of the pockets 366 is adjacent to the junction of the floor 176 and front wall 172. The outer side of one of the pockets 366 is adjacent to the junction between the front wall 172 and first sidewall 168. The outer side of the other of the pockets 366 is adjacent to the junction between the front wall 172 and the second sidewall 170. The elastic upper edge 370 is adjacent to quick connect receptacle strip 304A. A portion of the front wall 172 extends between the first and second pockets 366, as shown in FIG. 21. As further shown in FIG. 21, when the pull handle 16 is rotated downwardly, such portion of the front wall 172 is visible to the user. As shown in FIGS. 1 and 19, when the pull handle 16 is rotated upwardly to a position where the shaft 130 is parallel to front posts 30, 32, the shaft 130 hides a section of such portion of the front wall 172 and, in such a position, shaft 130 is equidistant from the inner upright side edges of the pockets 366. In the normal closed position, the upper elastic edge 370 is adjacent to and confronts the front wall 172 of the receptacle 26.

In operation, if the canopy 28 is off the receptacle 26, the pet may be picked up and lowered into the receptacle 26 and then one of the leashes 314, 316 may be clipped to the pet's collar. Then the canopy 28 may be engaged to the receptacle 26. If the canopy 28 is on the receptacle 26, the zipper 264 may be unzipped at least partially and the pet lowered through the opening left by the unzipped zipper 264. Alternatively, whether the canopy 28 is on or off the receptacle 26, the outer piece or rear door 222 may be opened, and the pet may jump into the receptacle through the opening left by the open door 222. Or the pet may be lifted up and placed into the receptacle 26 through the opening left by the outer piece or rear door 222. When the outer piece or rear door 222 is opened to access the inside of the receptacle 26, the removable support member section 192 may be removed as well if, for example, the pet is rather large. Then the door 222 is closed and engaged back to the receptacle 26, with the support member section 192 also being engaged if such was disengaged from the frame 12. The pet may then be clipped to one of the leashes 314, 316.

Then the pet wagon 10 may be pushed by the push handle 14 or pulled by the pull handle 16. If pushed by the push handle 14, the user may set the height of the handle portion 144 of the push handle 14 by pushing in each of the buttons 166 of the first and second button assemblies 146, 148 to unlock the push handle 14, then rotating the push handle 14 to the subsequent lock position, whereupon the push handle 14 automatically locks. If the user would like to move through one of the lock positions A-K as shown in FIG. 28, the user keeps both of the buttons 166 of both of the first and second button assemblies 146, 148 in the pushed down position until the push handle 14 approaches the desired lock position, whereupon the push handle 14 locks automatically at such desired lock position. Then the pet wagon 10 may be pushed. During such pushing, wheels of the front wheel assemblies 18 and 20 rotate on both horizontal and vertical axis, such that both front wheels rotate on a horizontal axis and spin on a vertical axis. During such pushing, the wheels of the rear wheel assemblies 22 and 24 rotate about the horizontal axis and may 1) rotate or spin about a vertical axis or 2) not rotate or spin about a vertical axis, depending upon the type of rear wheel assembly that is selected and engaged. To stop the pet wagon 10, the user may just cease pushing or the user may use one of the brake pedals 344.

When the pet wagon 10 is being pushed by the push handle 14, the pull handle 16 is preferably in an up and retracted position. The up position means that the pull handle shaft 130 is in a vertical position and adjacent to or in contact with the upper front lateral support member 42 and that the handle grip 122 is disposed at a greater altitude than the upper front lateral support member 42. The retracted position means that the handle grip 122 is adjacent to the button assembly 136, that none of the upper shaft portion 134 is exposed to view, and that the upper shaft portion 134 has been retracted into the lower shaft portion 132.

If the pet wagon 10 is pulled by the pull handle 16 starting with the position shown in FIG. 1, the user may grab the handle grip 122 and start to pull. The sliding friction between the shaft portions 132, 134 is less than the weight of the pet wagon 10 such that, when the user begins to pull with the shaft portion 134 in the retracted position, the pet wagon 10 does not move and the user begins to walk and the shaft portion 134 begins its journey to the extended position of FIG. 2. Then, when the user walks a sufficient distance away from the pet wagon 10, the button assembly 136 automatically locks the shaft portion 134 and it is at this point in time that the pet wagon 10 begins to move. Alternatively, instead of beginning his or her walk, the user may simply slide the shaft portion 134 out of the shaft portion 132 until the button assembly 136 locks and shaft portion 134 is in the extended position.

During the walk, and the pull handle 16 is being used, the front wheels may be easily picked up over obstacles because the handle shaft 130 is engaged to 1) a lower portion of the pet wagon 10 and 2) a front of the pet wagon 10.

During the walk, and the push handle 14 is being used, the front wheels may be easily drawn up over obstacles because 1) handle portion 144 is spaced a relatively great distance from the rear posts 34 and 36, 2) the handle portion 144 works as a lever relative to rear posts 34 and 36, 3) the handle portion 144 is locked to the rear posts 34 and 36, 4) the handle portion 144 is engaged to the topmost portions of the rear posts 34 and 36, 5) the rear posts 34 and 36 are relatively high, and 6) the relatively great distance between the handle portion 144 and front wheels acts or works like a long distance lever such that the front wheels are easily lifted up over obstacles.

During the walk and a pet is in the receptacle 26, the receptacle 26 is relatively deep to minimize the pet jumping out during the walk. Leashes 314, 316 may be used to minimize a pet jumping out during the walk. All sheeting sections 258, 260, and 262 may be used and connected to the receptacle 26 to further minimize the pet from jumping out of the receptacle 26 during the walk.

During the walk, the caretaker may take a visible account of the pet through the mesh sections 260 and 262. In other words, whether the pet wagon 10 is being pushed or pulled, mesh sections 260 and 262 are end sections, with one mesh section permitting vision from the front of the pet wagon 10 and with the other mesh section permitting vision from the rear of the pet wagon 10. It is noted that the canopy 28 has no true front and no true back. In other words, mesh section 260 can be the front section or the rear section and mesh section 262 can be the front section or the rear section, with the quick connects of the canopy 28 engaging the quick connects of the receptacle 26 regardless of the orientation of the canopy 28.

During the walk, even large pets may sit on their haunches or stand during the pulling of the wagon. A relatively rigid floor provides such for the pets. Further, such a sitting or standing is possible because the canopy 28 is relatively deep to provide height under the canopy 28. The depth of the canopy 28 is about equal to the depth of the receptacle 26. The height of the canopy 28 is about the height of the topmost portion of the rear posts 34 and 36. In other words, the altitude of the topmost portion of the rear posts 34, 36 is about equal to the altitude of the topmost portion of the canopy 28. Still further, it can be noted that the distance from the bottommost portion of the rear posts 34, 36 to the plane of the U-shaped support members 40, 50 is about equal to the distance from the plane of the U-shaped support members 40, 50 to the topmost portions of the rear posts 34, 36. The topmost portions of the rear posts 34, 36 are the topmost portions of sleeves 150. The topmost portions of the sleeves 150 and rear posts 34, 36 lie above pins 154, 156.

At the end of the walk, the pet may be lifted out of a canopyless pet wagon 10. Or, if the canopy 28 is engaged on the receptacle 26, the canopy 28 may be removed and then the pet is lifted out. Or the zipper 264 may be at least partially unzipped and the pet lifted out. Or the rear door 222 may be opened to lift the pet out or let the pet jump out.

To transport the pet wagon 10 back home in a vehicle, the handle strap 240 is lifted up, which pivots the front and rear bottom frame portions 82, 84 relative to each other so as to attain the compact and folded in form of FIG. 32. Then buckle strap portions 358 and 360 are engaged to keep the pet wagon 10 in the compact and folded in form. Then the compact pet wagon 10 may be lifted into the vehicle such as by using the hand strap 240.

Figure 34:
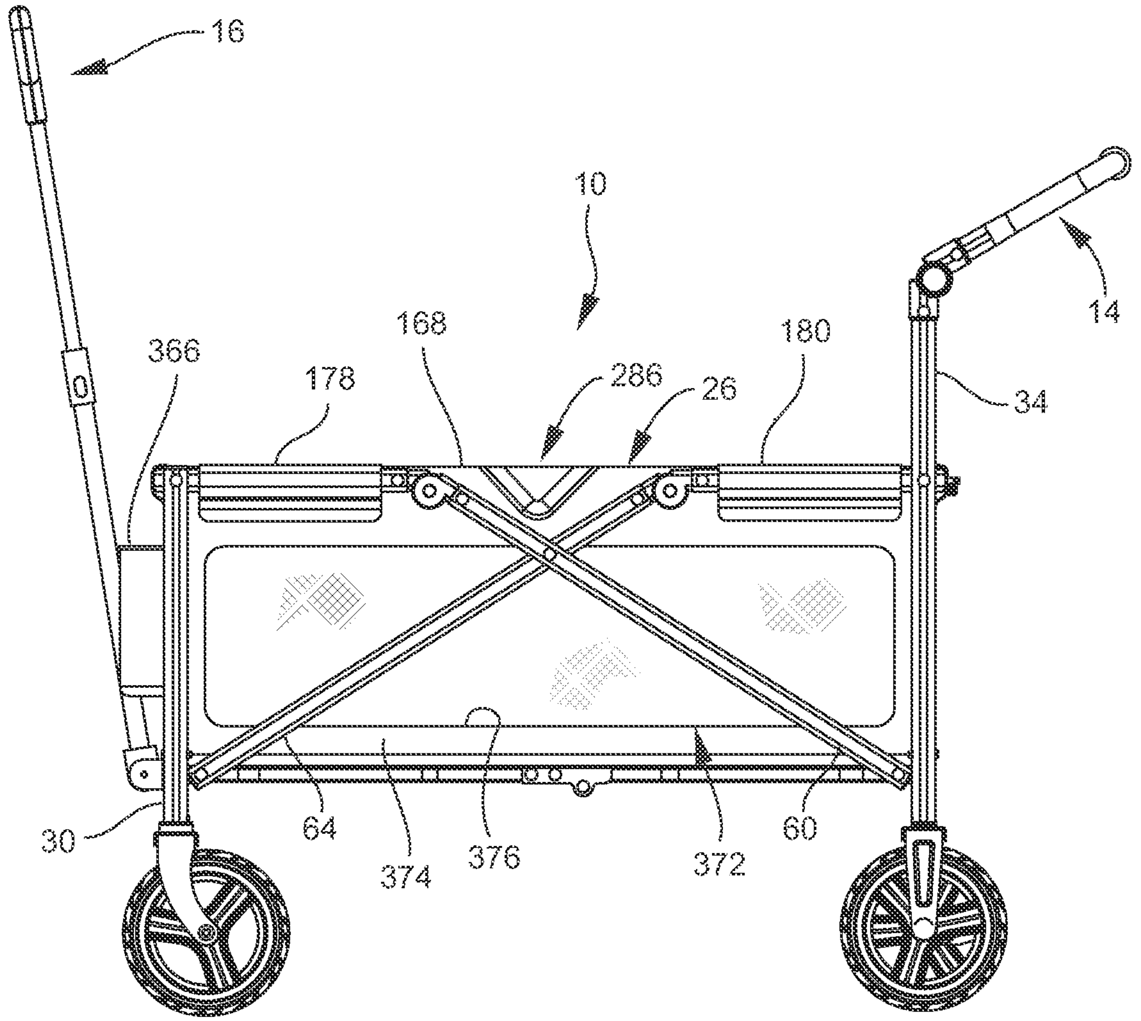
FIG. 34 is a side elevation view of the push pull wagon of FIG. 7, where the receptacle of the push pull wagon includes a mesh fabric rectangular portion on each of the first and second sides of the receptacle.

FIG. 34 is a side elevation view of the push pull wagon 10 of FIG. 7, where the receptacle 26 of the push pull wagon 10 includes a mesh fabric rectangular portion 372 on each of the first and second sides 168, 170 of the receptacle. FIG. 7 shows the first side 168. The first side 168 is identical to the second side 170. Mesh on each of the sides 168, 170 provides for greater breathability when canopy 28 is employed and when canopy 28 is not employed.

Mesh fabric rectangular portion 372 is see through. The user can see the interior of the receptacle 26 through the mesh portion 372 and a pet in the receptacle 26 can see outside of the receptacle 26 through the mesh portion 372. The flexible fabric or opaque sheeting portion 374 surrounding the mesh fabric rectangular portion 372 is opaque or not see through.

Mesh portion 372 includes an endless rectangular border 376 with curved corner portions. Border 376 is adjacent to: 1) the junction of the floor 176 and the first sidewall 168, 2) the junction of the rear wall 174 and the first sidewall 168, 3) the junction of the front wall 172 and the first sidewall 168, and 4) at least one of the uppermost edge of the first sidewall 168, front sleeve 178, and rear sleeve 180.

The mesh portion 372 extends to and between an upper edge of the border 376 and a lower edge of the border 376. The mesh portion 372 extends to and between a front edge of the border 376 to a rear edge of the border 376. Mesh extends into all of the corner portions of the mesh portion 372.

The flexible fabric or opaque sheeting portion 374 extends from: 1) the lower edge of the border 376 to the junction of the floor 176 and the first sidewall 168, 2) the rear edge of the border 376 to the junction of the rear wall 174 and the first sidewall 168, 3) the front edge of the border 376 to the junction of the front wall 172 and the first sidewall 168, and 4) the upper edge of the border 376 to the uppermost edge of the first sidewall 168. It is noted that the first sidewall 168 is the combination of the mesh portion 372 and the opaque portion 374.

Figure 35A:
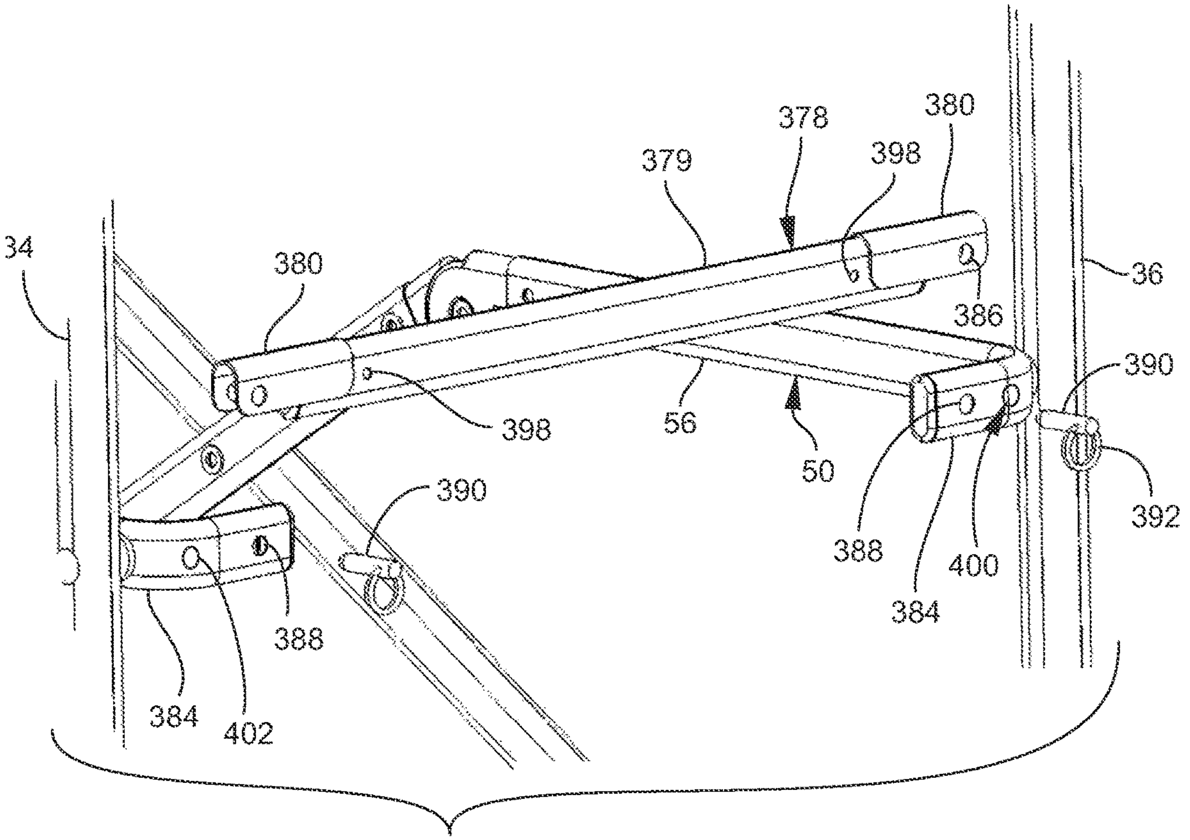
FIG. 35A is an exploded perspective view of a portion of the rear of the push pull wagon of FIG. 1, where the rear upper lateral removable support member includes inverted U-shaped connectors and friction fit push pull pins to engage the removable support member to frame portions of the push pull wagon.
Figure 35B:
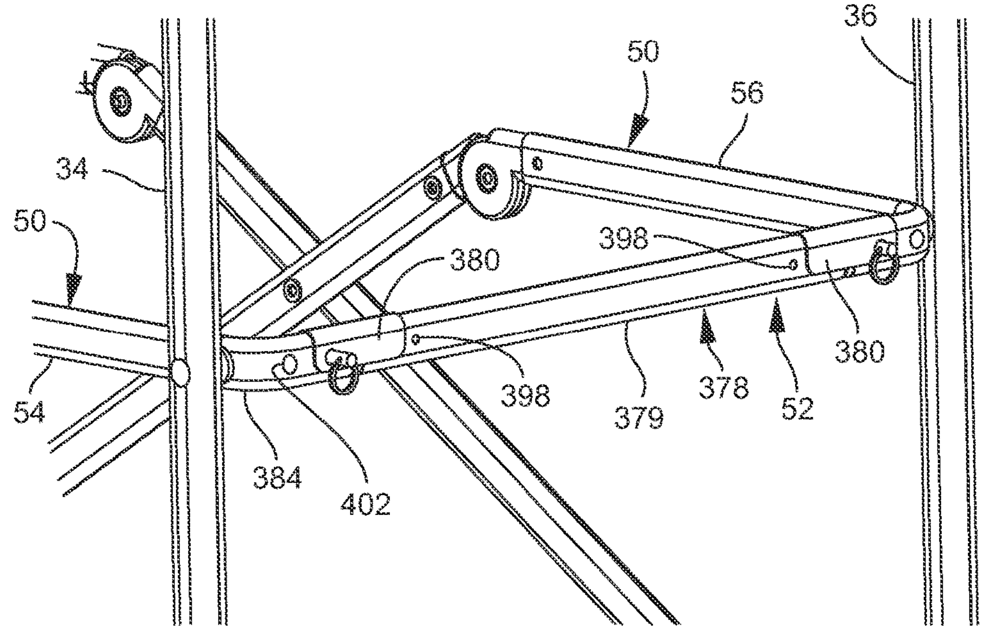
FIG. 35B is an assembled perspective view of the rear upper lateral removable support member of FIG. 35A, where the rear upper lateral removable support member is engaged to frame portions of the push pull wagon.

FIG. 35A is an exploded perspective view of a portion of the rear of the push pull wagon 10 of FIG. 1, where a rear upper lateral removable support member 378 includes a main tube portion 379, first and second inverted U-shaped connectors 380, and friction fit push pull pins 390 to engage the removable support member 378 to frame portions of the push pull wagon 10. This embodiment replaces the removable frame section 192. FIG. 35B is an assembled perspective view of the rear upper lateral removable support member 378 where the rear upper lateral removable support member 378 is engaged to frame corner portions 384 of the push pull wagon 10.

The uppermost U-shaped support member 50 fixes apart rear posts 34, 36. U-shaped support member 50 includes base section 52, first side section 54, and second side section 56. In each of the embodiments of FIG. 3 and FIG. 35A, rear base section 52 is present. In FIG. 3, rear base section 52 includes corner portions 384 and removable frame section 192. In FIGS. 35A and 35B, rear base section 52 includes corner portions 384 and removable frame section 378.

U-shaped connectors 380 are rigidly engaged, such as by welding, to ends of the main tube portion 379. U-shaped connectors 380 extend beyond the ends of the main tube portion 379 such that the free outer portions of the U-shaped connectors 380 engage corner portions 384.

Each of the free outer portions of the U-shaped connectors 380 have pin holes 386 in front and back sections of the free outer portions of the U-shaped connectors 380. Each of the corner portions 384 have pin holes 388 that align with pin holes 386 when the U-shaped connectors 380 engage the corner portions 384. When pin holes 386 and 388 are aligned with each other, pin connectors 390 may be pushed therein in a friction fit engagement to engage removable support member 378 to the corner portions 384 and thus to the frame 12 of the wagon 10. Each of the pin connectors 390 have a ring or finger ring 392 engaged in a ring hole in the pin connector 390. Finger ring 392 is pulled to pull the pin connector 390 out of pin holes 386, 388 to thus disengage the removable frame member 378 from the corner portions 384.

Corner portions 384 have inner faces. These inner faces are adjacent to and confront the outer faces of the main tube portion 379 when the removable frame member 378 is engaged to the corner portions 384.

The main tube portion 379 includes a height and thickness that is identical to the corner portions 384. A vertical section of the main tube portion 379 is identical to a vertical section of the corner portion 384 where there are no pin holes in the main tube portion 379 or corner portion 384.

Figure 36:
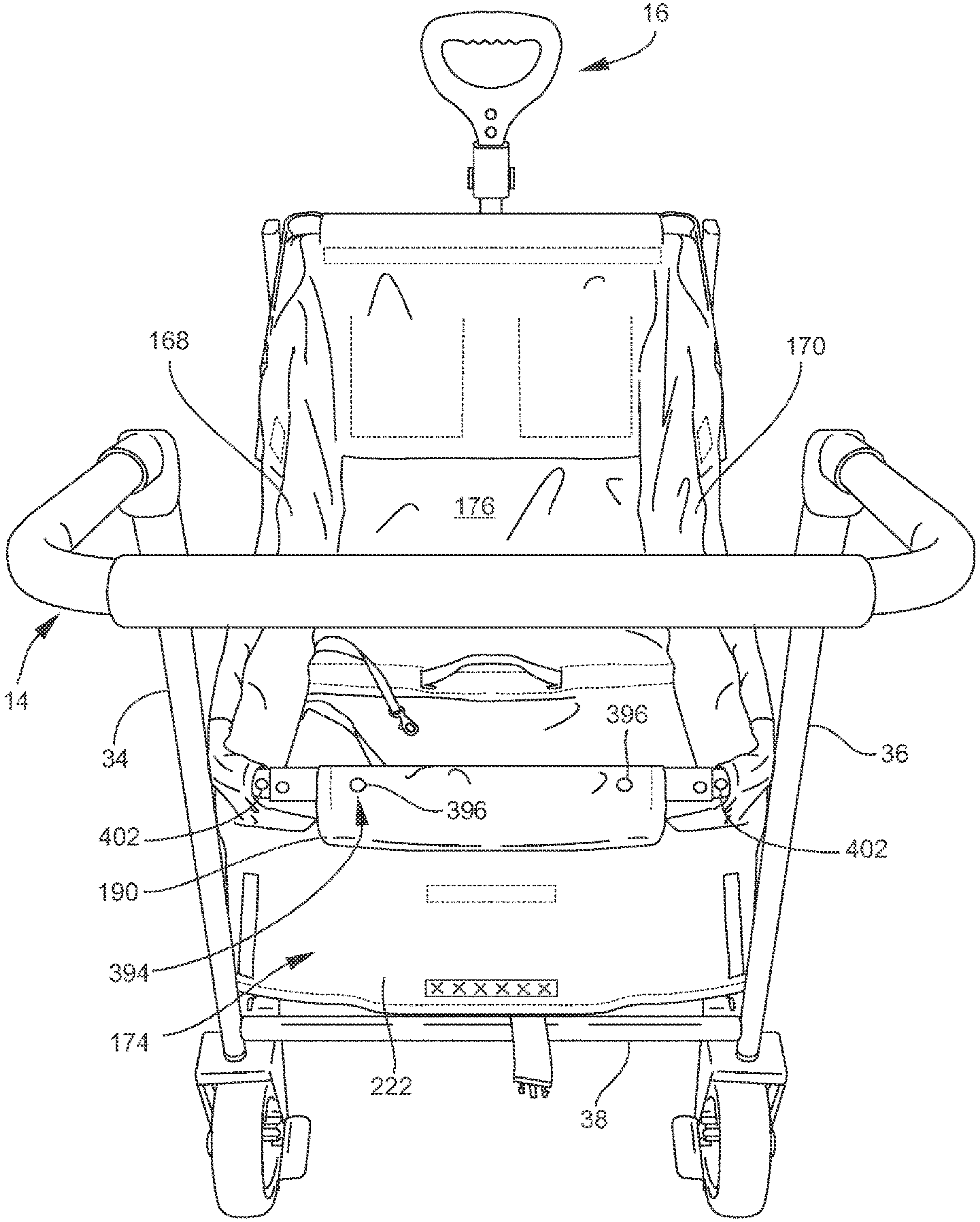
FIG. 36 is a rear perspective view of the push pull wagon of FIG. 8, showing the flexible fabric rear door of the push pull wagon engaged to the frame by employing snaps instead of hook and loop fabric strips.

FIG. 36 is a rear perspective view of the push pull wagon of FIG. 8, showing the flexible fabric rear door 222 of the push pull wagon 10 engaged to the frame 12 by employing snaps 394 instead of hook and loop fabric such as found on strip 310A of FIG. 8. One snap 394 includes a receptacle first snap portion 396 found on rear sleeve 190 of rear door 222 of rear wall 174 that is shown in FIG. 36 and a frame second snap portion 398 found on main tube portion 379 that is shown in FIGS. 35A and 35B. Snap 394, snap portion 396, and snap portion 398 are quick connects.

Figure 20:
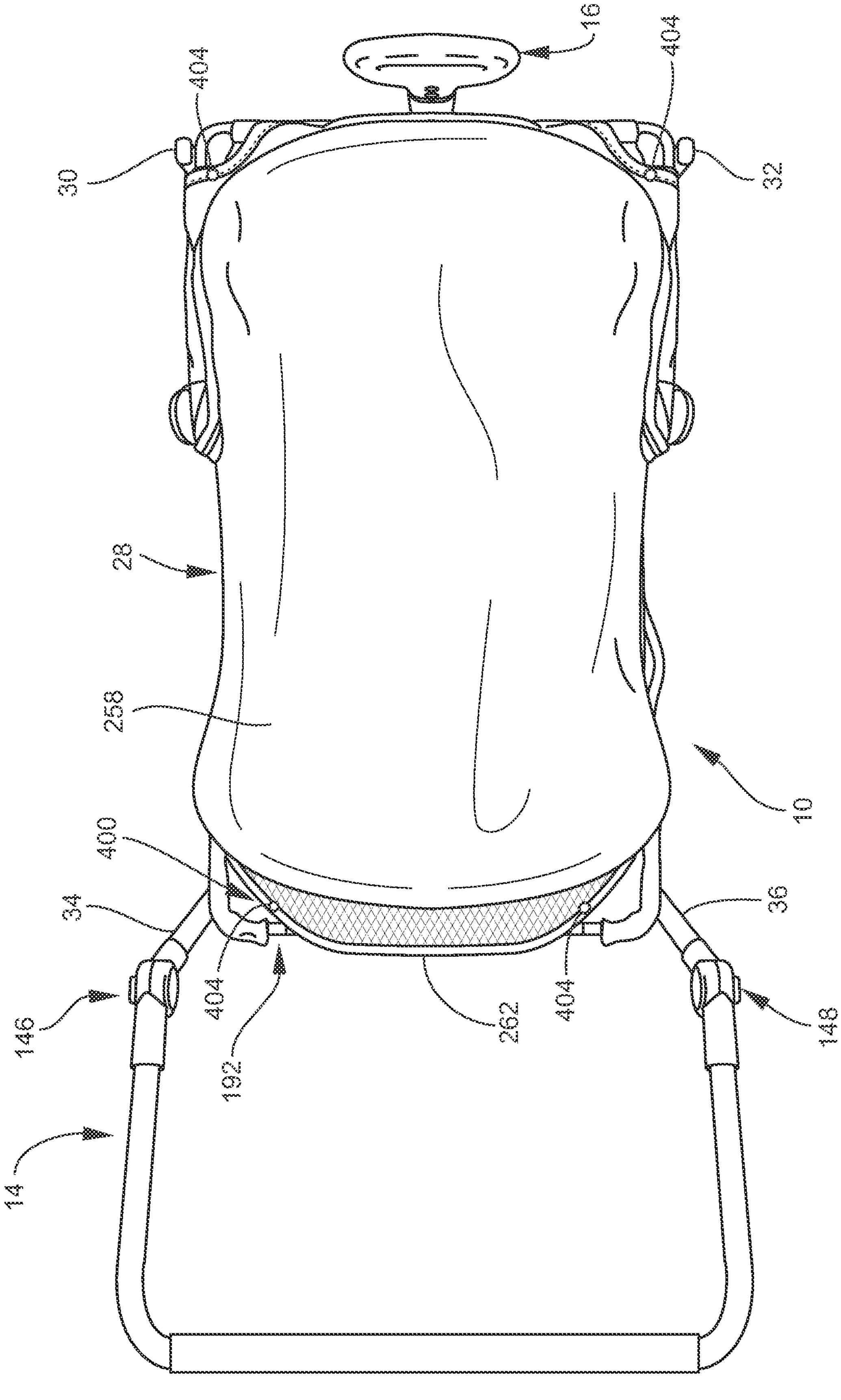
FIG. 20 is a top perspective view of the wagon of FIG. 16.

Snaps 400 engage the rear portion of the frame 12 to the rear portion of the canopy 28. One snap 400 includes a first frame snap portion 402 engaged on corner portion 384, as shown in FIGS. 35A, 35B, and 36 and a second canopy snap portion 404 engaged on the canopy 38 adjacent to or on a periphery of the canopy 28 at locations adjacent to corner portions of the canopy 28 as shown diagrammatically in FIG. 20. Canopy snap portions 404 are on an underside of the canopy 28 and hence what is shown in FIG. 20 are diagrammatic representations of the snap portions 404.

Canopy 28 may have both types of quick connects where one type of quick connects may be a strip or strips of hook and loop material and where a second type of quick connects may be snaps. The canopy quick connects are on an underside or an interior side of the canopy 28. The frame quick connects are on an exterior of a frame portion of the frame 12.

With snap portions 402, 404 employed instead of the hoop and loop strip quick connect 310A, the canopy 28 may remain engaged to the rear portion of the frame 12 while the rear door 222 is operated. In other words, to operate the rear door 222, snap portions 396 are disengaged from snap portions 398, an action that opens sleeve 190 without requiring the canopy 28 to be disengaged from the rear portion of the frame 12. Once sleeve 190 is opened, the rear door 222 is released from removable frame section 378 and the quick connects 224, 226 may be disengaged from each other such that rear door 222 may be opened.

U.S. Nonprovisional patent application Ser. No. 18/513,555 filed Nov. 18, 2023 is hereby incorporated by reference in its entirety into this application.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

What is claimed is:

1. A wagon, comprising:

a) a frame that includes an open and operating state and a closed and compact state;

b) first and second front wheels engaged to the frame;

c) first and second rear wheels engaged to the frame;

d) a front handle engaged to the frame at a forward frame location;

e) a rear handle engaged to the frame at a rearward frame location;

f) the frame including a front frame portion, a rear frame portion opposite of the front frame portion, a first side frame portion adjacent to each of the front frame portion and rear frame portion, a second side frame portion adjacent to each of the front frame portion and rear frame portion and being opposite of the first side frame portion, and a bottom frame portion adjacent to each of the front and rear frame portions and further being adjacent to, and in part parallel to, each of the first side and second side frame portions;

g) a flexible receptacle engaged to the frame, the flexible receptacle having flexible side portions disposed respectively inwardly of the first and second side frame portions, flexible front and rear end portions disposed respectively inwardly of the front and rear frame portions, and a flexible floor disposed above and adjacent to the bottom frame portion, the flexible receptacle being engaged to the frame when the frame is in the open and operating state and when the frame is in the closed and compact state; and h) the front and rear frame portions being adjacent to each other when the frame is in the closed and compact state and being spaced apart from each other when the frame is in the open and operating state, sections of the first side frame portion being adjacent to each other when the frame is in the closed and compact state and being spaced apart from each other when the frame is in the open and operating state, sections of the second side frame portion being adjacent to each other when the frame is in the closed and compact state and being spaced apart from each other when the frame is in the open and operating state, and sections of the bottom frame portion being adjacent to each other when the frame is in the closed and compact state and being spaced apart from each other when the frame is in the open and operating state.

2. The wagon of claim 1, wherein sections of the first and second side portions of the frame define a horizontal plane in the open and operating state, the rear portion of the frame having first and second uppermost locations disposed at an altitude greater than the horizontal plane, and the rear handle pivotally engaged to the first and second uppermost locations.

3. The wagon of claim 1, wherein sections of the first and second side portions of the frame define a horizontal plane in the open and operating state, wherein the front portion of the frame includes a lowermost frame section disposed at an altitude lower than the horizontal plane, the front handle engaged to the lowermost frame section and having a pivot axis adjacent to the lowermost frame section.

4. The wagon of claim 1, wherein sections of the first and second side portions of the frame define a horizontal plane, wherein the rear handle is engaged to the frame at a rear pivot axis having an altitude above the horizontal plane, and wherein the front handle is engaged to the frame at a front pivot axis having an altitude below the horizontal plane.

5. The wagon of claim 1, wherein the rear handle is engaged to the frame at a rear pivot axis, wherein the front handle is engaged to the frame at a front pivot axis, and wherein the rear pivot axis has an altitude greater than the front pivot axis.

6. The wagon of claim 1, wherein each of the first and second side frame portions includes:

a) a first frame section extending rearwardly from the front frame portion and having a rearmost location, the first frame section being disposed in a horizontal plane;

b) a second frame section extending frontwardly from the rear frame portion and having a frontmost location, the second frame section being disposed in the horizontal plane;

c) a third frame section pivotally engaged to the rearmost location of the first frame section and extending obliquely therefrom to pivotally engage the rear portion of the frame;

d) a fourth frame section pivotally engaged to the frontmost location of the second frame section and extending obliquely therefrom to pivotally engage the front portion of the frame; and e) the third and fourth frame sections being pivotally engaged to each other.

7. The wagon of claim 1, wherein:

a) the front frame portion and the first side frame portion sharing a first corner post;

b) the front frame portion and the second side frame portion sharing a second corner post; and c) the front frame portion having a lowermost front frame section and further having an uppermost front frame section, the first and second corner posts defining a front plane, the lowermost front frame section being in the front plane, the uppermost front frame section being spaced from the front plane and being forward of the front plane; and d) wherein sections of the first and second side portions of the frame define a horizontal plane in the open and operating state; and e) wherein the uppermost front frame section is in said horizontal plane, f) said front plane having therein junctions between the first and second corner posts and the uppermost front frame section;

g) said front plane having therein junctions between the first and second corner posts and the lowermost front frame section.

8. The wagon of claim 1, wherein:

a) the rear frame portion and the first side frame portion share a third corner post;

b) the rear frame portion and the second side frame portion share a fourth corner post; and c) the rear frame portion includes a lowermost rear frame section and an uppermost rear frame section, the third and fourth corner posts defining a rear plane, the lowermost rear frame section being in the rear plane, the uppermost rear frame section being spaced from the rear plane and being rearward of the rear plane;

d) wherein sections of the first and second side portions of the frame define a horizontal plane in the open and operating state; and e) wherein the uppermost rear frame section is in said horizontal plane, f) said rear plane having therein junctions between the third and fourth corner posts and the uppermost rear frame section;

g) said rear plane having therein junctions between the third and fourth corner posts and the lowermost rear frame section.

9. The wagon of claim 1, wherein the bottom frame portion includes:

a) a front platform section pivotally engaged to the front frame portion;

b) a rear platform section pivotally engaged to the rear frame portion;

c) the front platform section and rear platform section pivotally engaged to each other; and d) the front and rear platform sections defining respective front and rear platform planes, the front and rear platform planes being co-planar when the wagon is in a folded out and operating state, the front and rear platform planes being obliquely disposed relative to each other when the wagon is in a folded in and compact state.

10. The wagon of claim 9, wherein the front platform section includes front and rear platform frame members and a central frame member extending therebetween to form a first H-shape, and wherein the rear platform section includes front and rear platform frame members and a central frame member extending therebetween to form a second H-shape, with each of the front and rear platform sections defining a plane, with the front platform section having first and second oblique members in the plane of the front platform section, with the rear platform section having third and fourth oblique members in the plane of the rear platform section, with each of the first and second oblique members being oblique to the central frame member of the front platform section, and with each of the third and fourth oblique members being oblique to the central frame member of the rear platform section.

11. The wagon of claim 9, and further comprising at least one channel connector between the front and rear platform sections, the channel connector being pivotally engaged to one of the front and rear platform sections, the channel connector being fixedly engaged to the other of the front and rear platform sections, the channel connector being one-piece.

12. The wagon of claim 9, wherein:

a) the front platform section includes a first platform member extending straight rearwardly from the front frame portion, then extending obliquely inwardly, and then extending straight rearwardly to the rear platform section;

b) the front platform section includes a second platform member extending straight rearwardly from the front frame portion, then extending obliquely inwardly, and then extending straight rearwardly to the rear platform section, the first and second platform members being engaged to each other by at least one front transverse frame member;

c) the rear platform section includes a third platform member extending straight frontwardly from the rear frame portion, then extending obliquely inwardly, and then extending straight frontwardly to the front platform section; and d) the rear platform section includes a fourth platform member extending straight frontwardly from the rear frame portion, then extending obliquely inwardly, and then extending straight frontwardly to the front platform section, the third and fourth platform members being engaged to each other by at least one rear transverse frame member.

13. The wagon of claim 1, wherein the flexible receptacle includes a first openable side sleeve that engages the first side frame portion, a second openable side sleeve that engages the second side frame portion, a front openable sleeve that engages the front frame portion, and a rear openable sleeve that engages the rear frame portion, wherein each of the sleeves includes a first elongate fabric connector that engages to and disengages from a second elongate fabric connector on the receptacle, all of the second elongate fabric connectors defining a plane and residing in said plane.

14. The wagon of claim 1, wherein the rear end portion of the flexible receptacle includes:

a) a hinged flexible rear door having a hinged bottom portion that remains engaged to the rear end portion when the hinged flexible rear door is opened, a first side door portion that is releaseably engaged to the rear end portion, and a second side door portion that is releaseably engaged to the rear end portion and disposed opposite of the first side door portion;

b) a U-shaped opening that is exposed to view when the hinged flexible rear door is opened, the U-shaped opening being defined by a U-shaped edge that extends adjacent to the hinged bottom portion, the first side door portion, and the second side door portion when the hinged flexible rear door is closed; and c) a stationary flexible rear portion adjacent to the hinged flexible rear door when the hinged flexible rear door is closed, the first and second rear wheels extending in a transverse direction relative to each other and the hinged flexible rear door and stationary flexible rear portion extending in said transverse direction, the stationary flexible rear portion having the U-shaped opening, the U-shaped edge, the first side door portion, and the second side door portion.

15. The wagon of claim 1, and further comprising a canopy, the canopy having a frame comprising first and second U-shaped members pivotally engaged to each other at first and second junctions, the first and second junctions being engagable in respective first and second pockets disposed on respective flexible side portions of the flexible receptacle, wherein the flexible receptacle includes first and second flexible U-shaped ends, the canopy also having first and second flexible U-shaped ends, the first flexible U-shaped ends being engagable to each other, and the second flexible U-shaped ends being engagable to each other, the first and second flexible U-shaped ends being adjacent to a plane extending from a first end of the wagon to a second end of the wagon.

16. The wagon of claim 1, wherein:

a) the rear frame portion and the first side frame portion share a third corner post;

b) the rear frame portion and the second side frame portion share a fourth corner post;

c) the third and fourth corner posts having respective first and second uppermost locations to which the rear handle is pivotally engaged;

d) the third and fourth corner posts defining a rear post plane;

e) the rear handle including a transverse section;

f) the rear handle being pivotable such that the transverse section is pivotable to a first side of the rear post plane; and g) the rear handle being pivotable such that the transverse section is pivotable to a second and opposite side of the rear post plane.

17. The wagon of claim 1, wherein the front handle is pivotably engaged to the frame and telescopically extendable in length, the front handle includes first and second elongate sections, with the first elongate section telescoping into the second elongate section.

18. The wagon of claim 1, wherein the front handle is pivotably engaged to the frame about an axis that is fixed and parallel to a lowermost transverse support member of the frame, the lowermost transverse support member having a first outer end adjacent to the first front wheel and having a second outer end adjacent to the second front wheel.

* * * * *